(12) United States Patent
Gass et al.

(10) Patent No.: US 7,866,239 B2
(45) Date of Patent: Jan. 11, 2011

(54) ELEVATION MECHANISM FOR TABLE SAWS

(75) Inventors: Stephen F. Gass, Wilsonville, OR (US);
J. David Fulmer, Tualatin, OR (US);
David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 11/717,987

(22) Filed: Mar. 14, 2007

(65) Prior Publication Data

US 2007/0175306 A1     Aug. 2, 2007

Related U.S. Application Data

(63) Continuation of application No. 11/045,972, filed on Jan. 28, 2005, and a continuation of application No. 11/026,114, filed on Dec. 31, 2004, now Pat. No. 7,707,920.

(60) Provisional application No. 60/540,377, filed on Jan. 29, 2004, provisional application No. 60/533,811, filed on Dec. 31, 2003.

(51) Int. Cl.
*B23D 47/02* (2006.01)
*B23D 47/00* (2006.01)
*B27B 5/24* (2006.01)
*B27B 5/00* (2006.01)

(52) U.S. Cl. .................. 83/473; 73/477.1; 73/477.2; 73/471.3; 73/491

(58) Field of Classification Search ............ 83/477, 83/477.1, 477.2, 491, 581, 473, 478, 860, 83/486.1, 471.3; 144/286.1, 286.5
See application file for complete search history.

(56) References Cited

U.S. PATENT DOCUMENTS

| | | | |
|---|---|---|---|
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |

(Continued)

FOREIGN PATENT DOCUMENTS

CA        2140991        1/1995

(Continued)

OTHER PUBLICATIONS

Sink Drain Plug Lifter, circa 1974.

(Continued)

*Primary Examiner*—Laura M. Lee

(57) ABSTRACT

Elevation mechanisms for table saws are disclosed. Embodiments include mechanisms with an elevation carriage, a trunnion structure, and a shaft with a cantilevered portion. The shaft can be fixed to one of the elevation carriage and trunnion structure, and the other of the elevation carriage and trunnion structure slides on the cantilevered portion.

7 Claims, 44 Drawing Sheets

U.S. PATENT DOCUMENTS

| | | |
|---|---|---|
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| RE15,262 E | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,008,673 A * | 7/1935 | Ocenasek .................... 83/473 |
| 2,010,851 A | 8/1935 | Dummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 5/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al |
| 2,758,615 A | 8/1956 | Mastriforte |
| 2,785,710 A | 3/1957 | Mowery, Jr |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,007,501 A | 11/1961 | Mundell et al. |
| 3,011,529 A | 12/1961 | Copp |
| 3,011,533 A * | 12/1961 | Newman, Sr. ................ 144/1.1 |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |

| | | | | | |
|---|---|---|---|---|---|
| 3,047,116 A | 7/1962 | Stiebel et al. | 3,946,631 A | 3/1976 | Malm |
| 3,085,602 A | 4/1963 | Gaskell | 3,947,734 A | 3/1976 | Flyer |
| 3,105,530 A | 10/1963 | Peterson | 3,949,636 A | 4/1976 | Ball et al. |
| 3,129,731 A | 4/1964 | Tyrrell | 3,953,770 A | 4/1976 | Hayashi |
| 3,163,732 A | 12/1964 | Abbott | 3,960,310 A | 6/1976 | Nussbaum |
| 3,184,001 A | 5/1965 | Reinsch et al. | 3,967,161 A | 6/1976 | Lichtblau |
| 3,186,256 A | 6/1965 | Reznick | 3,974,565 A | 8/1976 | Ellis |
| 3,207,273 A | 9/1965 | Jurin | 3,975,600 A | 8/1976 | Marston |
| 3,213,731 A | 10/1965 | Renard | 3,978,624 A | 9/1976 | Merkel et al. |
| 3,224,474 A | 12/1965 | Bloom | 3,994,192 A | 11/1976 | Faig |
| 3,232,326 A | 2/1966 | Speer et at | 4,007,679 A | 2/1977 | Edwards |
| 3,246,205 A | 4/1966 | Miller | 4,016,490 A | 4/1977 | Weckenmann et al. |
| 3,249,134 A | 5/1966 | Vogl et al. | 4,026,174 A | 5/1977 | Fierro |
| 3,274,876 A | 9/1966 | Debus | 4,026,177 A | 5/1977 | Lokey |
| 3,276,497 A | 10/1966 | Heer | 4,029,159 A | 6/1977 | Nymann |
| 3,306,149 A | 2/1967 | John | 4,047,156 A | 9/1977 | Atkins |
| 3,313,185 A | 4/1967 | Drake et al. | 4,048,886 A | 9/1977 | Zettler |
| 3,315,715 A | 4/1967 | Mytinger | 4,060,160 A | 11/1977 | Lieber |
| 3,323,814 A | 6/1967 | Phillips | 4,070,940 A | 1/1978 | McDaniel et al. |
| 3,337,008 A | 8/1967 | Trachte | 4,075,961 A | 2/1978 | Harris |
| 3,356,111 A | 12/1967 | Mitchell | 4,077,161 A | 3/1978 | Wyle et al. |
| 3,368,596 A | 2/1968 | Comer | 4,085,303 A | 4/1978 | McIntyre et al. |
| 3,386,322 A | 6/1968 | Stone et al. | 4,090,345 A | 5/1978 | Harkness |
| 3,439,183 A | 4/1969 | Hurst, Jr | 4,091,698 A | 5/1978 | Obear et al. |
| 3,445,835 A | 5/1969 | Fudaley | 4,106,378 A | 8/1978 | Kaiser |
| 3,454,286 A | 7/1969 | Anderson et al. | 4,117,752 A | 10/1978 | Yoneda |
| 3,456,696 A | 7/1969 | Gregory et al. | 4,145,940 A | 3/1979 | Woloveke et al. |
| 3,512,440 A | 5/1970 | Frydmann | 4,152,833 A | 5/1979 | Phillips |
| 3,538,964 A | 11/1970 | Warrick et al. | 4,161,649 A | 7/1979 | Klos et al. |
| 3,540,338 A | 11/1970 | McEwan et al. | 4,175,452 A | 11/1979 | Idel |
| 3,554,067 A | 1/1971 | Scutella | 4,184,394 A | 1/1980 | Gjerde |
| 3,566,934 A | 3/1971 | Thrasher | 4,190,000 A | 2/1980 | Shaull et al. |
| 3,566,996 A | 3/1971 | Crossman | 4,195,722 A | 4/1980 | Anderson et al. |
| 3,580,376 A | 5/1971 | Loshbough | 4,199,930 A | 4/1980 | Lebet et al. |
| 3,581,784 A | 6/1971 | Warrick | 4,200,002 A | 4/1980 | Takahashi |
| 3,593,266 A | 7/1971 | Van Sickle | 4,206,666 A | 6/1980 | Ashton |
| 3,613,748 A | 10/1971 | De Pue | 4,206,910 A | 6/1980 | Biesemeyer |
| 3,621,894 A | 11/1971 | Niksich | 4,249,117 A | 2/1981 | Leukhardt et al. |
| 3,648,126 A | 3/1972 | Boos et al. | 4,249,442 A | 2/1981 | Fittery |
| 3,670,788 A | 6/1972 | Pollak et al. | 4,251,599 A | 2/1981 | McCormick |
| 3,675,444 A | 7/1972 | Whipple | 4,255,995 A | 3/1981 | Connor |
| 3,680,609 A | 8/1972 | Menge | 4,262,278 A | 4/1981 | Howard et al. |
| 3,688,815 A | 9/1972 | Ridenour | 4,267,914 A | 5/1981 | Saar |
| 3,695,116 A | 10/1972 | Baur | 4,270,427 A | 6/1981 | Colberg et al. |
| 3,696,844 A | 10/1972 | Bernatschek | 4,276,459 A | 6/1981 | Willett et al. |
| 3,716,113 A | 2/1973 | Kobayashi et al. | 4,276,799 A | 7/1981 | Muehling |
| 3,719,103 A | 3/1973 | Streander | 4,291,794 A | 9/1981 | Bauer |
| 3,740,000 A | 6/1973 | Takada | 4,305,442 A | 12/1981 | Currie |
| 3,745,546 A | 7/1973 | Struger et al. | 4,319,146 A | 3/1982 | Wires, Sr. |
| 3,749,933 A | 7/1973 | Davidson | 4,321,841 A | 3/1982 | Felix |
| 3,754,493 A | 8/1973 | Niehaus et al. | 4,334,450 A | 6/1982 | Benuzzi |
| 3,772,590 A | 11/1973 | Mikulecky et al. | 4,372,202 A | 2/1983 | Cameron |
| 3,785,230 A | 1/1974 | Lokey | 4,374,552 A | 2/1983 | Dayen |
| 3,793,915 A | 2/1974 | Huier | 4,385,539 A | 5/1983 | Meyerhoefer et al. |
| 3,805,639 A | 4/1974 | Peter | 4,391,358 A | 7/1983 | Haeger |
| 3,805,658 A | 4/1974 | Scott et al. | 4,418,597 A | 12/1983 | Krusemark et al. |
| 3,808,932 A | 5/1974 | Russell | 4,427,042 A | 1/1984 | Mitchell et al. |
| 3,829,850 A | 8/1974 | Guetersloh | 4,466,170 A | 8/1984 | Davis |
| 3,829,970 A | 8/1974 | Anderson | 4,466,233 A | 8/1984 | Thesman |
| 3,858,095 A | 12/1974 | Friemann et al. | 4,470,046 A | 9/1984 | Betsill |
| 3,861,016 A | 1/1975 | Johnson et al. | 4,492,291 A | 1/1985 | Chometon et al. |
| 3,863,208 A | 1/1975 | Balban | 4,503,739 A | 3/1985 | Konieczka |
| 3,874,747 A | 4/1975 | Case et al. | 4,510,489 A | 4/1985 | Anderson, III et al. |
| 3,880,032 A | 4/1975 | Green | 4,512,224 A | 4/1985 | Terauchi |
| 3,882,744 A | 5/1975 | McCarroll | 4,518,043 A | 5/1985 | Anderson et al. |
| 3,886,413 A | 5/1975 | Dow et al. | 4,532,501 A | 7/1985 | Hoffman |
| 3,889,567 A | 6/1975 | Sato et al. | 4,532,844 A | 8/1985 | Chang et al. |
| 3,905,263 A | 9/1975 | Smith | 4,557,168 A | 12/1985 | Tokiwa |
| 3,922,785 A | 12/1975 | Fushiya | 4,559,858 A | 12/1985 | Laskowski et al. |
| 3,924,688 A | 12/1975 | Cooper et al. | 4,560,033 A | 12/1985 | DeWoody et al. |
| 3,931,727 A | 1/1976 | Luenser | 4,566,512 A | 1/1986 | Wilson |
| 3,935,777 A | 2/1976 | Bassett | 4,573,556 A | 3/1986 | Andreasson |
| 3,945,286 A | 3/1976 | Smith | 4,576,073 A | 3/1986 | Stinson |

| | | | | | |
|---|---|---|---|---|---|
| 4,589,047 A | 5/1986 | Gaus et al. | 5,230,269 A | 7/1993 | Shiotani et al. |
| 4,589,860 A | 5/1986 | Brandenstein et al. | 5,231,359 A | 7/1993 | Masuda et al. |
| 4,599,597 A | 7/1986 | Rotbart | 5,231,906 A | 8/1993 | Kogej |
| 4,599,927 A | 7/1986 | Eccardt et al. | 5,239,978 A | 8/1993 | Plangetis |
| 4,606,251 A | 8/1986 | Boileau | 5,245,879 A | 9/1993 | McKeon |
| 4,615,247 A | 10/1986 | Berkeley | 5,257,570 A | 11/1993 | Shiotani et al. |
| 4,621,300 A | 11/1986 | Summerer | 5,265,510 A | 11/1993 | Hoyer-Ellefsen |
| 4,625,604 A | 12/1986 | Handler et al. | 5,272,946 A | 12/1993 | McCullough et al. |
| 4,637,188 A | 1/1987 | Crothers | 5,276,431 A | 1/1994 | Piccoli et al. |
| 4,637,289 A | 1/1987 | Ramsden | 5,285,708 A | 2/1994 | Bosten et al. |
| 4,644,832 A | 2/1987 | Smith | 5,293,802 A | 3/1994 | Shiotani et al. |
| 4,653,189 A | 3/1987 | Andreasson | 5,320,382 A | 6/1994 | Goldstein et al. |
| 4,657,428 A | 4/1987 | Wiley | 5,321,230 A | 6/1994 | Shanklin et al. |
| 4,661,797 A | 4/1987 | Schmall | 5,331,875 A | 7/1994 | Mayfield |
| 4,672,500 A | 6/1987 | Tholome et al. | 5,353,670 A | 10/1994 | Metzger, Jr. |
| 4,675,664 A | 6/1987 | Cloutier et al. | 5,377,554 A | 1/1995 | Reulein et al. |
| 4,679,719 A | 7/1987 | Kramer | 5,377,571 A | 1/1995 | Josephs |
| 4,694,721 A | 9/1987 | Brickner, Jr. | 5,392,568 A | 2/1995 | Howard, Jr. et al. |
| 4,718,229 A | 1/1988 | Riley | 5,392,678 A | 2/1995 | Sasaki et al. |
| 4,721,023 A | 1/1988 | Bartlett et al. | 5,401,928 A | 3/1995 | Kelley |
| 4,722,021 A | 1/1988 | Hornung et al. | 5,411,221 A | 5/1995 | Collins et al. |
| 4,751,603 A | 6/1988 | Kwan | 5,423,232 A | 6/1995 | Miller et al. |
| 4,756,220 A | 7/1988 | Olsen et al. | 5,436,613 A | 7/1995 | Ghosh et al. |
| 4,757,881 A | 7/1988 | Jonsson et al. | 5,447,085 A | 9/1995 | Gochnauer |
| 4,774,866 A | 10/1988 | Dehari et al. | 5,451,750 A | 9/1995 | An |
| 4,792,965 A | 12/1988 | Morgan | 5,453,903 A | 9/1995 | Chow |
| 4,805,504 A | 2/1989 | Fushiya et al. | 5,471,888 A | 12/1995 | McCormick |
| 4,805,505 A | 2/1989 | Cantlin | 5,480,009 A | 1/1996 | Wieland et al. |
| 4,831,279 A | 5/1989 | Ingraham | 5,503,059 A | 4/1996 | Pacholok |
| 4,840,135 A | 6/1989 | Yamauchi | 5,510,587 A | 4/1996 | Reiter |
| 4,845,476 A | 7/1989 | Rangeard et al. | 5,510,685 A | 4/1996 | Grasselli |
| 4,864,455 A | 9/1989 | Shimomura et al. | 5,513,548 A | 5/1996 | Garuglieri |
| 4,875,398 A | 10/1989 | Taylor et al. | 5,531,147 A | 7/1996 | Serban |
| 4,888,869 A | 12/1989 | Leatherman | 5,534,836 A | 7/1996 | Schenkel et al. |
| 4,896,607 A | 1/1990 | Hall et al. | 5,572,916 A | 11/1996 | Takano |
| 4,906,962 A | 3/1990 | Duimstra | 5,587,618 A | 12/1996 | Hathaway |
| 4,907,679 A | 3/1990 | Menke | 5,592,353 A | 1/1997 | Shinohara et al. |
| 4,934,233 A | 6/1990 | Brundage et al. | 5,606,889 A | 3/1997 | Bielinski et al. |
| 4,936,876 A | 6/1990 | Reyes | 5,619,896 A | 4/1997 | Chen |
| 4,937,554 A | 6/1990 | Herman | 5,623,860 A | 4/1997 | Schoene et al. |
| 4,962,685 A | 10/1990 | Hagstrom | 5,647,258 A | 7/1997 | Brazell et al. |
| 4,964,450 A | 10/1990 | Hughes et al. | 5,648,644 A | 7/1997 | Nagel |
| 4,965,909 A | 10/1990 | McCullough et al. | 5,659,454 A | 8/1997 | Vermesse |
| 4,969,063 A | 11/1990 | Scott et al. | 5,667,152 A | 9/1997 | Mooring |
| 4,975,798 A | 12/1990 | Edwards et al. | 5,671,633 A | 9/1997 | Wagner |
| 5,020,406 A | 6/1991 | Sasaki et al. | 5,695,306 A | 12/1997 | Nygren, Jr. |
| 5,025,175 A | 6/1991 | Dubois, III | 5,700,165 A | 12/1997 | Harris et al. |
| 5,042,348 A | 8/1991 | Brundage et al. | 5,720,213 A | 2/1998 | Sberveglieri |
| 5,046,426 A | 9/1991 | Julien et al. | 5,722,308 A | 3/1998 | Ceroll et al. |
| 5,052,255 A | 10/1991 | Gaines | 5,724,875 A | 3/1998 | Meredith et al. |
| 5,074,047 A | 12/1991 | King | 5,730,165 A | 3/1998 | Philipp |
| 5,081,406 A | 1/1992 | Hughes et al. | 5,741,048 A | 4/1998 | Eccleston |
| 5,082,316 A | 1/1992 | Wardlaw | 5,755,148 A | 5/1998 | Stumpf et al. |
| 5,083,973 A | 1/1992 | Townsend | 5,768,786 A | 6/1998 | Kane et al. |
| 5,086,890 A | 2/1992 | Turczyn et al. | 5,771,742 A | 6/1998 | Bokaie et al. |
| 5,094,000 A | 3/1992 | Becht et al. | 5,782,001 A | 7/1998 | Gray |
| 5,116,249 A | 5/1992 | Shiotani et al. | 5,787,779 A | 8/1998 | Garuglieri |
| 5,119,555 A | 6/1992 | Johnson | 5,791,057 A | 8/1998 | Nakamura et al. |
| 5,122,091 A | 6/1992 | Townsend | 5,791,223 A | 8/1998 | Lanzer |
| 5,123,317 A | 6/1992 | Barnes, Jr. et al. | 5,791,224 A | 8/1998 | Suzuki et al. |
| 5,146,714 A | 9/1992 | Liiber | 5,791,441 A | 8/1998 | Matos et al. |
| 5,156,508 A | 10/1992 | Grisley | 5,797,307 A | 8/1998 | Horton |
| 5,174,349 A | 12/1992 | Svetlik et al. | 5,819,619 A | 10/1998 | Miller et al. |
| 5,184,534 A | 2/1993 | Lee | 5,819,625 A | 10/1998 | Sberveglieri |
| 5,198,702 A | 3/1993 | McCullough et al. | 5,852,951 A | 12/1998 | Santi |
| 5,199,343 A | 4/1993 | OBanion | 5,857,507 A | 1/1999 | Puzio et al. |
| 5,201,110 A | 4/1993 | Bane | 5,861,809 A | 1/1999 | Eckstein et al. |
| 5,201,684 A | 4/1993 | DeBois, III | 5,875,698 A | 3/1999 | Ceroll et al. |
| 5,201,863 A | 4/1993 | Peot | 5,880,954 A | 3/1999 | Thomson et al. |
| 5,206,625 A | 4/1993 | Davis | 5,921,367 A | 7/1999 | Kashioka et al. |
| 5,207,253 A | 5/1993 | Hoshino et al. | 5,927,857 A | 7/1999 | Ceroll et al. |
| 5,212,621 A | 5/1993 | Panter | 5,930,096 A | 7/1999 | Kim |
| 5,218,189 A | 6/1993 | Hutchison | 5,937,720 A | 8/1999 | Itzov |

| | | | | | | |
|---|---|---|---|---|---|---|
| 5,942,975 | A | 8/1999 | Sorensen | 6,640,683 B2 | 11/2003 | Lee |
| 5,943,932 | A | 8/1999 | Sberveglieri | 6,644,157 B2 | 11/2003 | Huang |
| 5,950,514 | A | 9/1999 | Benedict et al. | 6,647,847 B2 | 11/2003 | Hewitt et al. |
| 5,963,173 | A | 10/1999 | Lian et al. | 6,659,233 B2 | 12/2003 | DeVlieg |
| 5,974,927 | A | 11/1999 | Tsune | 6,684,750 B2 | 2/2004 | Yu |
| 5,989,116 | A | 11/1999 | Johnson et al. | 6,722,242 B2 | 4/2004 | Chuang |
| 6,009,782 | A | 1/2000 | Tajima et al. | 6,734,581 B1 | 5/2004 | Griffis |
| 6,018,284 | A | 1/2000 | Rival et al. | 6,736,042 B2 | 5/2004 | Behne et al. |
| 6,037,729 | A | 3/2000 | Woods et al. | 6,742,430 B2 | 6/2004 | Chen |
| D422,290 | S | 4/2000 | Welsh et al. | 6,796,208 B1 | 9/2004 | Jorgensen |
| 6,052,884 | A | 4/2000 | Steckler et al. | 6,800,819 B2 | 10/2004 | Sato et al. |
| 6,062,121 | A | 5/2000 | Ceroll et al. | 6,826,988 B2 | 12/2004 | Gass et al. |
| 6,070,484 | A | 6/2000 | Sakamaki | 6,826,992 B1 | 12/2004 | Huang |
| 6,095,092 | A | 8/2000 | Chou | 6,840,144 B2 | 1/2005 | Huang |
| 6,109,157 | A | 8/2000 | Talesky | 6,854,371 B2 | 2/2005 | Yu |
| 6,112,785 | A | 9/2000 | Yu | 6,857,345 B2 | 2/2005 | Gass et al. |
| 6,119,984 | A | 9/2000 | Devine | 6,874,397 B2 | 4/2005 | Chang |
| 6,131,629 | A | 10/2000 | Puzio et al. | 6,874,399 B2 | 4/2005 | Lee |
| 6,133,818 | A | 10/2000 | Shieh et al. | 6,877,410 B2 | 4/2005 | Gass et al. |
| 6,141,192 | A | 10/2000 | Garzon | 6,880,440 B2 | 4/2005 | Gass et al. |
| 6,148,504 | A | 11/2000 | Schmidt et al. | 6,883,397 B2 | 4/2005 | Kimizuka |
| 6,148,526 | A | 11/2000 | Kirn et al. | 6,889,585 B1 | 5/2005 | Harris et al. |
| 6,148,703 | A | 11/2000 | Ceroll et al. | 6,920,814 B2 | 7/2005 | Gass et al. |
| 6,150,826 | A | 11/2000 | Hokodate et al. | 6,922,153 B2 | 7/2005 | Pierga et al. |
| 6,161,459 | A | 12/2000 | Ceroll et al. | 6,945,148 B2 | 9/2005 | Gass et al. |
| 6,170,370 | B1 | 1/2001 | Sommerville | 6,945,149 B2 | 9/2005 | Gass et al. |
| 6,244,149 | B1 | 6/2001 | Ceroll et al. | 6,957,601 B2 | 10/2005 | Gass et al. |
| 6,250,190 | B1 | 6/2001 | Ceroll et al. | 6,968,767 B2 | 11/2005 | Yu |
| 6,257,061 | B1 | 7/2001 | Nonoyama et al. | 6,986,370 B1 | 1/2006 | Schoene et al. |
| 6,283,002 | B1 | 9/2001 | Chiang | 6,994,004 B2 | 2/2006 | Gass et al. |
| 6,295,910 | B1 | 10/2001 | Childs et al. | 6,997,090 B2 | 2/2006 | Gass et al. |
| 6,312,028 | B1 | 11/2001 | Wilkosz | 7,000,514 B2 | 2/2006 | Gass et al. |
| 6,325,195 | B1 | 12/2001 | Doherty | 7,024,975 B2 | 4/2006 | Gass et al. |
| 6,330,848 | B1 | 12/2001 | Nishio et al. | 7,047,854 B2 * | 5/2006 | Sako .......................... 83/58 |
| 6,336,273 | B1 | 1/2002 | Nilsson et al. | 7,055,417 B1 | 6/2006 | Gass et al. |
| 6,352,137 | B1 | 3/2002 | Stegall et al. | 7,077,039 B2 | 7/2006 | Gass et al. |
| 6,357,328 | B1 | 3/2002 | Ceroll et al. | 7,098,800 B2 | 8/2006 | Gass |
| 6,361,092 | B1 | 3/2002 | Eagle et al. | 7,100,483 B2 | 9/2006 | Gass et al. |
| 6,366,099 | B1 | 4/2002 | Reddi | 7,137,326 B2 | 11/2006 | Gass et al. |
| 6,376,939 | B1 | 4/2002 | Suzuki et al. | 7,171,879 B2 | 2/2007 | Gass et al. |
| 6,404,098 | B1 | 6/2002 | Kayama et al. | 7,197,969 B2 | 4/2007 | Gass et al. |
| 6,405,624 | B2 | 6/2002 | Sutton | 7,210,383 B2 | 5/2007 | Gass et al |
| 6,418,829 | B1 | 7/2002 | Pilchowski | 2002/0017175 A1 | 2/2002 | Gass et al. |
| 6,420,814 | B1 | 7/2002 | Bobbio | 2002/0017176 A1 | 2/2002 | Gass et al. |
| 6,427,570 | B1 | 8/2002 | Miller et al. | 2002/0017178 A1 | 2/2002 | Gass et al. |
| 6,430,007 | B1 | 8/2002 | Jabbari | 2002/0017179 A1 | 2/2002 | Gass et al. |
| 6,431,425 | B1 | 8/2002 | Moorman et al. | 2002/0017180 A1 | 2/2002 | Gass et al. |
| 6,450,077 | B1 | 9/2002 | Ceroll et al. | 2002/0017181 A1 | 2/2002 | Gass et al. |
| 6,453,786 | B1 | 9/2002 | Ceroll et al. | 2002/0017182 A1 | 2/2002 | Gass et al. |
| 6,460,442 | B2 | 10/2002 | Talesky et al. | 2002/0017184 A1 | 2/2002 | Gass et al. |
| 6,471,106 | B1 | 10/2002 | Reining | 2002/0017336 A1 | 2/2002 | Gass et al. |
| 6,479,958 | B1 | 11/2002 | Thompson et al. | 2002/0020261 A1 | 2/2002 | Gass et al. |
| 6,484,614 | B1 | 11/2002 | Huang | 2002/0020262 A1 | 2/2002 | Gass et al. |
| D466,913 | S | 12/2002 | Ceroll et al. | 2002/0020263 A1 | 2/2002 | Gass et al. |
| 6,492,802 | B1 | 12/2002 | Bielski | 2002/0020271 A1 | 2/2002 | Gass et al. |
| D469,354 | S | 1/2003 | Curtsinger | 2002/0043776 A1 | 4/2002 | Chuang |
| 6,502,493 | B1 | 1/2003 | Eccardt et al. | 2002/0050201 A1 | 5/2002 | Lane et al. |
| 6,530,303 | B1 | 3/2003 | Parks et al. | 2002/0056349 A1 | 5/2002 | Gass et al. |
| 6,536,536 | B1 | 3/2003 | Gass et al. | 2002/0059853 A1 | 5/2002 | Gass et al. |
| 6,543,324 | B2 | 4/2003 | Dils | 2002/0059854 A1 | 5/2002 | Gass et al. |
| 6,546,835 | B2 | 4/2003 | Wang | 2002/0069734 A1 | 6/2002 | Gass et al. |
| 6,564,909 | B1 | 5/2003 | Razzano | 2002/0088325 A1 | 7/2002 | Talesky et al. |
| 6,575,067 | B2 | 6/2003 | Parks et al. | 2002/0096030 A1 | 7/2002 | Wang |
| 6,578,460 | B2 | 6/2003 | Sartori | 2002/0096591 A1 | 7/2002 | Tanji |
| 6,578,856 | B2 | 6/2003 | Kahle | 2002/0109036 A1 | 8/2002 | Denen et al. |
| 6,581,655 | B2 | 6/2003 | Huang | 2002/0134212 A1 | 9/2002 | Ceroll et al. |
| 6,595,096 | B2 | 7/2003 | Ceroll et al. | 2002/0170399 A1 | 11/2002 | Gass et al. |
| D478,917 | S | 8/2003 | Ceroll et al. | 2002/0170400 A1 | 11/2002 | Gass |
| 6,601,493 | B1 | 8/2003 | Crofutt | 2002/0174755 A1 | 11/2002 | Behne et al. |
| 6,607,015 | B1 | 8/2003 | Chen | 2002/0190581 A1 | 12/2002 | Gass et al. |
| D479,538 | S | 9/2003 | Welsh et al. | 2003/0000359 A1 | 1/2003 | Eccardt et al. |
| 6,617,720 | B1 | 9/2003 | Egan, III et al. | 2003/0002942 A1 | 1/2003 | Gass et al. |
| 6,619,348 | B2 | 9/2003 | Wang | 2003/0005588 A1 | 1/2003 | Gass et al. |

| | | | |
|---|---|---|---|
| 2003/0015253 A1 | 1/2003 | Gass et al. | |
| 2003/0037651 A1 | 2/2003 | Gass et al. | |
| 2003/0037655 A1 | 2/2003 | Chin-Chin | |
| 2003/0056853 A1 | 3/2003 | Gass et al. | |
| 2003/0058121 A1 | 3/2003 | Gass et al. | |
| 2003/0074873 A1 | 4/2003 | Freiberg et al. | |
| 2003/0089212 A1 | 5/2003 | Parks et al. | |
| 2003/0090224 A1 | 5/2003 | Gass et al. | |
| 2003/0101857 A1 | 6/2003 | Chuang | |
| 2003/0109798 A1 | 6/2003 | Kermani | |
| 2003/0131703 A1 | 7/2003 | Gass et al. | |
| 2003/0140749 A1 | 7/2003 | Gass et al. | |
| 2003/0213349 A1 | 11/2003 | Chang | |
| 2004/0011177 A1 | 1/2004 | Huang | |
| 2004/0040426 A1 | 3/2004 | Gass et al. | |
| 2004/0060404 A1 | 4/2004 | Metzger, Jr. | |
| 2004/0103544 A1 | 6/2004 | Hartmann | |
| 2004/0104085 A1 | 6/2004 | Lang et al. | |
| 2004/0118261 A1 | 6/2004 | Garcia et al. | |
| 2004/0159198 A1 | 8/2004 | Peot et al. | |
| 2004/0194594 A1 | 10/2004 | Dils et al. | |
| 2004/0200329 A1 | 10/2004 | Sako | |
| 2004/0226424 A1 | 11/2004 | O'Banion et al. | |
| 2004/0226800 A1 | 11/2004 | Pierga et al. | |
| 2004/0255745 A1 | 12/2004 | Peot et al. | |
| 2005/0057206 A1 | 3/2005 | Uneyama | |
| 2005/0066784 A1 | 3/2005 | Gass | |
| 2005/0087049 A1 | 4/2005 | Miller | |
| 2005/0092149 A1 | 5/2005 | Hartmann | |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |
| 2005/0211034 A1 | 9/2005 | Sasaki et al. | |
| 2005/0235793 A1 | 10/2005 | O'Banion et al. | |
| 2005/0268767 A1 | 12/2005 | Pierga et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |
| 2006/0179983 A1 | 8/2006 | Gass et al. | |
| 2006/0191393 A1* | 8/2006 | Zhang et al. | 83/477.1 |
| 2006/0219076 A1 | 10/2006 | Gass et al. | |
| 2006/0225551 A1 | 10/2006 | Gass | |
| 2006/0230896 A1 | 10/2006 | Gass | |
| 2006/0247795 A1 | 11/2006 | Gass et al. | |
| 2006/0254401 A1 | 11/2006 | Gass et al. | |
| 2006/0272463 A1 | 12/2006 | Gass | |
| 2007/0028733 A1 | 2/2007 | Gass | |
| 2007/0079683 A1* | 4/2007 | Chen | 83/581 |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4326313 | 2/1995 |
| DE | 19609771 | 6/1998 |
| DE | 20102704 | 2/2001 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
*Tablesaw Splitters and Blade Covers*, Fine Woodworking, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
*Young Inventor: Teen's Device Earns Her Trip to Science Fair, The Arizona Republic*, May 5, 2006.
Operator Injury Mitigation Using Electronic Sensing and Mechanical Braking and Decoupling Devices in Handheld Circular Saws, Erin F. Eppard, date unknown.
Grizzly Industrial, Inc. Model G0605X/G0606X Extreme Series 12" Table Saw Owner's Manual, Grizzly Industrial, Inc., Oct. 2006.
*You Should Have Invented It*, French television show video/DVD.
Laguna Tools table saw owner's manual, date unknown.
Inca 2200 Table Saw Photo of Internal Mechanisms, around 1992.
Inca 2100SE Professional Tablesaw Owners Manual, Injecta Machinery, 1992.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
SI300N Circular with Tilting Blade Spare Parts Catalogue, SCM, Jun. 12, 2000.

SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Ryobi 10" Table Saw BT3100 Operator's Manual, Ryobi Technologies, Inc., Aug. 2002.
Laguna Tools Signature Series by Knapp, Oct. 21, 2002.
Rojek Circular Saw PK 300 Spare Part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI300S4 Circular with Tilting Blade Spare Parts Catalogue, SCM, Oct. 30, 2003.
Makita Model 2704 Exploded Drawings and Parts List, Nov. 2005.
Porter-Cable 10" Portable Table Saw 3812, Porter-Cable Corporation, 2005.
Porter Cable 10" Porter 10" Portable Table Saw Model 3812 Parts List with Guard Exploded View, 2005.
Makita Table Saw 2704 Instruction Manual, Makita Corporation of America, date unknown.
SCM SI 450 Circular saw with tilting blade product brochure, Villa Verucchio, Italy, undated.

* cited by examiner

Detail A

Detail B

Detail C

Detail D

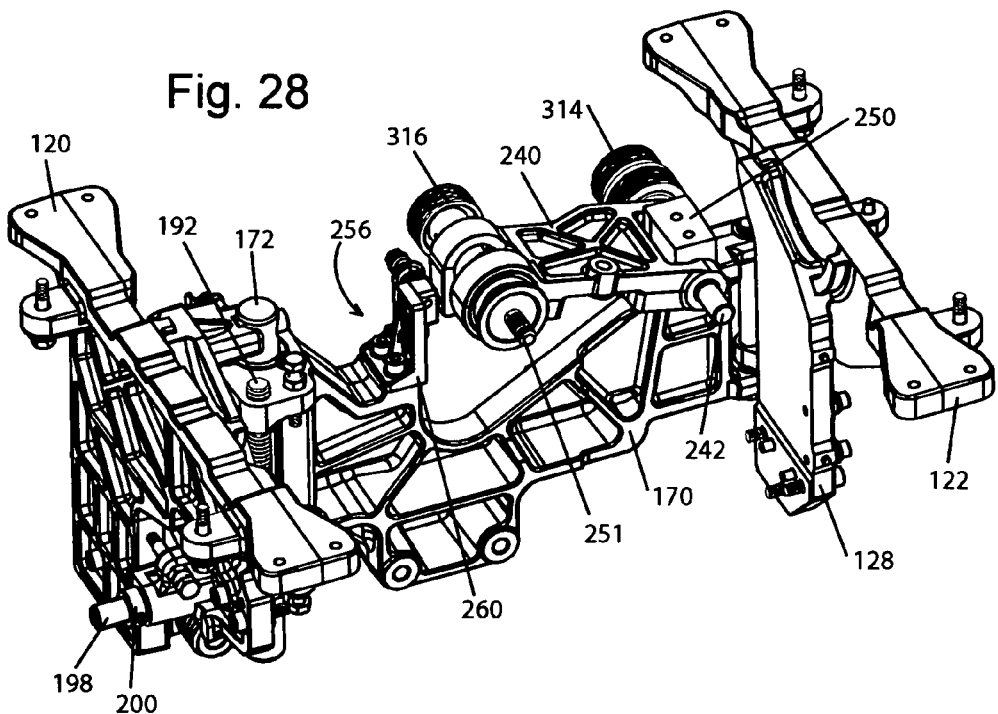
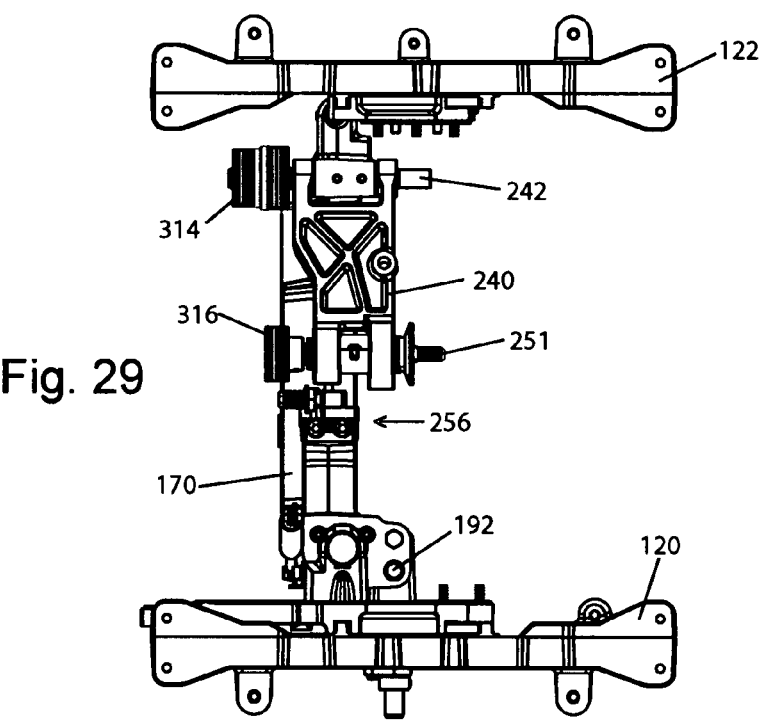

Detail E

Section 1-1

Detail F

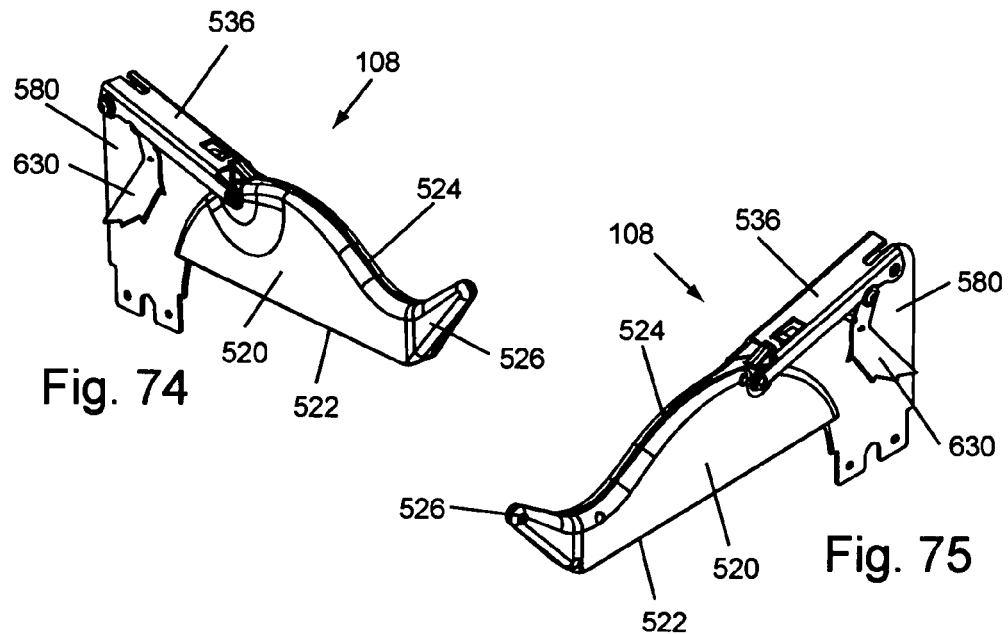
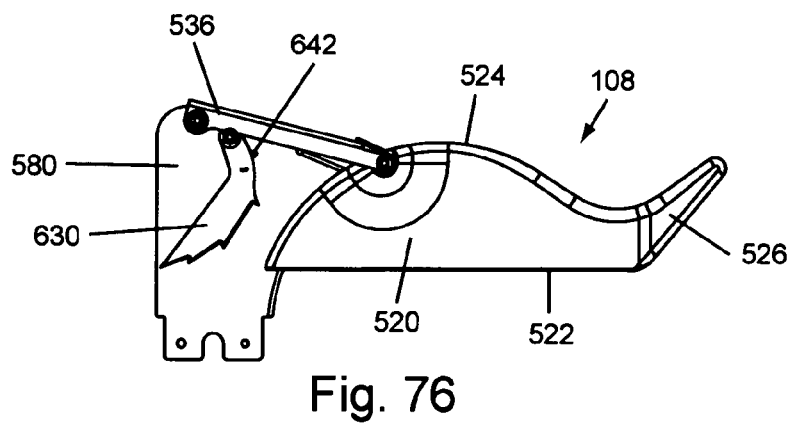
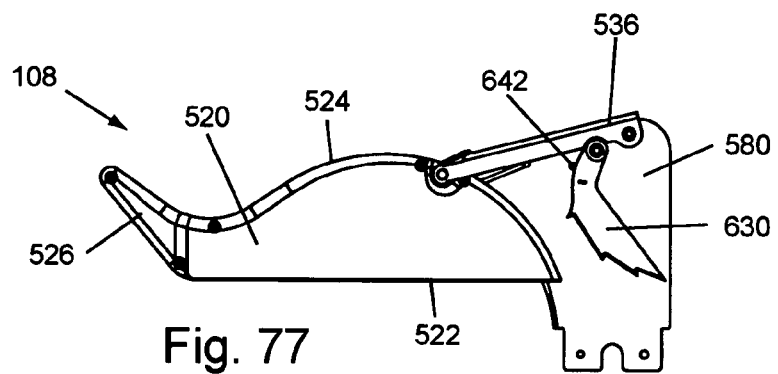

Detail G

ELEVATION MECHANISM FOR TABLE SAWS

CROSS-REFERENCE TO RELATED APPLICATION

This application is a continuation of U.S. patent application Ser. No. 11/026,114 filed Dec. 31, 2004, which in turn claimed the benefit of and priority from U.S. Provisional Patent Application Ser. No. 60/533,811 filed Dec. 31, 2003, and this application is also a continuation of U.S. patent application Ser. No. 11/045,972 filed Jan. 28, 2005, which in turn claimed the benefit of and priority from U.S. Provisional Patent Application Ser. No. 60/540,377 filed Jan. 29, 2004. The disclosures of all these applications are hereby incorporated by reference in their entireties.

TECHNICAL FIELD

This specification relates to table saws. More particularly, this specification relates to safety systems for table saws, to mounting systems for table saw attachments, and to table saw attachments such as riving knives, blade guards, splitters and anti-kickback devices.

BACKGROUND

A table saw is a power tool used to cut a work piece to a desired size or shape. A table saw includes a work surface or table and a circular blade extending up through the table. A person uses a table saw by holding a work piece on the table and feeding it past the spinning blade to make a cut. The table saw is one of the most basic machines used in woodworking.

The blade of a table saw, however, presents a risk of injury to a user of the saw. If the user accidentally places their hand in the path of the blade, or if their hand slips into the blade, then the user could receive a serious injury or amputation. Accidents also happen because of what is called kickback. Kickback may occur when a work piece contacts the downstream edge of the blade as it is being cut. The blade then propels the work piece back toward the user at a high velocity. When this happens, the user's hand may be carried into the blade because of the sudden and unexpected movement of the work piece Safety systems or features are often incorporated into table saws to minimize the risk of injury. Probably the most common safety feature is a guard that physically blocks an operator from making contact with the blade. In many cases, guards effectively reduce the risk of injury, however, there are many instances where the nature of the operations to be performed precludes using a guard that completely blocks access to the blade.

Another safety device sometimes incorporated into table saws is a riving knife. A riving knife is a fin-like plate positioned adjacent the rear edge of the saw blade and within the projected kerf and top-to-bottom cutting capacity of the blade. A riving knife functions to keep a work piece from shifting sideways and catching on the rear edge of the blade and being kicked back at the user by the blade. The riving knife is mounted in a table saw so that it remains in a fixed position relative to the blade as the blade tilts and changes elevation.

Some table saws include a spreader or splitter instead of a riving knife. A splitter is a flat plate, similar to a riving knife, but typically extending above the top-to-bottom cutting capacity of the blade so that a blade guard can be mounted thereto. An anti-kickback device such as anti-kickback pawls, which are toothed pawls positioned to oppose a work piece being thrown back toward a user, are often mounted on the splitter. Splitters typically tilt with the blade, but do not move up and down with the blade.

Other safety systems have been developed to detect when a human body contacts a predetermined portion of a machine, such as detecting when a user's hand touches the moving blade on a saw. When that contact is detected, the safety systems react to minimize injury. These systems may be used in conjunction with table saw attachments such as blade guards, riving knives, splitters and anti-kickback pawls.

The present document discloses improved table saws, table saw components, systems to mount and index table saw attachments, and table saw attachments such as riving knives, blade guards, splitters and anti-kickback pawls.

BRIEF DESCRIPTION OF THE DRAWINGS

FIG. 28 is a perspective top view of part of the internal mechanism of the saw shown in FIG. 3, including an elevation plate and arbor assembly.

FIG. 29 is a bottom view of the components shown in FIG. 28.

FIG. 74 shows a blade guard assembly.

FIG. 75 shows another view of the blade guard assembly shown in FIG. 74.

FIG. 76 shows still another view of the blade guard assembly shown in FIG. 74.

FIG. 77 shows yet another view of the blade guard assembly shown in FIG. 74.

DETAILED DESCRIPTION

Figure 1:
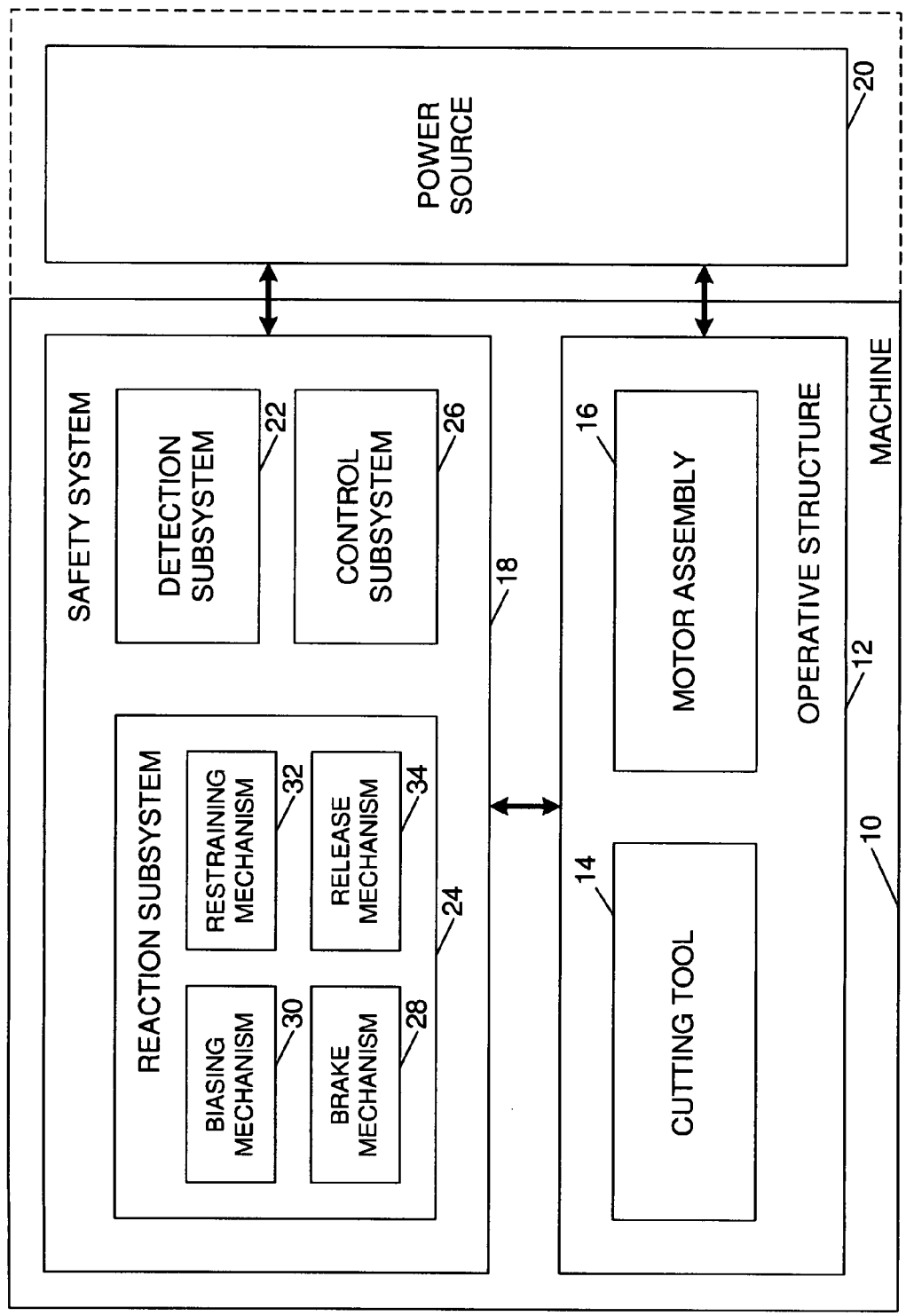
FIG. 1 is a schematic block diagram of a machine with a fast-acting safety system.

A machine that incorporates a safety system to detect and react to a dangerous condition, such as human contact with a designated portion of the machine, is shown schematically in FIG. 1 and indicated generally at 10. Machine 10 may be any of a variety of different machines, such as table saws, miter saws, band saws, jointers, shapers, routers, hand-held circular saws, up-cut saws, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. patent application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
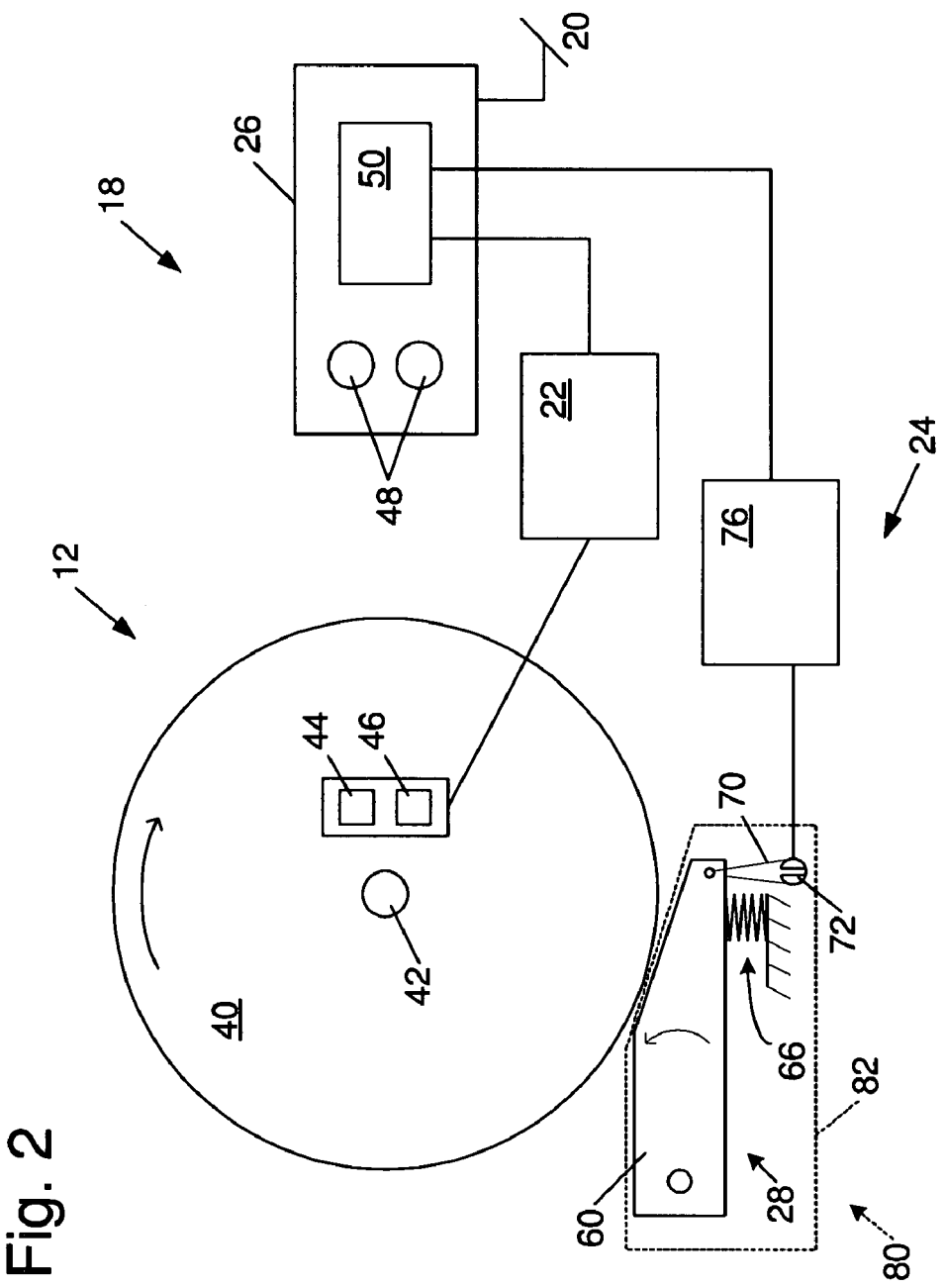
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," and U.S. Provisional Patent Application Ser. No. 60/496,550, entitled "Table Saws With Safety Systems," the disclosures of which are herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," U.S. Patent Application Publication No. 2003/0090224 A1, entitled "Detection System for Power Equipment," and U.S. Provisional Patent Application Ser. No. 60/533,791, entitled "Improved Detection Systems for Power Equipment," the disclosures of which are all herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," U.S. Patent Application Publication No. 2003/0058121 A1, entitled "Logic Control With Test Mode for Fast-Acting Safety System," U.S. Provisional Patent Application Ser. No. 60/496,568, entitled "Motion Detecting System for use in a Safety System for Power Equipment," and U.S. Provisional Patent Application Ser. No. 60/533,598, titled "Switch Box for Power Tools with Safety Systems," the disclosures of which are all herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,574, entitled "Brake Cartridges for Power Equipment," the disclosures of which are herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
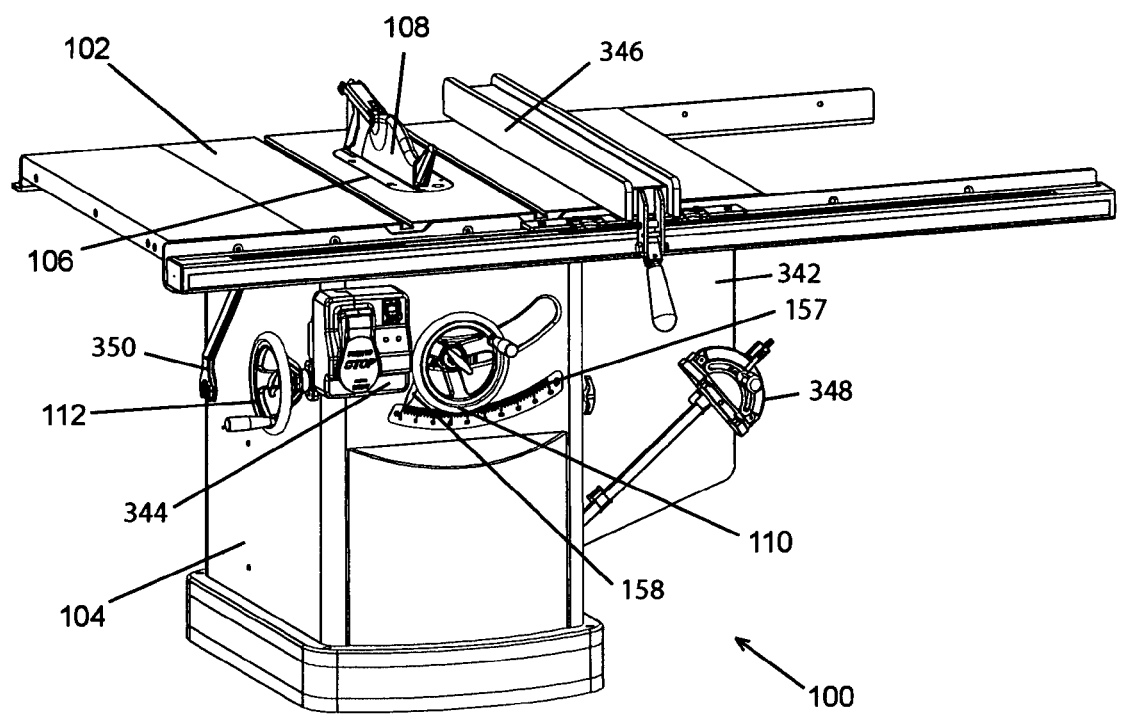
FIG. 3 shows a table saw.

A table saw adapted to implement features of the safety systems described above is shown at 100 in FIG. 3. Saw 100 is often called a cabinet saw or a tilting-arbor saw. The saw includes a table 102 on which a work piece may be cut. The table is supported by a cabinet 104. A blade 105 (labeled in FIGS. 4 through 7) extends up through an opening 106 in the table and a blade guard 108 covers the blade. Hand wheels 110 and 112 may be turned to adjust the elevation of the blade (the height the blade extends above the table) and the tilt of the blade relative to the tabletop, respectively. In operation, a user turns the hand wheels to position the blade as desired and then makes a cut by pushing a work piece on the table past the spinning blade.

FIGS. 4 through 7 show various views of the internal mechanism of saw 100. FIGS. 8 through 13 show additional views of the internal mechanism of the saw, but with the table removed. The remaining figures show various components and mechanisms that may be used in the saw.

Table 102 is bolted onto a front trunnion bracket 120 and a back trunnion bracket 122 by bolts 124 (the bolts are shown best in FIGS. 10 through 13). The trunnion brackets, in turn, are bolted onto and supported by cabinet 104 through holes such as hole 107 shown in FIG. 8. The cabinet is constructed to support the weight of the table and the internal mechanism of the saw. Alternatively, table 102 could be secured directly to the cabinet or some other support instead of to the trunnions.

Figure 4:
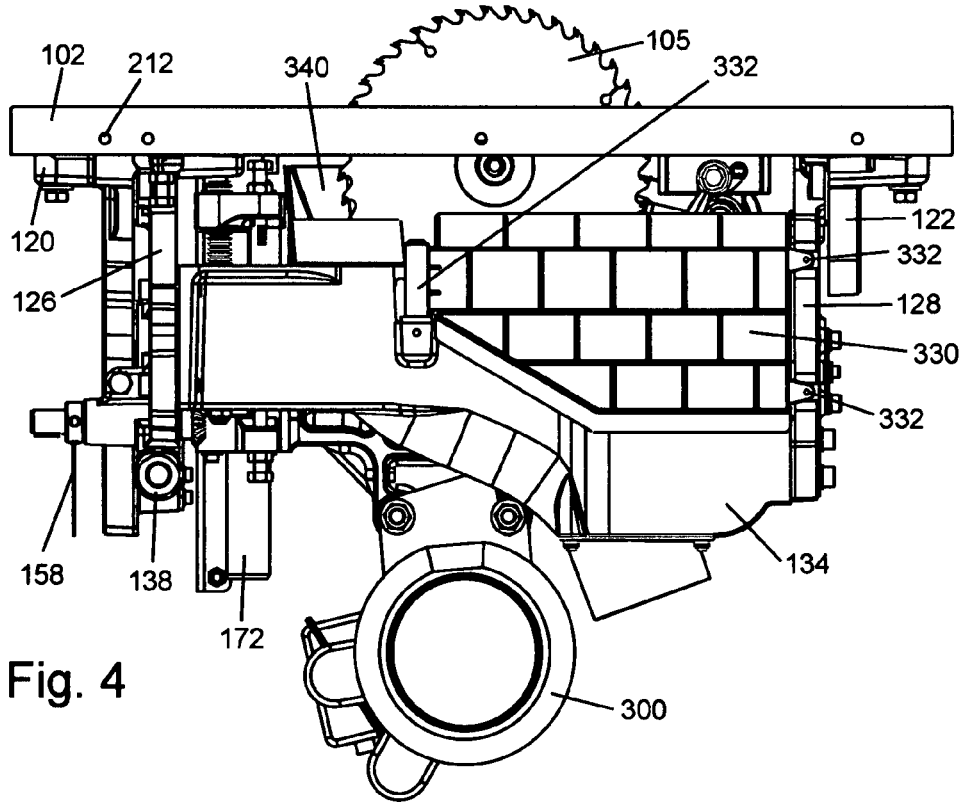
FIG. 4 shows a right-side view of the internal mechanism of the saw shown in FIG. 3.
Figure 5:
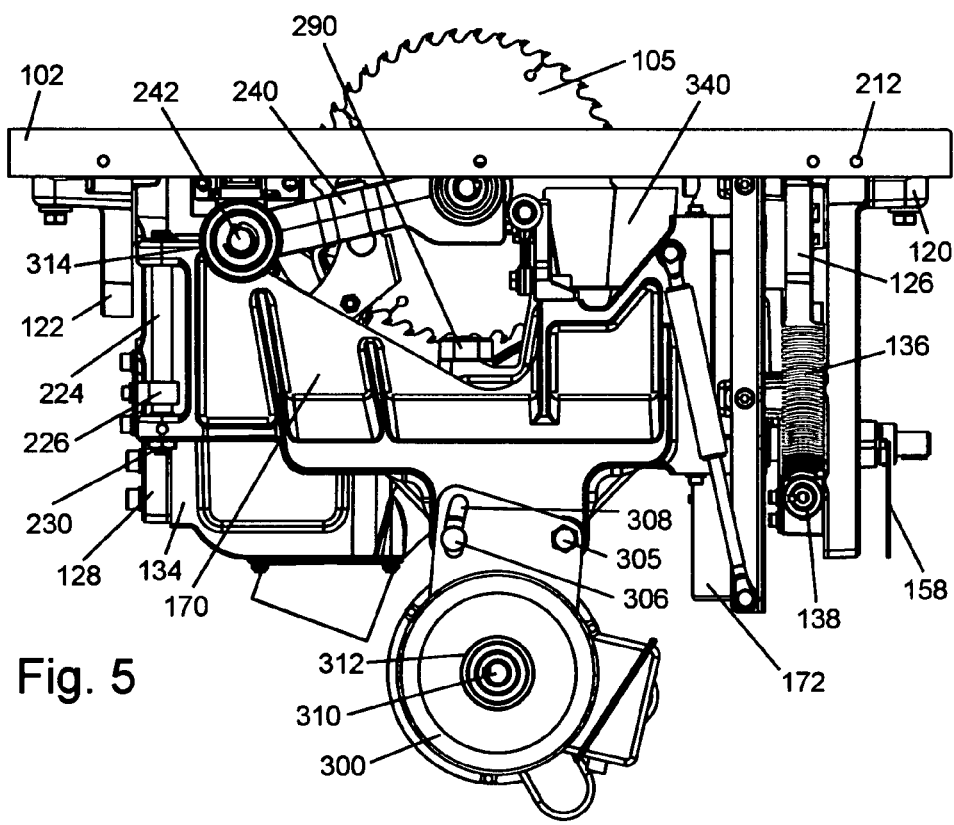
FIG. 5 shows a left-side view of the internal mechanism of the saw shown in FIG. 3.
Figure 13:
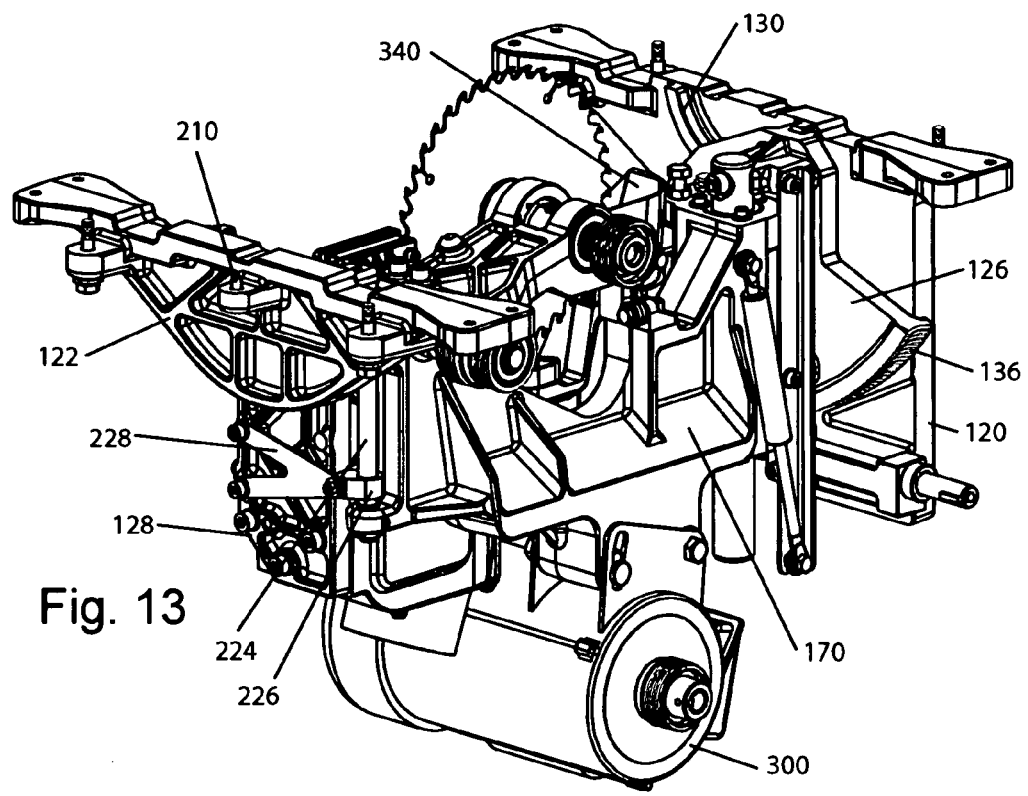
FIG. 13 shows a back-left perspective view of the internal mechanism of the saw.

It is important for the table to be positioned properly relative to the blade. Typically, the front edge of the table should be as perpendicular to the plane of the blade as possible in order to make straight, square cuts. There are many mechanisms by which the position of the table relative to the blade can be adjusted. FIGS. 4, 5, and 13 show one such mechanism. A pin 210 extends up from a flange in rear trunnion bracket 122, as shown in FIG. 13. That pin is positioned substantially in the side-to-side center of the rear trunnion bracket. Pin 210 extends up into a corresponding socket on the underside of the back edge of the table and the table is able to pivot around the pin. Table 102 includes two holes 212, one in the right front side of the table and one in the left front side, as shown in FIGS. 4 and 5. A bolt is threaded into each of those holes and extends through the side of the table. Holes 212 are positioned so that when the bolts are threaded through the holes, the ends of the bolts abut the right and left sides of the front trunnion bracket, respectively. Those sides are labeled 213 in FIG. 8. Threading a bolt farther into its hole will cause the bolt to push against the front trunnion bracket and the table will then pivot around pin 210. Thus, the position or squareness of the table relative to the blade can be adjusted by threading the bolts into holes 212 a desired amount.

Saw 100 also includes front and rear tunnnions 126 and 128. These trunnions are supported in the saw by the front and rear trunnion brackets, respectively. Each trunnion bracket includes an arcuate tongue or flange 130 (best seen in FIGS. 10 through 13), and the front and rear trunnions each include a corresponding arcuate groove 132 (grooves 132 are labeled in FIGS. 10 and 12). Trunnion brackets 120 and 122 support trunnions 126 and 128 by flanges 130 extending into corresponding grooves 132. In this manner, the flanges provide a shoulder or surface on which the trunnions may rest. The arcuate tongue and groove connections also allow the trunnions to slide relative to the trunnion brackets. When the trunnions slide on the trunnion brackets, the blade of the saw tilts relative to the tabletop because the blade is supported by the trunnions, as will be explained below.

A trunnion brace 134 extends between and interconnects the front and rear trunnions so that the trunnions move together. The trunnion brace also holds the front and rear trunnions square and prevents the trunnions from moving off flanges 132 when the mechanism is assembled. The trunnion brackets, trunnions and trunnion brace are shown isolated from other structure in FIGS. 14 through 16.

The trunnions and trunnion brace are tilted relative to the trunnion brackets by gears. A rack gear 136 is cut into an edge of front trunnion 126, and a worm gear 138 is mounted on front trunnion bracket 120 to mesh with the rack gear. This arrangement is shown in detail in FIGS. 17 through 20. Worm gear 138 is mounted on a shaft 140 and the shaft is supported in a bracket 142. A collar 143 holds the shaft in place in the bracket. Bracket 142 is bolted onto front trunnion bracket 120 by bolts 144. The bolts pass through oversized holes in the front trunnion bracket and thread into holes in bracket 142. The oversized holes in the front trunnion bracket allow for adjustment of the position of bracket 142 up or down relative to the rack gear. Being able to adjust the position of the bracket up or down is important in order to make sure the rack and worm gears mesh properly. Of course, the oversized holes may be in bracket 142 and the threaded holes may be in the front trunnion bracket.

Figure 37:
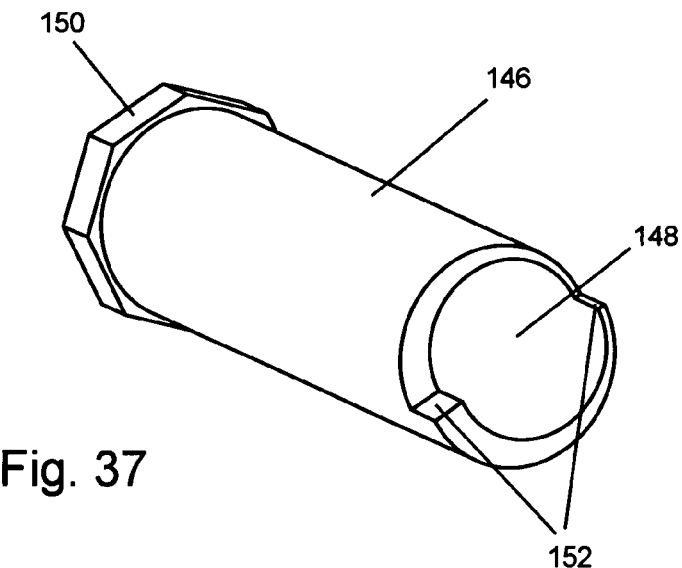
FIG. 37 shows an eccentric bushing.
Figure 38:
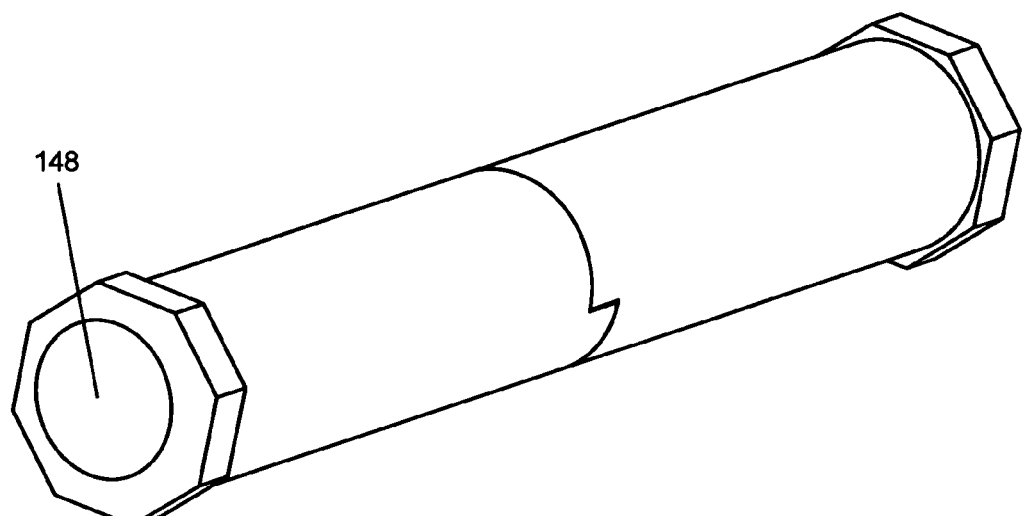
FIG. 38 shows two eccentric bushings end-to-end.

Other mechanisms also may be used to align worm gear 138 with rack gear 136. One such mechanism is one or more eccentric bushings that hold shaft 140 in bracket 142. The bushings may be turned to move shaft 140 and worm gear 138 toward or away from rack gear 136 to make sure the gears mesh properly. A possible eccentric bushing is shown in FIG. 37 at 146. The bushing includes a hole 148 positioned off-center from the longitudinal axis of the bushing, a hex head 150 to allow a person to turn the bushing, and shoulders 152. The bushing is configured so that two such bushings may be positioned end to end, as shown in FIG. 38, and shaft 140 may be supported in the resulting hole 148. When the bushings are positioned in bracket 142, turning either of the two hex heads 150 with a wrench will cause both bushings to turn because shoulders 152 abut, and turning the bushings will cause shaft 140 and worm gear 138 to move toward or away from rack gear 136 because hole 148 is off center.

Figure 18:
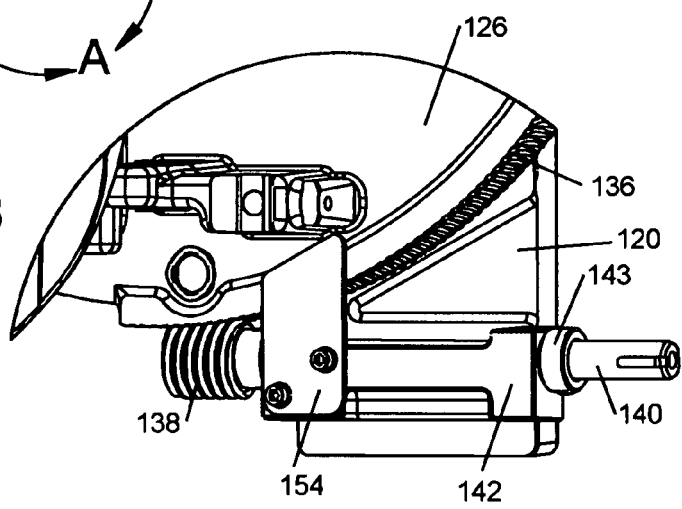
FIG. 18 is the detail view of the portion labeled "A" in FIG. 17, showing part of a tilt control mechanism.
Figure 19:
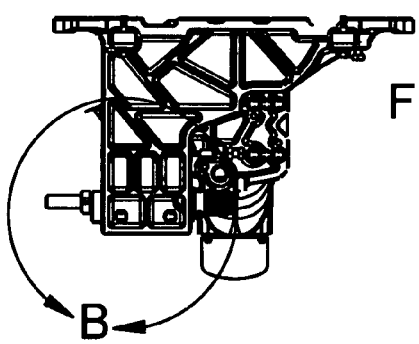
FIG. 19 shows part of the internal mechanism of the saw with a portion labeled "B" designated for a detailed view.
Figure 20:
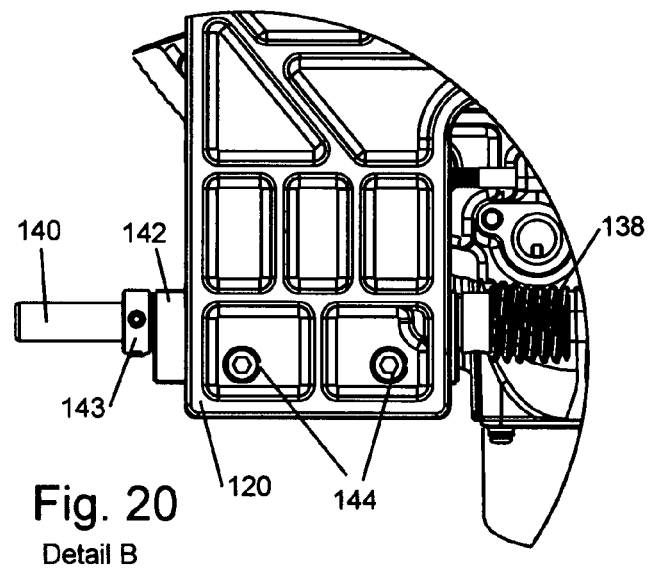
FIG. 20 is the detail view of the portion labeled "B" in FIG. 19, showing part of a tilt control mechanism.

Shaft 140 extends out through a hole in cabinet 104 and hand wheel 112 is mounted on the shaft. When a user turns hand wheel 112 and shaft 140, worm gear 138 meshes with rack gear 136 causing the trunnions to move and the blade to tilt relative to the tabletop. A plate 154 is bolted to bracket 142 and extends up past rack gear 136, as shown in FIG. 18, to help prevent the bottom of front trunnion 126 from moving away from the front trunnion bracket and to help maintain the rack gear and worm gear in position.

Figure 6:
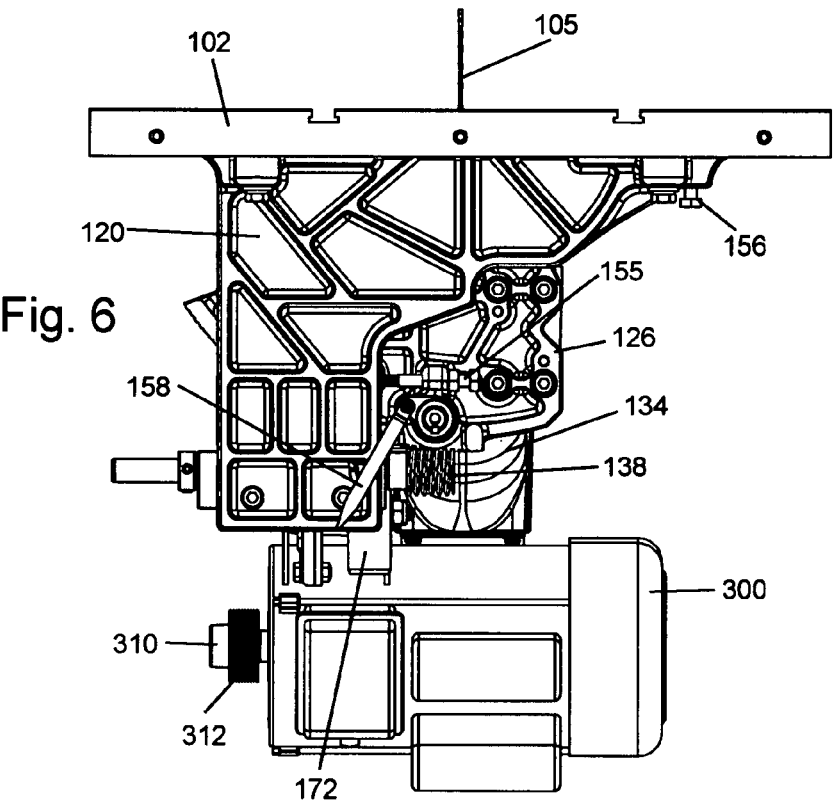
FIG. 6 shows a front view of the internal mechanism of the saw shown in FIG. 3.
Figure 7:
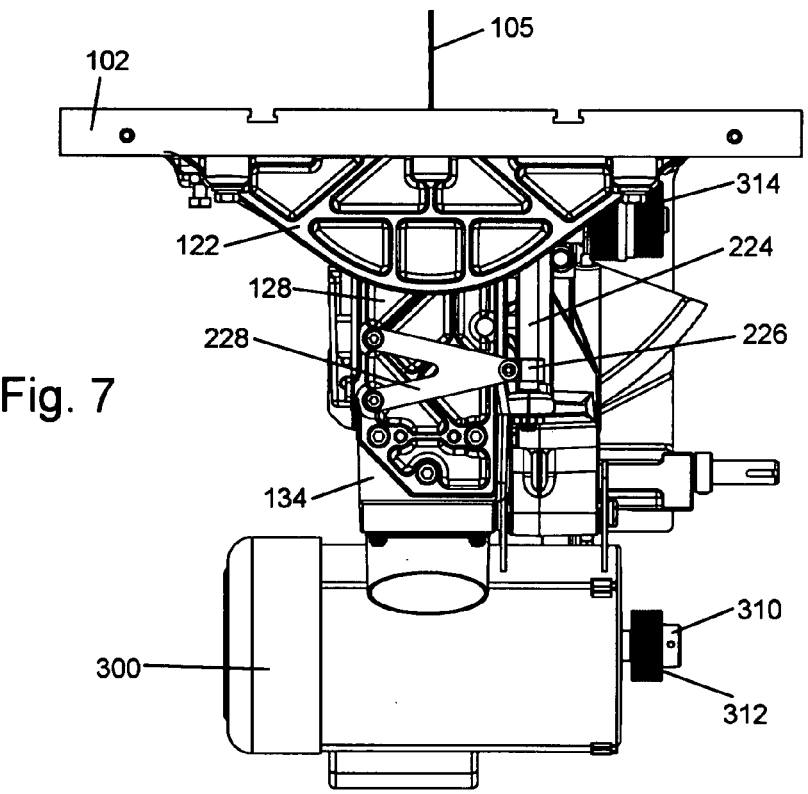
FIG. 7 shows a back view of the internal mechanism of the saw shown in FIG. 3.
Figure 8:
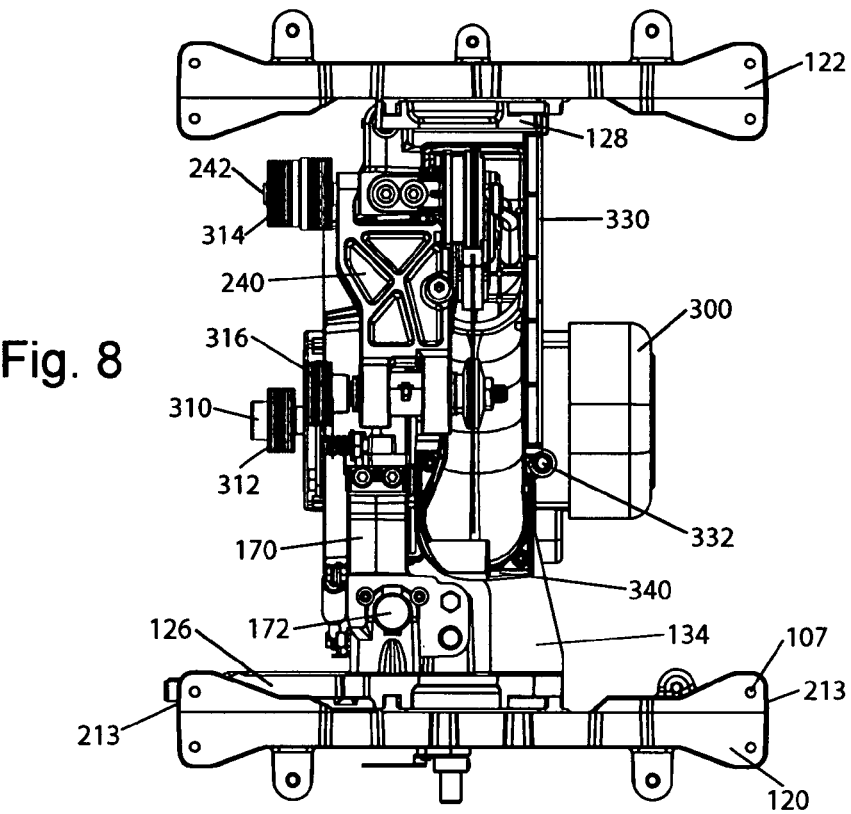
FIG. 8 shows a top view of the internal mechanism of the saw shown in FIG. 3 with the table removed.
Figure 9:
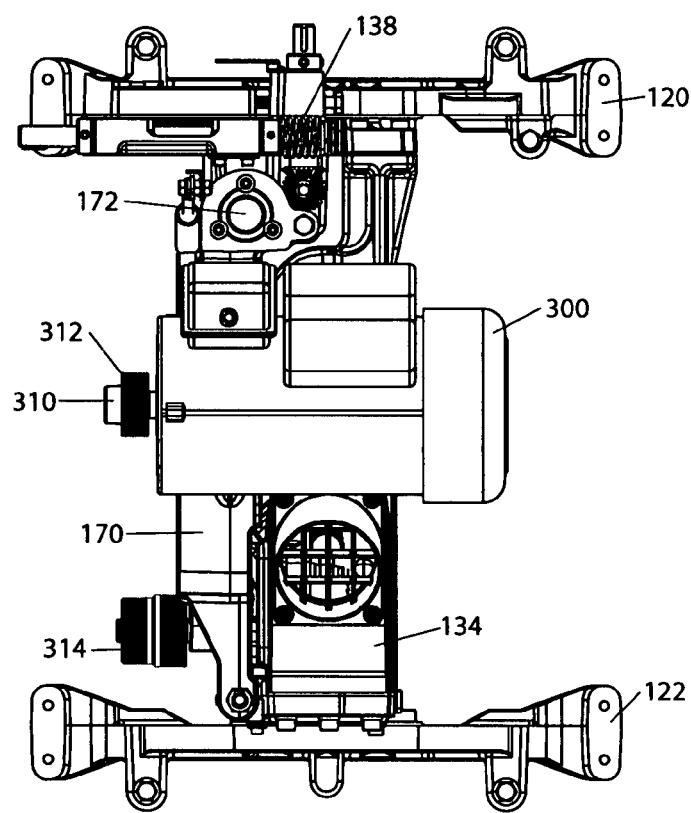
FIG. 9 shows a bottom view of the internal mechanism of the saw shown in FIG. 3.

Stops 155 and 156, shown best in FIG. 6, limit the distance that the trunnions and trunnion brace may move. Stop 155 comprises a bolt threaded through a shoulder in the front trunnion bracket and a lock nut to hold the bolt in place. The bolt is positioned so that it will abut a side edge of the front trunnion bracket when the front trunnion is at one limit of its movement, as shown in FIG. 6. Stop 156 comprises a bolt threaded into a hole in the front trunnion bracket (also shown in FIG. 25). A lock nut or some other means may be used to hold the bolt in place. The bolt is positioned so that the front trunnion will abut the head of the bolt when the front trunnion is at the opposite limit of its movement. The distance the trunnions may move can be adjusted by threading the bolts in stops 155 and 156 in or out, as desired.

Saw 100 typically includes a label 157 mounted on the front of the cabinet. Label 157 includes angle demarcations to indicate the degree the blade tilts relative to the tabletop. A pointer 158 is mounted on or adjacent shaft 140 to point to the angle demarcations on label 157. For instance, when the blade is tilted 45 degrees relative to the tabletop, pointer 158 would point to the 45 degree mark on label 157. In the depicted embodiment, pointer 158 is mounted to the front trunnion, adjacent shaft 140.

Saw 100 also includes an elevation carriage shown as elevation plate 170. The elevation plate is supported by the front and rear trunnions and tilts with the trunnions. The blade is supported on the elevation plate, as will be described, so tilting the elevation plate causes the blade to tilt. The elevation plate is also configured to move up and down relative to the trunnions. Moving the elevation plate up and down is what causes the blade to move up and down relative to the tabletop.

Figure 39:
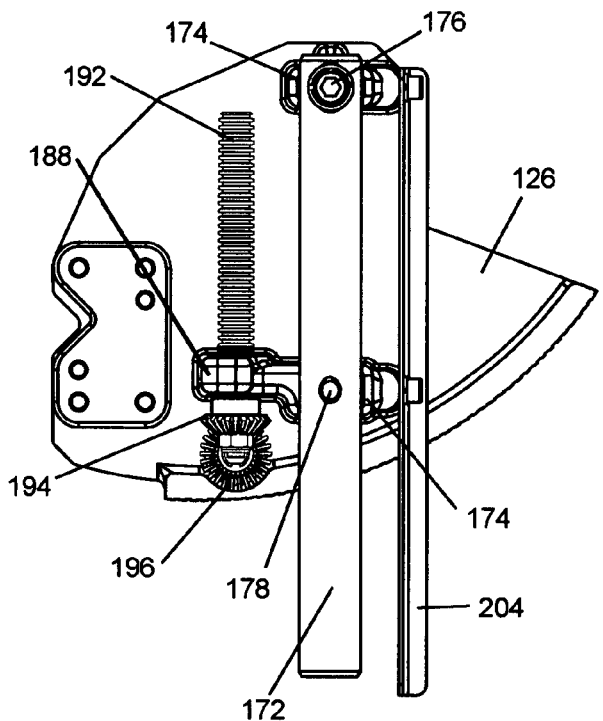
FIG. 39 shows shafts used in the elevation system of the saw shown in FIG. 3.
Figure 40:
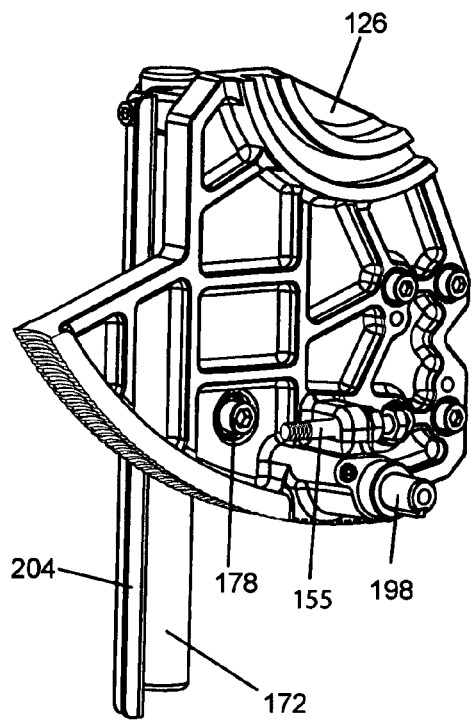
FIG. 40 is a different view of the portion of the elevation system shown in FIG. 39.
Figure 41:
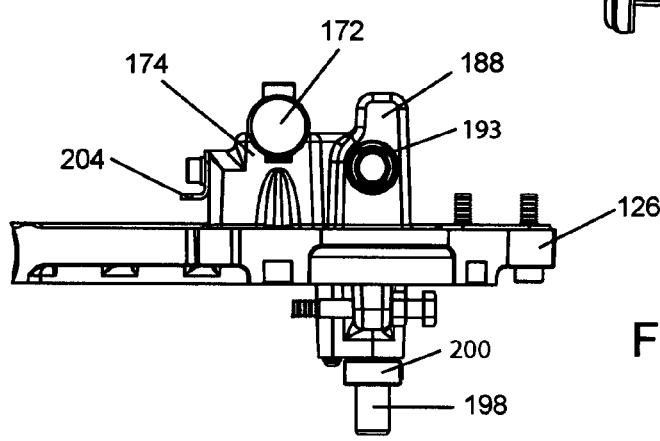
FIG. 41 is a top view of the portion of the elevation system shown in FIG. 39.
Figure 42:
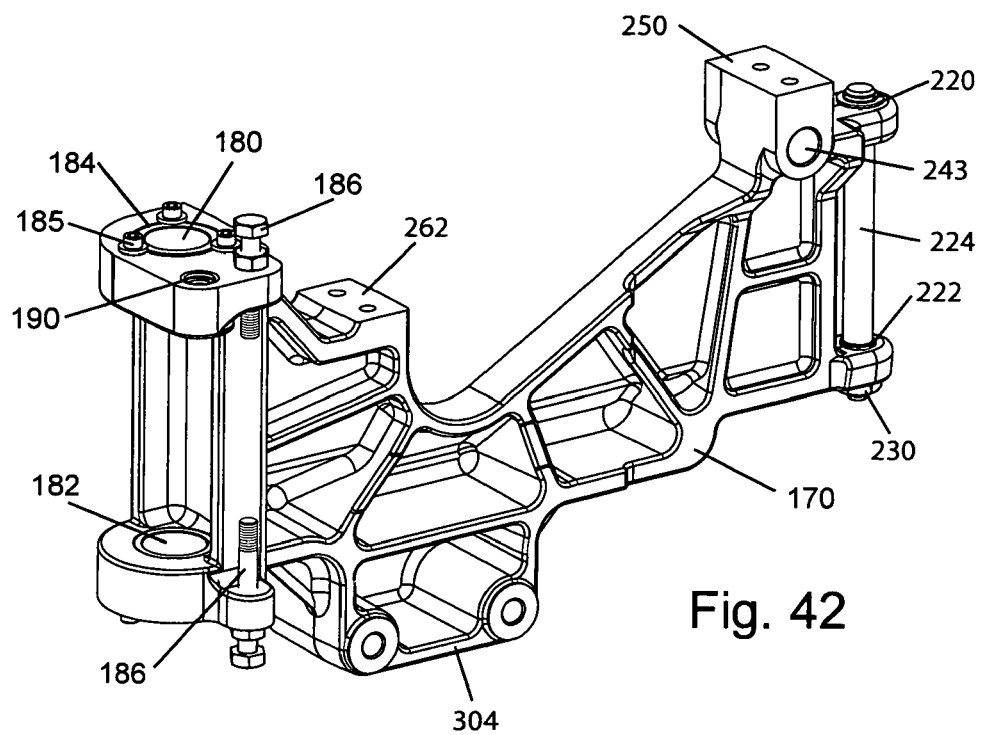
FIG. 42 is a perspective, right-side view of an elevation plate.

Elevation plate 170 includes two bores 180 and 182, labeled in FIG. 42. A bushing 184, which may be made from oil impregnated bronze, fits into each bore and is held in place by screws and washers 185. The washers overlap the edge of the bushing to prevent the bushing from moving out of the bore. A support shaft 172 fits into bores 180 and 182, as shown in FIGS. 21 through 26, and elevation plate 170 is free to slide up and down on the shaft. Shaft 172 is bolted onto front trunnion 126 to connect the elevation plate to the front trunnion. In the depicted embodiment, shaft 172 fits into two notches 174 in front trunnion 126. Bolts 176 and 178 then secure the shaft to the front trunnion, as shown in FIGS. 39 through 41. Bolt 176 extends through shaft 172 and threads into a hole in the front trunnion. Bolt 178 extends through the front trunnion and threads into shaft 172. In this manner the shaft is securely anchored to the front trunnion. Shaft 172 may be mounted to the front trunnion in other ways as well.

Figure 21:
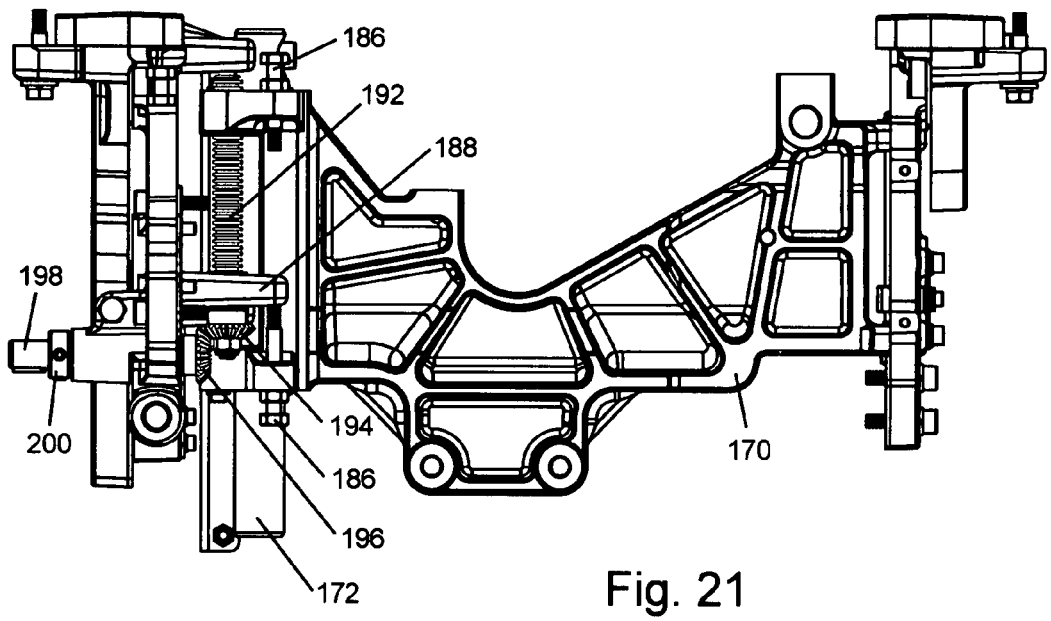
FIG. 21 shows a right-side view of an elevation plate and elevation system.
Figure 22:
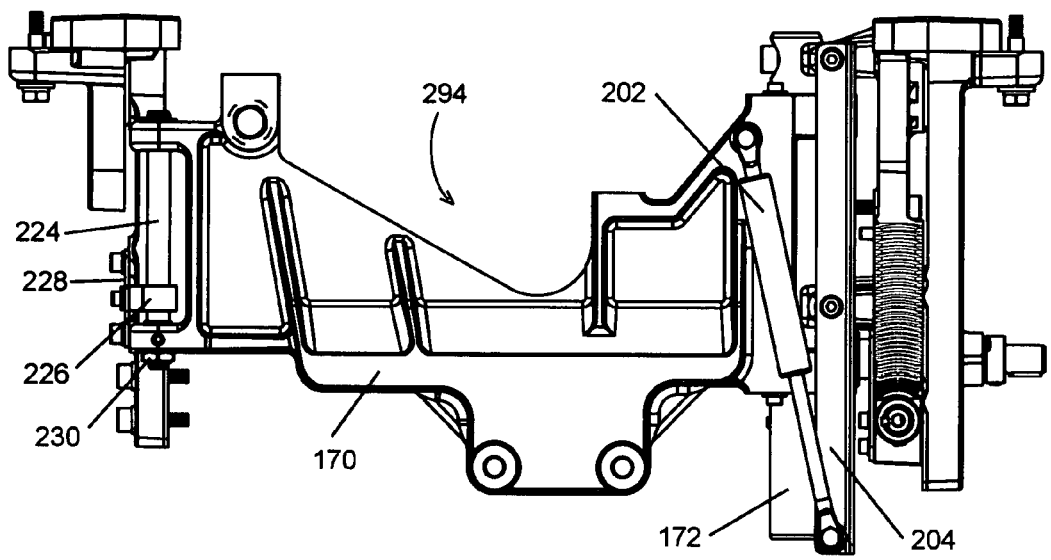
FIG. 22 shows a left-side view of an elevation plate and elevation system.
Figure 23:
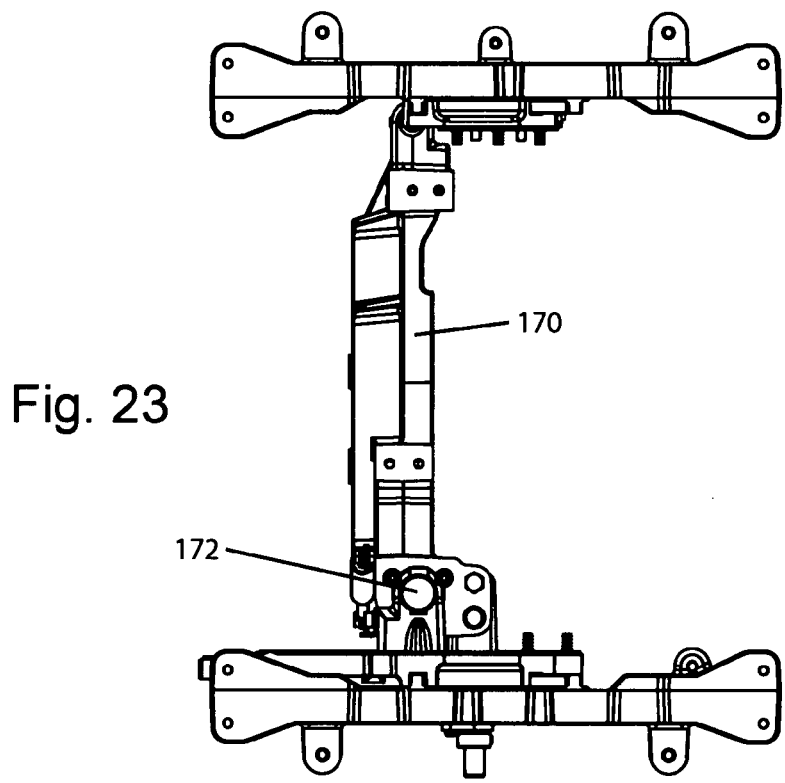
FIG. 23 shows a top view of an elevation plate and elevation system.
Figure 24:
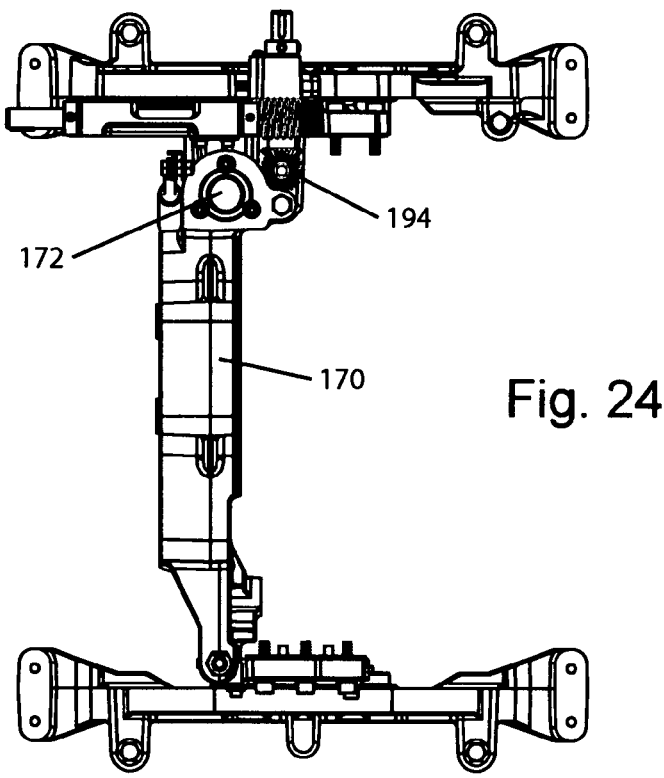
FIG. 24 shows a bottom view of an elevation plate and elevation system.

The distance elevation plate 170 may slide up and down on shaft 172 is ultimately defined by the spacing between notches 174 on front trunnion 126 and the spacing between bores 180 and 182 on the elevation plate. That distance, however, may be further defined by adjustable stops 186 shown in FIG. 42. These stops are made of bolts threaded through holes in the elevation plate and lock nuts to hold the bolts in place, as shown. The bolts are positioned so they abut a shoulder 188 extending out from the front trunnion bracket, as shown in FIG. 21. (Shoulder 188 is also shown in FIGS. 39 and 41.) The distance the elevation plate may slide up or down on shaft 172 is thus defined by how far the stops or bolts extend.

Elevation plate 170 also includes a threaded bore 190 configured to accept a threaded shaft 192, shown best in FIGS. 21, 28 and 39. Shaft 192 also extends through a bore 193 in shoulder 188 on the front trunnion bracket to further support the shaft (bore 193 is labeled in FIGS. 15 and 41). The threaded shaft may be held in bore 193 in any manner, such as by clips or collars. A bevel gear 194 is mounted on the end of shaft 192 below shoulder 188. A second bevel gear 196 is mounted on a shaft 198 that extends perpendicularly relative to shaft 192. Shaft 198 extends through and is supported for rotation by the front trunnion. A collar 200 holds shaft 198 in place. Shafts 192 and 198 are positioned so that the two bevel gears mesh. Shaft 198 also extends through a hole in cabinet 104 and hand wheel 110 is mounted on the shaft. When a person turns hand wheel 110, bevel gear 196 causes threaded shaft 192 to turn. When threaded shaft 192 turns, elevation plate 170 moves up or down on the shaft because hole 190 is threaded. Moving the elevation plate up and down causes the blade to move up and down relative to the tabletop. In this manner, a user may adjust the elevation of the blade.

The construction of elevation plate 170 and shafts 172 and 192 may be referred to as a vertical slide because the elevation plate slides vertically on shaft 172. Other constructions of vertical slides are also possible, such as using one or move dovetail slides instead of a shaft. Multiple vertical shafts may also be used instead of one shaft and multiple vertical shafts may be spaced apart to support the elevation plate. Shafts or dovetail slides may also be positioned at each end of the elevation plate instead of at one end only.

Additionally, a motor may be used instead of hand wheel 110 to turn the bevel gears to raise or lower the elevation plate, or a motorized lift may be used instead of the bevel gears. The motor or lift may be actuated by a typical switch or by a switch configured to be similar to a hand wheel.

Elevation plate 170, and any components attached to the elevation plate (such as a motor, as will be discussed below), may have significant weight and therefore it may be difficult to turn hand wheel 110 to raise the blade. Accordingly, the depicted embodiment includes a gas spring 202 mounted at one end to the elevation plate and at the other end to a bracket 204 mounted to the front trunnion, as shown best in FIGS. 25 and 26. The gas spring is biased to push the elevation plate up with a predetermined amount of force to make it easy for a user to turn hand wheel 110 to raise the blade. The force of the gas spring may be selected so that the elevation plate is biased up or down to take out any play or slack between threaded shaft 192 and threaded bore 190. Forces in the range of 50 to 250 pounds may be used, depending on how much weight must be lifted.

It is important that elevation plate 170 be restricted from any side-to-side motion or rotation around the longitudinal axis of support shaft 172 in order to hold the saw blade straight, and support shaft 172 and threaded shaft 192 limit how the elevation plate may move. However, in the depicted embodiment, because the elevation plate is relatively long and supported principally at one end, and also because of manufacturing tolerances in shafts 172 and 192 and their corresponding bores in the elevation plate, there is a risk that the elevation plate may move slightly in an undesired manner, especially if the elevation plate is tilted. Accordingly, elevation plate 170 includes bores 220 and 222 in two projections at the distal end of the elevation plate, opposite bores 180 and 182, and a guide shaft 224 is mounted in the bores. The guide shaft may be held in the bores by clips, bolts, or any other method.

Figure 25:
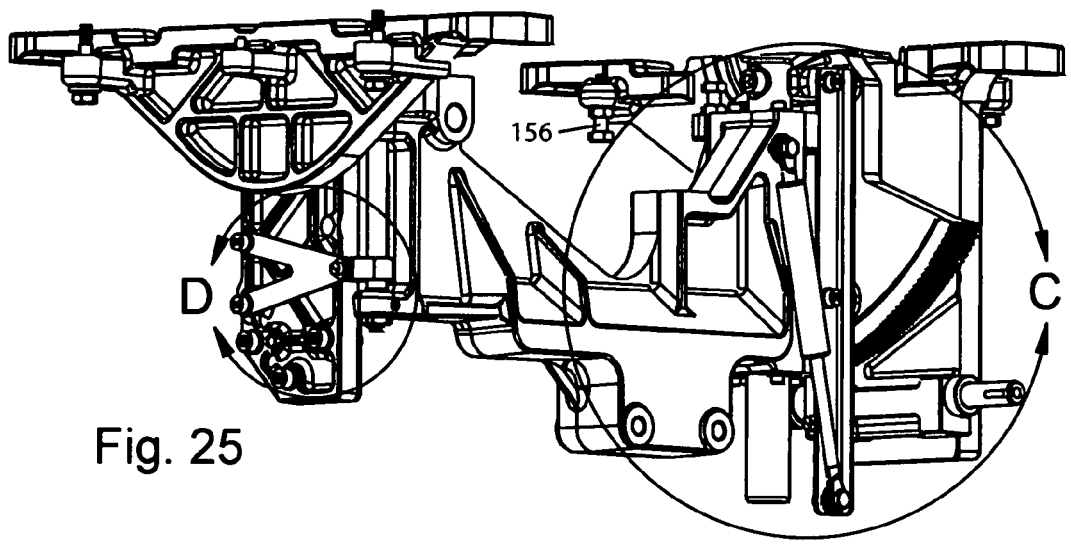
FIG. 25 shows a perspective view of an elevation plate and elevation system with portions labeled "C" and "D" designated for detail views.
Figure 26:
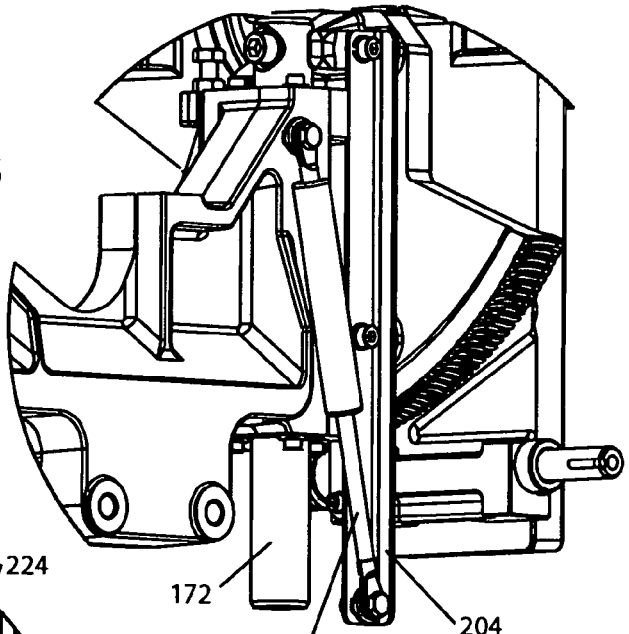
FIG. 26 is the detail view of the portion labeled "C" in FIG. 25, showing part of an elevation system.
Figure 27:
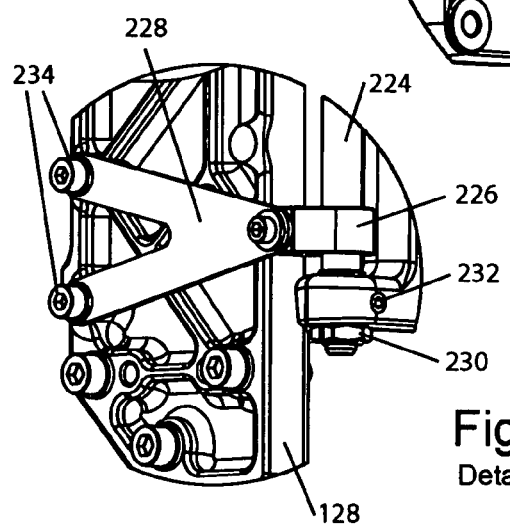
FIG. 27 is the detail view of the portion labeled "D" in FIG. 25, showing part of an elevation system.

A guide block 226 is placed on the guide shaft between bores 220 and 222 so the shaft can move up and down in the guide block. The guide block, in turn, is mounted to the apex of a V-bracket 228, and the opposite two ends of the V-bracket are bolted to the rear trunnion 128, as shown in FIGS. 25 and 27. This arrangement allows the elevation plate to move up and down to change the elevation of the blade, but prevents the distal end of the elevation plate from moving to the side or rotating around shaft 172 because the V-bracket is bolted to the rear trunnion and the guide block is mounted to the V-bracket.

This arrangement also accommodates variances or tolerances in manufacturing. Guide shaft 224 should be substantially parallel with support shaft 172 so that the elevation plate can move up and down on shaft 172 without binding on shaft 224. However, it may be difficult to make shaft 224 substantially parallel with shaft 172, especially given that the shafts are spaced a significant distance apart.

In the depicted embodiment, guide shaft 224 may be mounted in an eccentric bushing 230. Bushing 230 is similar to bushing 146 shown in FIG. 37, except it does not need shoulders 152. Bushing 230 has an off-center hole through which guide shaft 224 passes. The bushing is placed over the shaft and in bore 222 and held on the shaft by a clip. The bushing may then be turned to move the guide shaft and align the shaft as necessary. When the bushing is turned to its desired location, it is held in place by a set screw 232 shown in FIG. 27.

Guide block 226 is bolted onto the apex of V-bracket 228, as explained. A single bolt mounts the guide block to the V-bracket so the bracket can be adjusted or rotated around the bolt to align with the guide shaft so the guide shaft can slide up and down in the guide block.

The two ends of V-bracket 228 opposite the guide block are bolted to the rear trunnion by bolts 234, as stated. The V-bracket itself is made of a material which has some flex, such as metal, and there is a distance between bolts 234 and guide block 226. That distance and the flex of the material allow the V-bracket to flex out toward the rear of the saw if necessary to accommodate the guide shaft. That flex may be necessary if the distance of shaft 224 from shaft 172, the position of shaft 172 or shaft 224 in the saw, or the dimension of other components in the saw varies due to manufacturing tolerances or other reasons. That flex also may be necessary to accommodate the expanding or contracting of the elevation plate due to temperature changes. Thus, the ability of the V-bracket to flex out helps prevent the guide shaft from binding in guide block 226.

This mounting configuration may be thought of as constraining only one degree of freedom of the guide shaft; specifically, it constrains any side-to-side movement of the guide shaft. The mounting configuration allows the guide shaft and elevation plate to move up and down and front-to-back. This mounting configuration accommodates some misalignment of the guide shaft.

Figure 32:
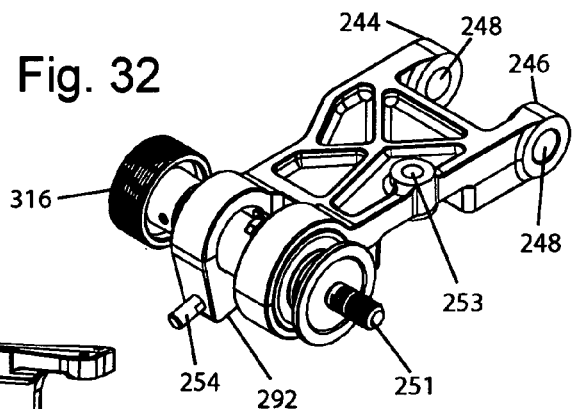
FIG. 32 shows an arbor block and arbor used in the saw shown in FIG. 3.
Figure 34:
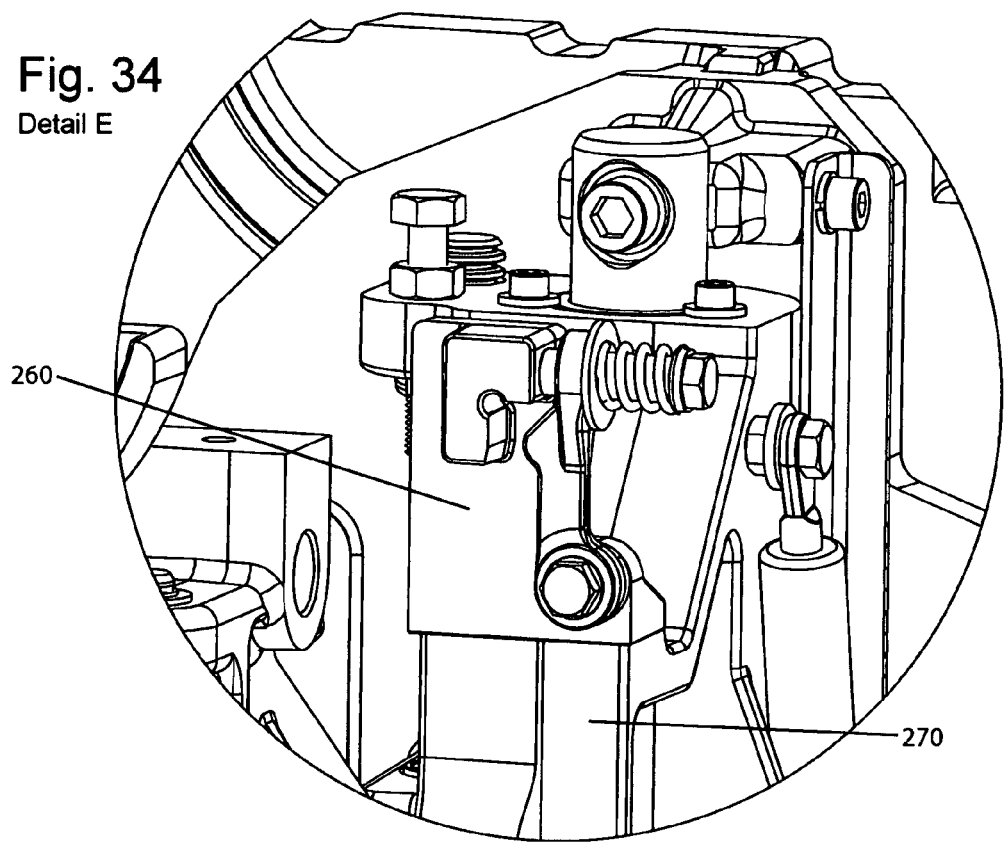
FIG. 34 is the detail view of the portion labeled "E" in FIG. 33, showing an arbor block support mechanism.
Figure 35:
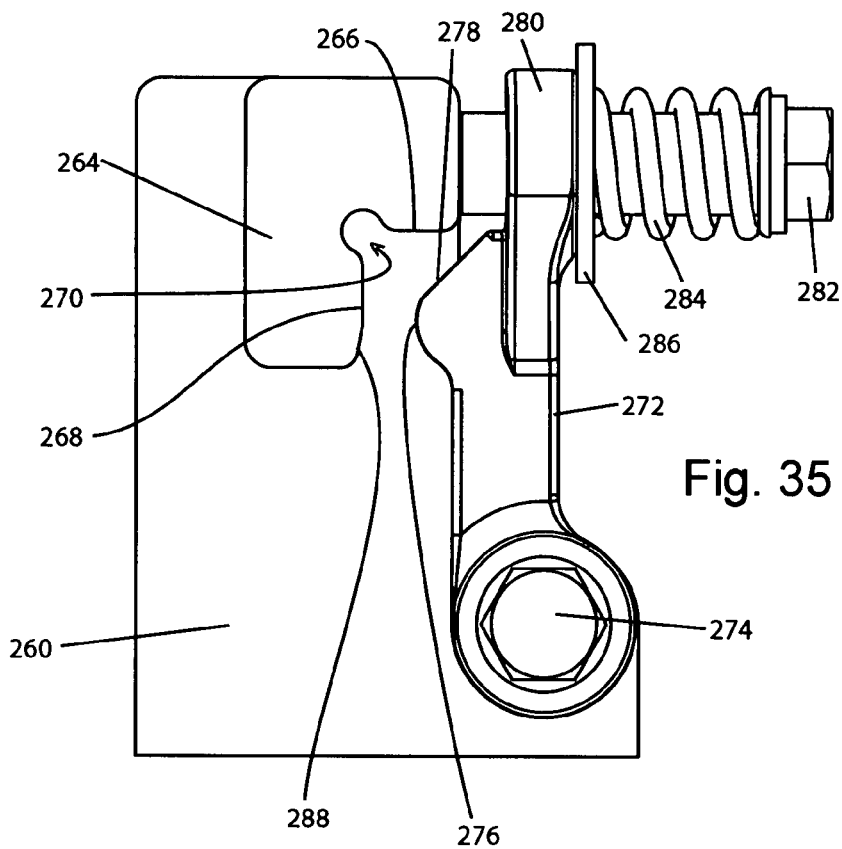
FIG. 35 shows an arbor block support mechanism.
Figure 36:
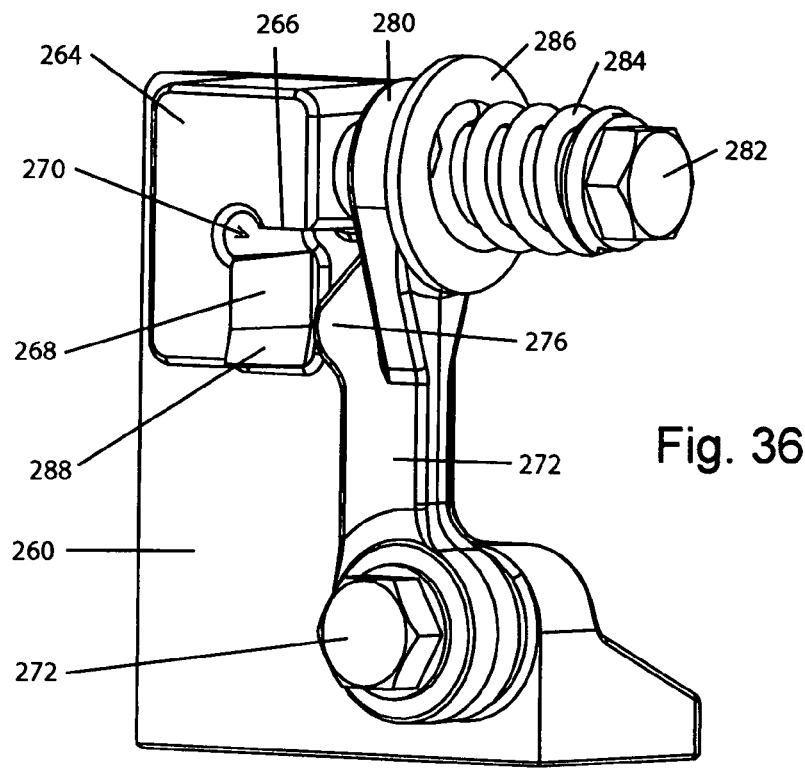
FIG. 36 also shows an arbor block support mechanism.
Figure 43:
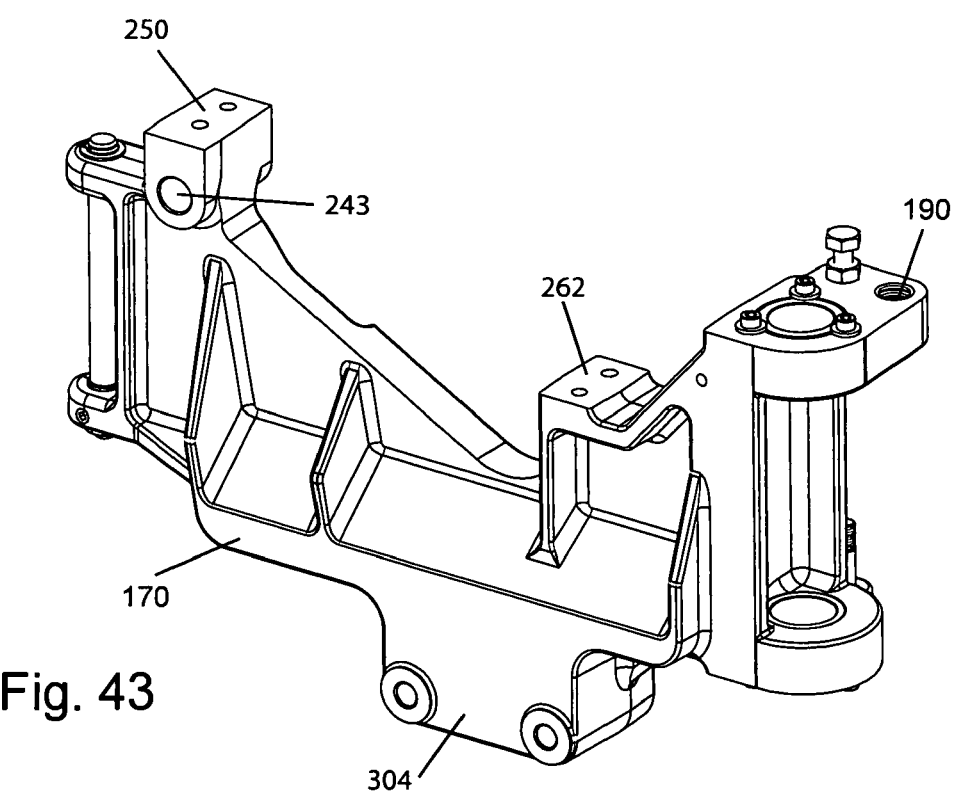
FIG. 43 is a perspective, left-side view of the elevation plate shown in FIG. 42.

An arbor block 240 is pivotally mounted to the elevation plate as shown in FIGS. 28 and 29. The arbor block includes two projections 244 and 246, each projection having a bore 248, as shown in FIG. 32. The elevation plate includes a raised portion 250 and bore 243 extends through that raised portion, as shown in FIG. 43. Projections 244 and 246 on the arbor block sandwich raised portion 250, and a shaft 242 then passes through bores 248 in the arbor block and bore 243 in the elevation plate to mount the arbor block to the elevation plate. Arbor block 240 may then pivot up and down around shaft 242.

An arbor 251 is mounted for rotation in arbor block 240, as shown in FIGS. 28 and 32, and the blade of the saw is mounted on the arbor so that it spins when the arbor rotates. The arbor is held in two bearings that are mounted in bearing seats in the arbor block. The bearings are isolated electrically from the arbor block by plastic overmolding on the arbor or by insulating bushings. Electrodes are positioned adjacent but not touching the arbor to impart the electrical signal to the blade used in the detection subsystem discussed above. The configuration of the arbor and electrodes are disclosed in detail in U.S. Provisional Patent Application Ser. No. 60/496,550, entitled "Table Saws with Safety Systems and Blade Retraction," filed Aug. 20, 2003, the disclosure of which is hereby incorporated by reference.

Figure 30:
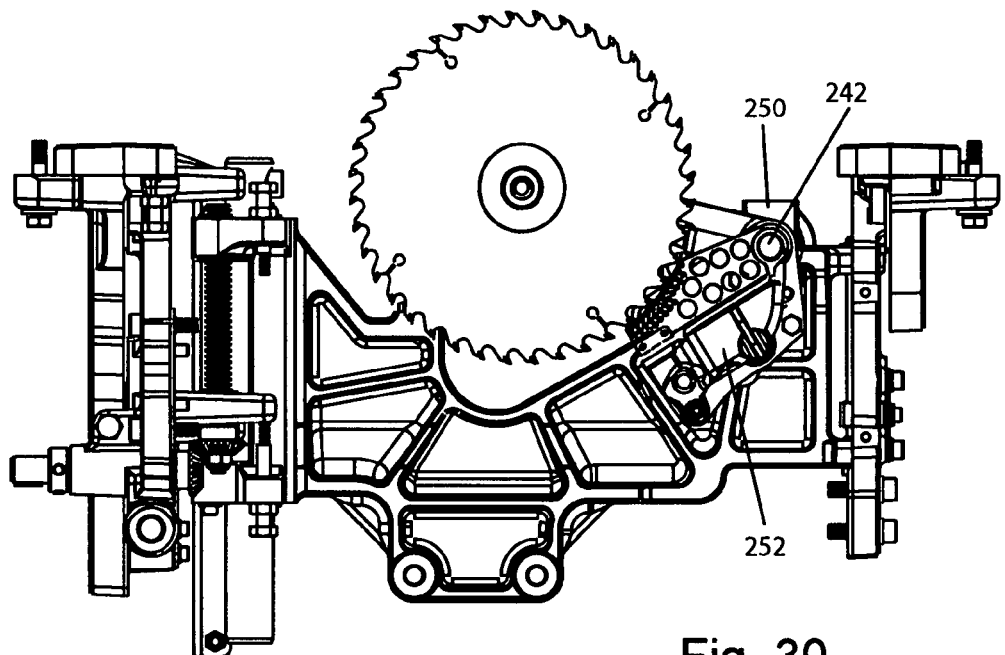
FIG. 30 is a right-side view of part of the internal mechanism of the saw shown in FIG. 3, including an elevation plate, arbor assembly, brake cartridge and blade.

Shaft 242 extends outwardly from the right side of the arbor block a sufficient distance so that a brake cartridge 252 may be pivotally mounted on the shaft, as shown in FIG. 30. The brake cartridge is sized and positioned so that it is adjacent the perimeter of a blade having a specified nominal diameter. The brake cartridge includes a pawl, and the pawl pivots toward the blade around shaft 242 to stop the blade from spinning when the detection subsystem detects that a person has contacted the blade, as described above. The brake cartridge may be constructed and mounted in the saw in many ways. Examples of how the brake cartridge may be constructed and mounted in a saw are disclosed in U.S. Provisional Patent Application Ser. No. 60/496,574, entitled "Brake Cartridges for Power Equipment," filed Aug. 20, 2003, and U.S. Provisional Patent Application Ser. No. 60/533,575, entitled "Brake Cartridges and Mounting Systems for Brake Cartridges," the disclosures of which are hereby incorporated by reference. That provisional patent application also discloses how the position of the brake cartridge relative to the perimeter of the blade may be adjusted by a linkage between the arbor block and the mounting structure for the brake cartridge. Arbor block 240 includes an aperture 253 through which a bolt may extend to adjust the spacing between the brake cartridge and the blade.

Brake cartridge 252 also acts as a mechanism to prevent a user of the saw from installing a blade larger than recommended. The brake cartridge physically blocks a large blade from being mounted on the arbor because the blade bumps into the brake cartridge.

Arbor 252 includes a pin 254 (labeled in FIG. 32) that engages an arbor block support mechanism 256 to hold the arbor block up and prevent the arbor block from pivoting around shaft 242 during normal operation of the saw. Pin 254 and arbor block support mechanism 256 also provide rigidity to the arbor block and minimize any vibration of the arbor block during normal operation of the saw. However, when a person accidentally contacts the blade the brake cartridge will engage and stop the blade. The angular momentum of the blade as it is stopped will create a significant downward force and that force will cause pin 254 to disengage from the arbor block support mechanism. When the pin has disengaged, the arbor block will be free to pivot around shaft 242, so the downward force resulting from stopping the blade will cause the arbor block to pivot down very quickly. The blade will also pivot down because the blade is supported by the arbor block. In this manner, the blade will retract below the tabletop of the saw when a person accidentally contacts the blade.

The arbor block support mechanism is shown in detail in FIGS. 28 and 33 through 36. An L-shaped bracket 260 is bolted onto surface 262 on the elevation plate (surface 262 is labeled in FIG. 43). The L-shaped bracket includes a projection 264 having a first surface 266 and a second surface 268. The first and second surfaces define a corner region 270 into which pin 254 would normally nest. Material from projection 264 may be removed in the corner region to allow pin 254 to contact first and second surfaces 266 and 268 at points that are somewhat distant from each other to better hold the pin. A small pivot arm 272 is mounted on L-bracket 260 so that the pivot arm may pivot around a bolt 274. The pivot arm includes a tab 276 having a support surface 278. Support surface 278 also abuts against pin 254 to help hold the pin in place during normal operation of the saw. Pivot arm 272 also includes a distal end 280 shaped to include an aperture through which a shoulder bolt 282 may pass. The shoulder bolt passes through distal end 280 and threads into projection 264 in the L-shaped bracket. A spring 284 and washer 286 are positioned between the head of bolt 282 and distal end 280 of the pivot arm. The spring is sized to bias the pivot arm toward projection 264. Thus, pin 254 is held in corner 270 by spring 284 pushing pivot arm 272 against the pin. Threading bolt 282 into or out of projection 264 will adjust the force exerted by spring 284 against pin 254.

When brake cartridge 252 stops the blade, the downward force caused by the angular momentum of the blade will overcome the force of spring 284, and pin 254 will then push pivot arm 272 aside and move down. Projection 264 includes a third surface 288 that connects with but slopes away from second surface 268. Third surface 288 slopes away in order to provide clearance for pin 254 to move down. As soon as pin 254 moves down past the point where the third and second surfaces connect, the pin no longer contacts projection 264 so it is free to move down. Similarly, tab 276 on pivot arm 272 is rounded to quickly release pin 254 when the pin begins to move down. The intersection of second surface 268 with third surfaces 288 is positioned substantially opposite the tangent point of the rounded tab 276 so that pin 254 is released from both projection 264 and tab 276 substantially simultaneously.

Figure 14:
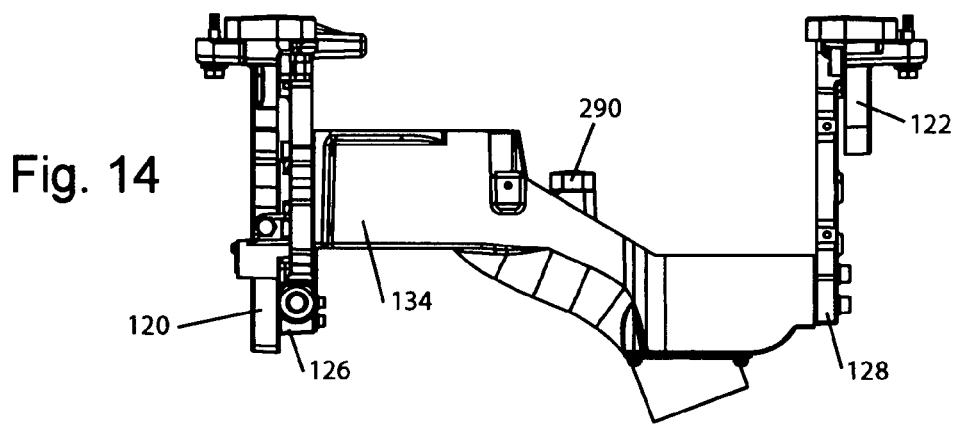
FIG. 14 shows a right-side view of a trunnion brace used in the saw shown in FIG. 3.
Figure 31:
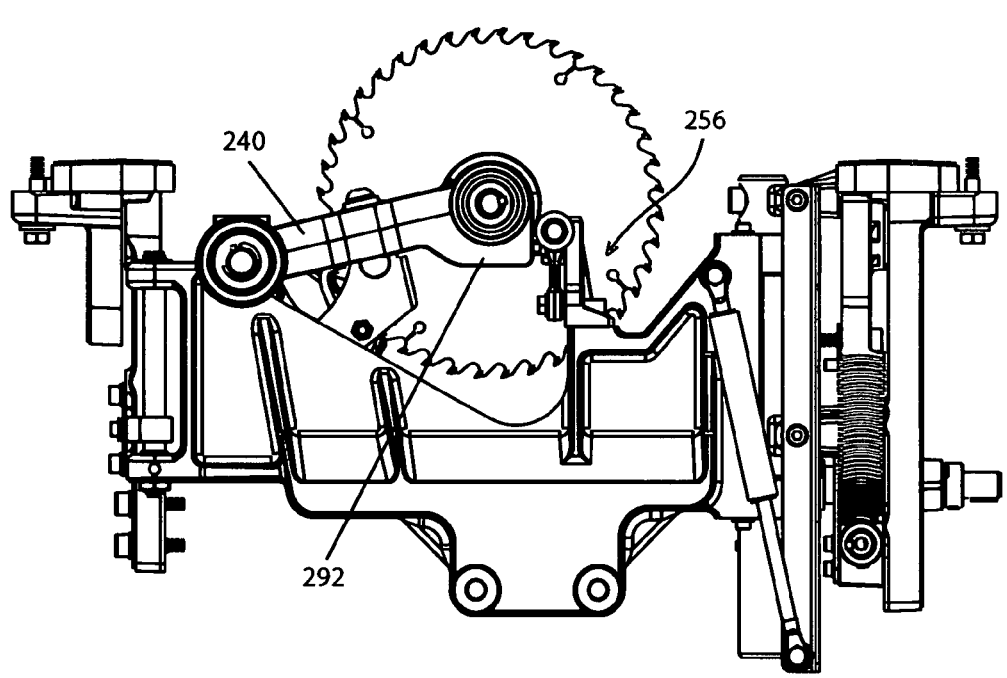
FIG. 31 is a left-side view of part of the internal mechanism of the saw shown in FIG. 3, including an elevation plate, arbor assembly, brake cartridge, blade and arbor block support mechanism.
Figure 33:
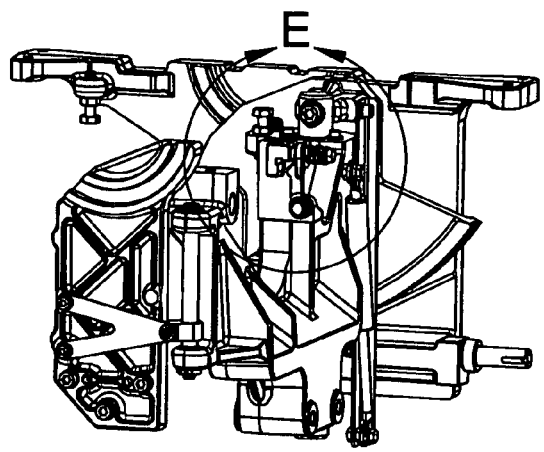
FIG. 33 shows a portion of the internal mechanism of the saw shown in FIG. 3, with a portion labeled "E" designated for a detail view.

A bumper or pad 290 is mounted on trunnion brace 134 below arbor block 240, as shown in FIGS. 5 and 14. When the arbor block retracts, bumper 290 stops the downward motion of the arbor block and helps absorb the energy of the retraction. The arbor block includes a surface 292 configured to contact bumper 290, as shown in FIGS. 31 and 32.

The energy of retraction may be significant. Accordingly, bumper 290 may be selected from materials that have good dampening characteristics and arbor block 240 may be made from a ductile iron so that the arbor block it is less likely to be damaged during retraction. Additionally, trunnion brace 134 should be constructed so that it is sufficiently strong to support bumper 290 and withstand the force of impact with the arbor block.

Figure 16:
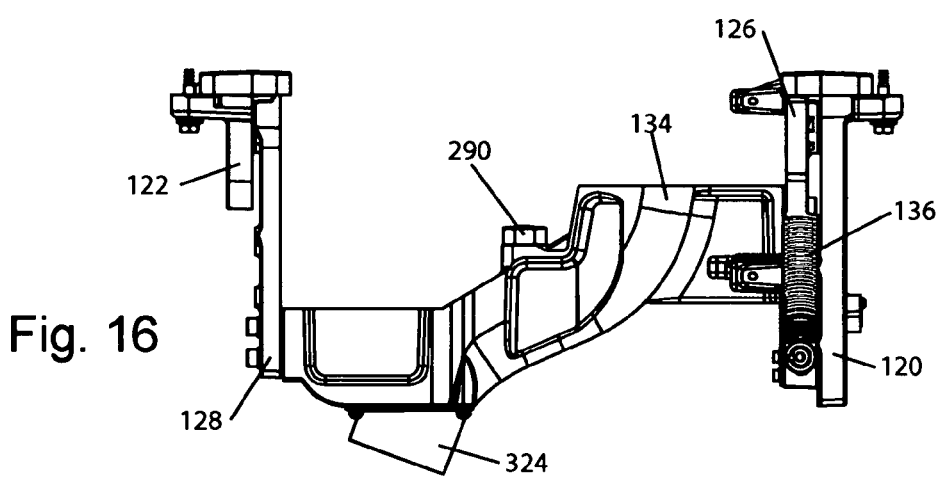
FIG. 16 shows a left-side view of a trunnion brace used in the saw shown in FIG. 3.
Figure 17:
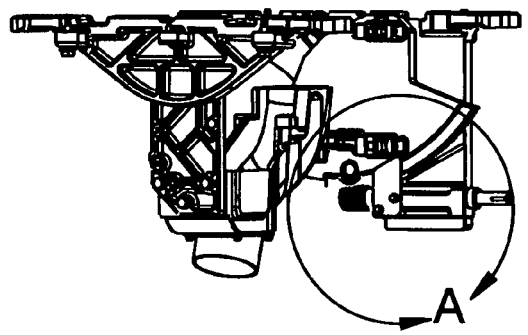
FIG. 17 shows part of the internal mechanism of the saw with a portion labeled "A" designated for a detailed view.

Trunnion brace 134 and elevation plate 170 are both construction to provide clearance for the arbor block and blade to retract in case of an accident. As shown in FIGS. 14 and 16, the trunnion brace sweeps down from front trunnion 126 to rear trunnion 128 so that the bottom of the blade will not contact the trunnion brace when the blade is fully retracted. Elevation plate 170 also includes a recessed area 294 (labeled in FIG. 22) that allows the arbor block to pivot down.

Figure 10:
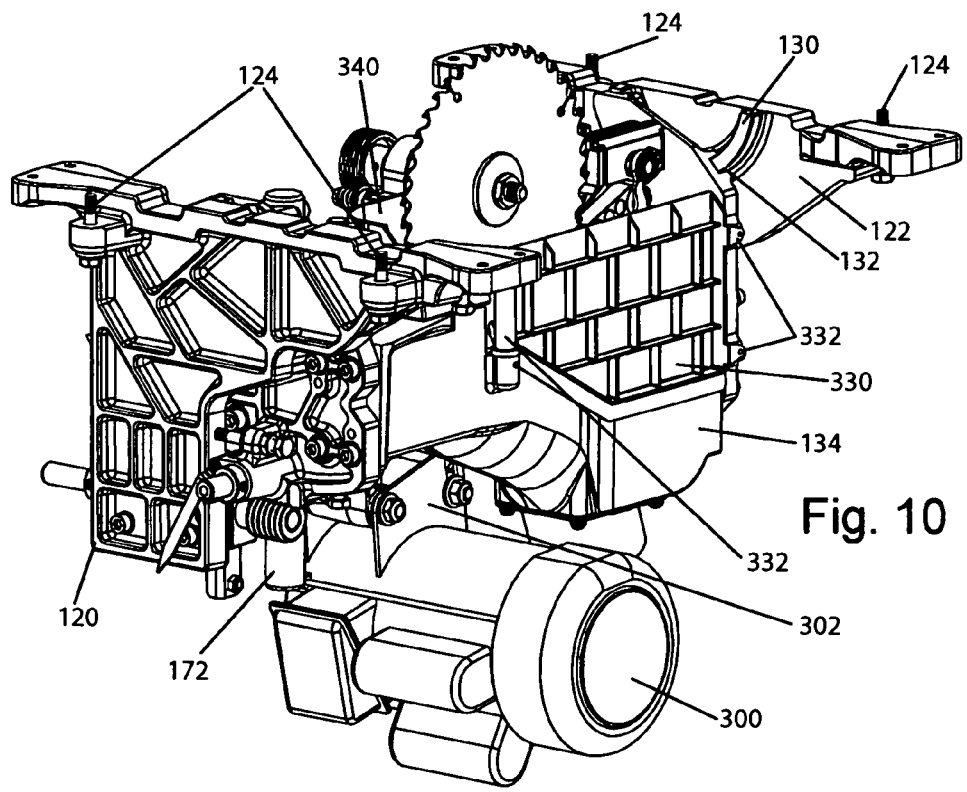
FIG. 10 shows a front-right perspective view of the internal mechanism of the saw with the table removed.
Figure 11:
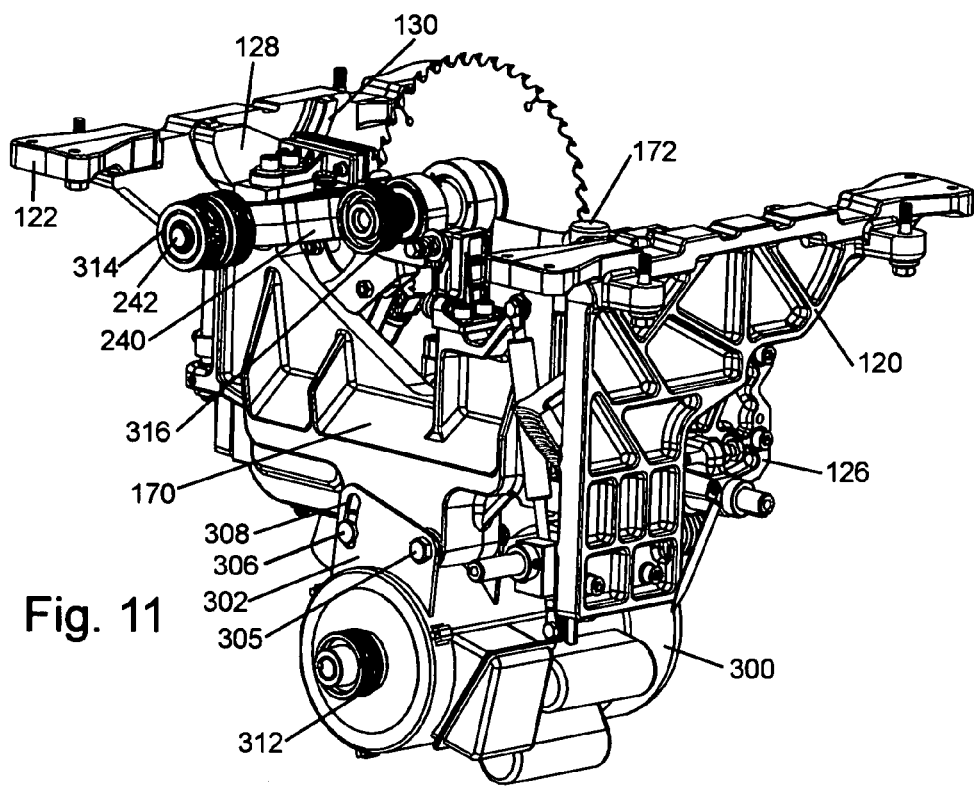
FIG. 11 shows a front-left perspective view of the internal mechanism of the saw with the table removed.
Figure 12:
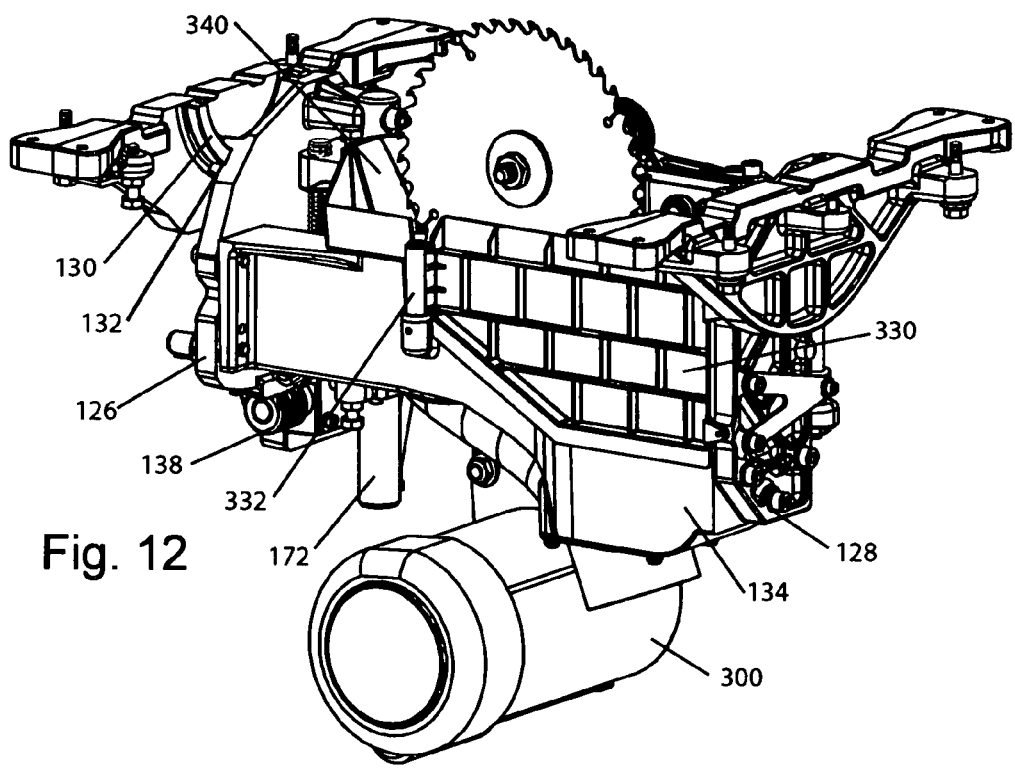
FIG. 12 shows a back-right perspective view of the internal mechanism of the saw.

Saw 100 is powered by a motor 300 mounted to the bottom of elevation plate 170. The motor may be mounted to the elevation plate in many ways. In the depicted embodiment, tabs 302 projects up from the motor and sandwich a projection 304 on the bottom of the elevation plate (projection 304 is labeled in FIGS. 42 and 43). Bolts 305 and 306 pass through holes in the tabs and projection to mount the motor to the elevation plate, as shown in FIGS. 10 and 11.

A drive shaft 310 extends from the motor and a pulley 312 is mounted on the drive shaft. A double pulley 314 is mounted on the left end of shaft 242 so that a first belt (not shown) may extend around the motor pulley and the outside of the double pulley. A third pulley 316 is mounted on the left end of arbor 251 and a second belt (not shown) extends around pulley 316 and the inside of double pulley 314. Motor 300 turns pulley 312, which then turns double pulley 314 and arbor pulley 316, causing the blade mounted on the arbor to spin. The depicted embodiment includes a double belt system as described so that arbor block 240 may retract by pivoting down around shaft 242 without disengaging from the drive belts.

Pulleys 314 and 316 are fixed-center pulleys, so a slightly stretchy Poly-V belt designed for fixed center pulleys is used. A slightly stretchy belt also has the advantage of being able to stretch and slip on pulley 316 when the brake cartridge stops the blade. This is advantageous because pulley 316 will stop very suddenly when the brake cartridge stops the blade, but the motor and belts will continue spinning for a short period of time. A stretchy belt will be able to stretch and slip on pulley 316 when the pulley stops suddenly. Of course, other belt and pulley configurations and belt tensioning systems may be used.

The belt around pulley 316 is preferably made of a static dissipative material so that static charge does not build up on the arbor or blade. This is advantageous because in some implementations a static charge may interfere with the detection subsystem. A standard belt or a slightly stretchy belt may extend around motor pulley 312 and the outside of double pulley 314. The pulleys may be sized so that the blade spins at a desired speed, such as 4000 rpm, while the motor spins at a different speed, such as 3450 rpm.

The belt extending around the motor pulley and the outside of double pulley 314 may be tensioned by moving the motor out. In the depicted embodiment, motor 300 is mounted to the elevation plate so that it may pivot around bolt 305. Tabs 302 include an oversized hole 308 through which bolt 306 passes so that the motor may pivot around bolt 305. To put tension on the belt, bolt 306 is loosened and the motor is pivoted around bolt 305 away from the double pulley. When the desired tension is achieved, bolt 306 is tightened to hold the motor in position.

Trunnion brace 134 is shaped to partially shroud the blade under table 102. Shrouding the blade prevents a person from contacting the blade under the table. This is useful because if a person contacts the blade under the table, the brake cartridge will fire and the blade will retract, possibly into the person's hand. Shrouding the blade also helps to collect sawdust created when the saw is running.

Figure 15:
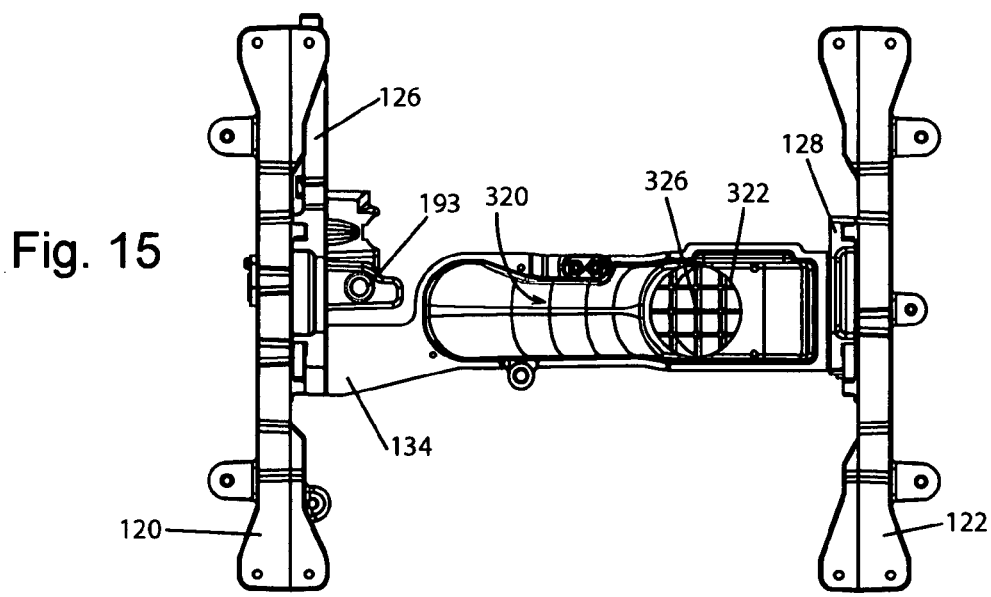
FIG. 15 shows a top view of a trunnion brace used in the saw shown in FIG. 3.

Trunnion brace 134 is shaped to create a trough or channel 320, shown in FIG. 15. The trough is wide enough to shroud the blade and to allow a person to reach into the saw through opening 106 in the tabletop to change either the blade or brake cartridge. Trough 320 is sloped down, as shown in FIGS. 14 and 16, to direct sawdust toward a port 322 in the bottom of the trough. Preferably, the inside surface of the trough, including the bottom and side walls, is as smooth as possible to avoid trapping sawdust. A hose coupling 324 is mounted to the bottom of the trunnion brace over port 322. The coupling includes a mesh 326 sized to prevent the bolt and washer with which the blade is secured to the arbor from falling through the mesh. It is possible when a user changes the blade that the blade nut or washer could fall into the saw and become difficult to retrieve. Mesh 326 prevents the bolt or washer from falling where they would be difficult to retrieve. A flexible vacuum hose or other conduit (not shown) is connected to the bottom of the coupling and extends to a similar port on the back of the saw. Thus, sawdust is collected by the blade shroud and then directed out through port 322 and through a conduit to the back of the saw. A user may connect a vacuum system to the port on the back of the saw to collect the sawdust and to create an airflow from the blade shroud to the back of the saw. The hose or conduit between coupling 324 and the port on the back of the saw is flexible so it can move when the trunnion brace tilts.

A side blade shroud 330, shown in FIGS. 4, 8, 10 and 12, is mounted on trunnion brace 134 to the right of the blade. This shroud further encloses the blade to prevent inadvertent contact with the blade and to collect sawdust. Side shroud 330 is mounted to the trunnion brace by a vertical hinge 332. The vertical hinge allows the side shroud to pivot out, away from the blade, around the vertical axis of the hinge. Pivoting the side blade shroud out provides additional room to change the blade or brake cartridge. The additional room is especially necessary to slide brake cartridge off of shaft 242. The side shroud includes magnets 332 to engage the rear trunnion and hold the side shroud closed, although other mechanisms may be used to hold the side shroud closed. The top of the side shroud is shaped and positioned sufficiently away from the underside of the tabletop so that the blade can tilt to the left without the side shroud bumping into the underside of the table.

A front shroud 340 is also mounted on the trunnion brace to the front of the blade. This shroud further helps enclose the blade and direct sawdust to the port in the bottom of the trunnion brace. The right side of this shroud is shorter than the left side in order to allow the blade and trunnion brace to tilt to the left. This shroud would typically be made of a lightweight material to reduce the weight of the saw. Alternatively, the trunnion brace itself may be designed to extend up and form the front blade shroud.

The underside of table 102 may include recesses to allow the blade to rise to a predetermined height without the arbor block bumping into the underside of the table.

The cabinet of the table saw may include in opening to allow access to the internal mechanism of the saw. FIG. 1 shows saw 100 with a cover 342 over such an opening. The cover is mounted to the cabinet with hinges so it can pivot open. A standard latch is used to keep the cover closed. The cover may include louvers to allow airflow into the cabinet.

Saw 100 may also include a switch box 344 with one or more switches to control the operation of the saw. A switch box designed for use with safety systems as described above is described in detail in U.S. Provisional Patent Application Ser. No. 60/533,598, entitled "Switch Box for Power Tools with Safety Systems," the disclosure of which is hereby incorporated by reference.

Saw 100 may also come with a fence 346 that rests on table 102 and clamps to a front rail. The fence provides a face against which a user may slide a work piece when making a cut. One possible fence is disclosed in U.S. Provisional Patent Application Ser. No. 60/533,852, entitled "Improved Fence for Table Saws," the disclosure of which is hereby incorporated by reference. The saw may also come with a miter gauge 348 and a blade wrench 350.

Figure 44:
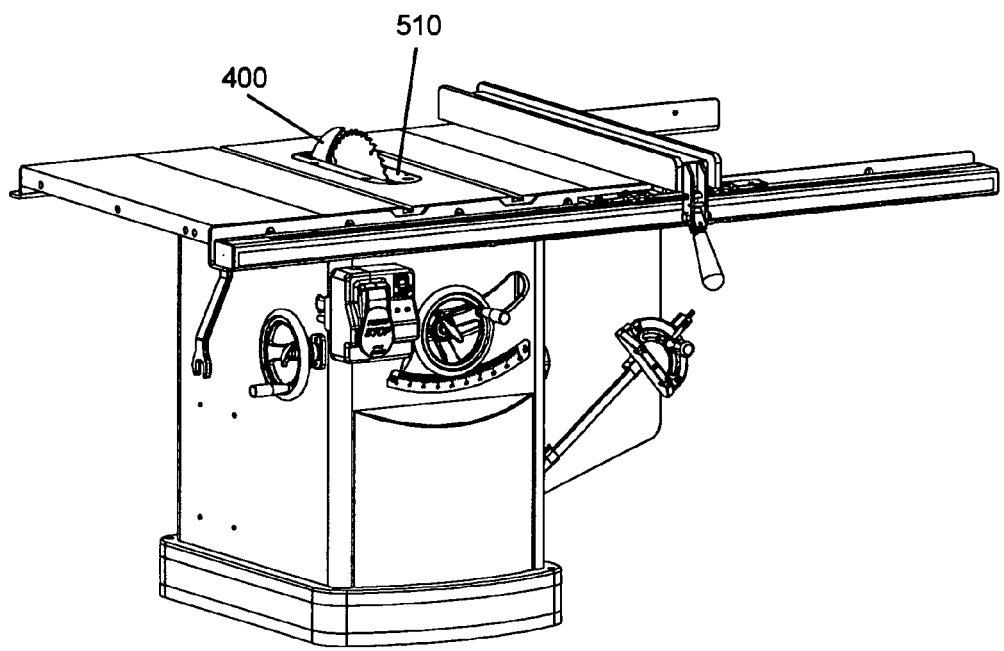
FIG. 44 shows a table saw with a riving knife.
Figure 45:
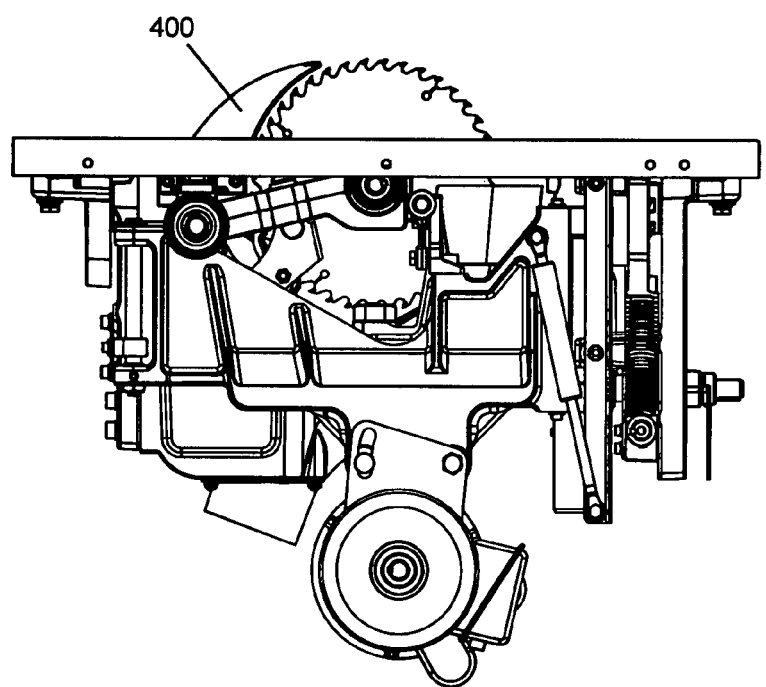
FIG. 45 shows a side view of the table saw shown in FIG. 44 with the cabinet and other parts removed for clarity.
Figure 46:
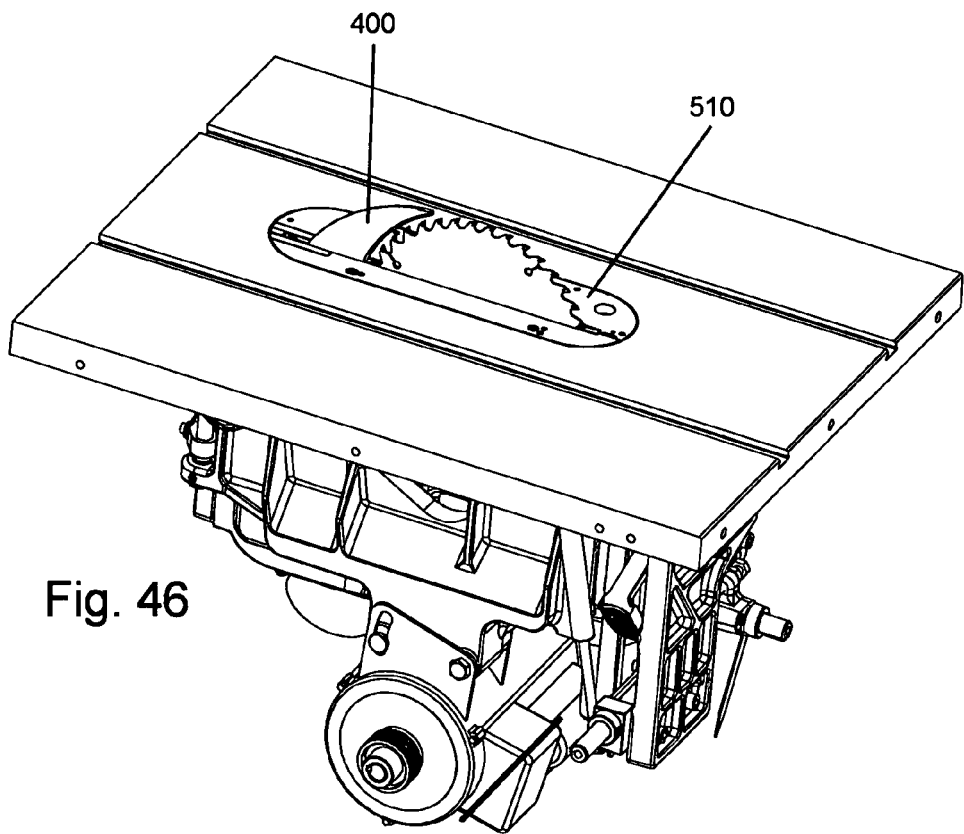
FIG. 46 shows a top, perspective view of the saw shown in FIG. 45.
Figure 47:
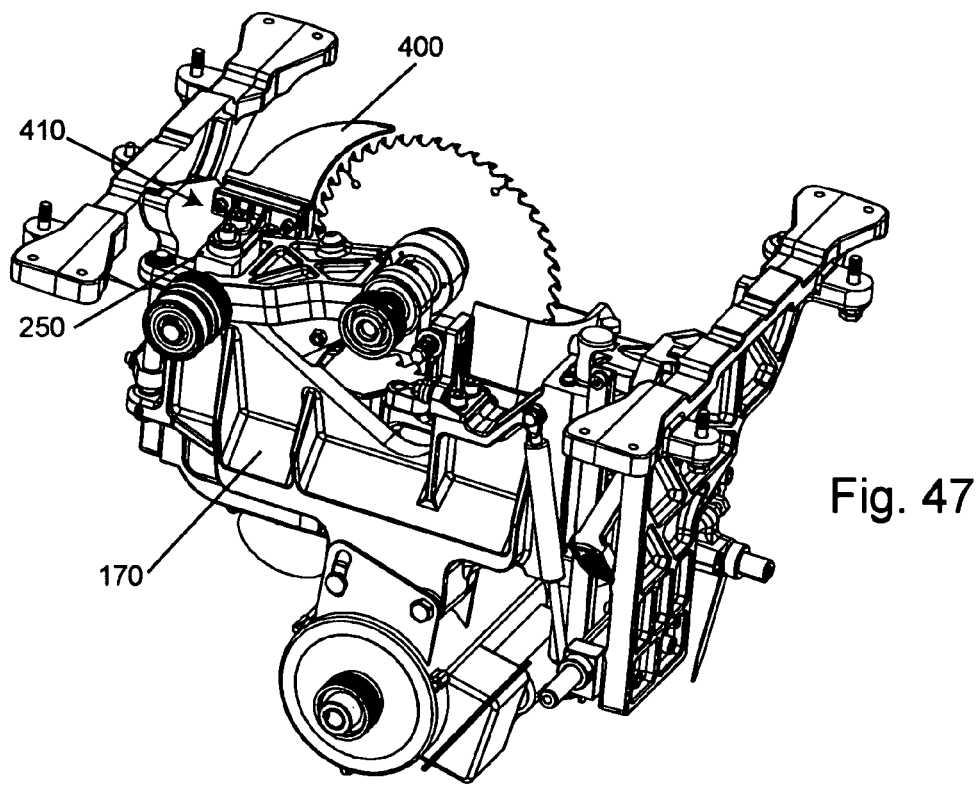
FIG. 47 shows a top, perspective view of the saw shown in FIG. 45 with the table removed.

FIG. 44 shows a table saw with a riving knife 400 positioned adjacent the back edge of the blade. FIGS. 45 and 46 show riving knife 400 in the saw with the cabinet removed, and FIG. 47 shows the riving knife mounted in the saw with the table removed. The riving knife is shown alone in FIGS. 48 and 49.

Riving knife 400 is a flat, fin-like plate positioned in the saw adjacent the back edge of the blade. The riving knife is mounted in the saw within the projected kerf and top-to-bottom cutting capacity of the blade. Thus, as a workpiece is cut by the blade, the riving knife will fit into the newly cut slot in the workpiece so that it does not block or impede the movement of the workpiece past the blade.

Riving knife 400 functions to prevent a workpiece from engaging the teeth at the back of the blade. As a workpiece is cut into two sections, the newly cut sections may flex or move. If one of the newly cut sections moves to the side and catches the back edge of the spinning blade, the blade may suddenly kick the workpiece back toward the user at a very high speed and the user's hand may be pulled into the blade by the sudden movement of the workpiece. The riving knife impedes the workpiece from moving to the side and thereby minimizes the chance of the workpiece catching the back edge of the blade. The riving knife also minimizes the chance of newly cut sections of a workpiece moving together and binding the blade.

Figure 48:
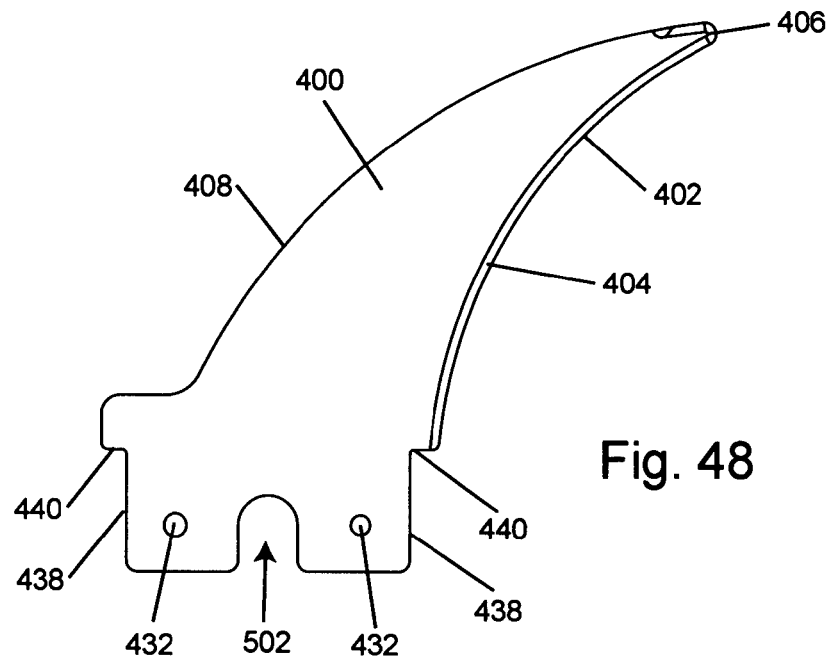
FIG. 48 shows a riving knife.
Figure 49:
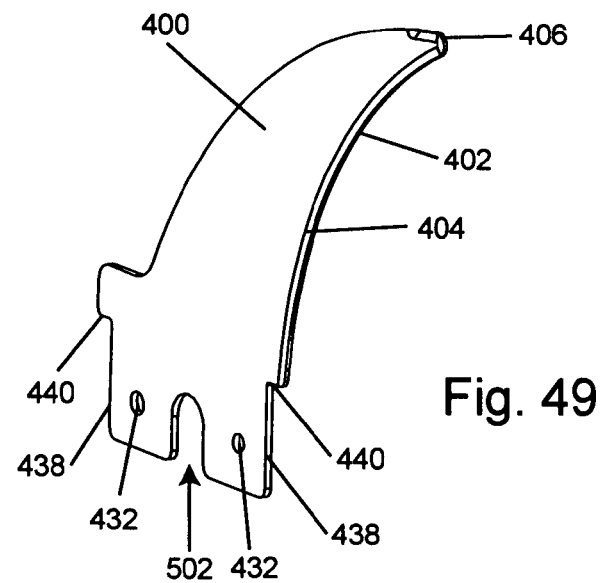
FIG. 49 shows another view of a riving knife.

As shown in FIGS. 48 and 49, the riving knife is flat, smooth and planar. The sides of the riving knife are parallel and the riving knife has a body thickness thinner than the kerf of the blade for which it is intended to be used. The body thickness, however, should not be substantially thinner than the kerf of the blade or the riving knife will be less able to impede a workpiece from catching the back edge of the blade.

Typically, the riving knife has a body thickness thicker than the body thickness of the blade but thinner than the kerf of the blade.

The riving knife includes a leading edge 402 that is curved to follow the edge of whatever blade or blades are intended to be used with the riving knife. Leading edge 402 includes a chamfer 404 so that the edge does not catch on a workpiece as the workpiece is moved past the blade. The riving knife also includes a tip 406 rounded and chamfered so that it does not catch on a workpiece. The rounded tip often has a radius of not less than 0.08 inch. The riving knife typically has a width or dimension from leading edge 402 to a back edge 408 of at least $\frac{1}{6}^{th}$ of the diameter of the smallest blade for which the riving knife is intended to be used, measured at the level of the table top when the riving knife is installed in a saw and raised to its maximum elevation. The riving knife may be made of steel with a hardness of between 38 HRC and 48 HRC and a resistance to rupture at least equal to 800 MPa. The riving knife should be sufficiently rigid so as not to deflect or displace any significant distance toward the blade or to the side.

The riving knife is mounted in the saw close to the blade but not touching the blade. The radial distance between the leading edge 402 and the back of the blade is typically at least 0.11 inch (3 mm) but not more than 0.31 inch (8 mm) at every point along the edge. The highest point of the riving knife is typically at least 0.04 inch (1 mm) but not more than 0.20 inch (5 mm) below the highest point of the saw blade. The riving knife is also mounted in the saw so that it remains in a fixed position relative to the blade as the blade tilts and changes elevation relative to the table. In other words, the riving knife tilts and moves up and down with the blade.

The riving knife may be used for most cuts performed on a table saw, including through-cuts (where the blade cuts through the entire thickness of the workpiece) and non-through-cuts (where the blade does not cut through the entire thickness of the workpiece). There are some cuts, however, where a riving knife may not be used, such as a plunge cut where the blade is raised up into a workpiece and a cove cut where the workpiece is moved past the blade at an angle relative to the plane of the blade so that the blade removes a groove or cove of material. In both those cuts, the riving knife would be outside the cut produced by the blade and would abut the workpiece. Additionally, a riving knife designed for a blade with a 10" diameter should not be used with a smaller diameter blade because the riving knife would project above the cutting capacity of the blade. Similarly, dado blades (which are stacks of blades mounted on the saw to cut a groove in a workpiece) are typically smaller in diameter than normal blades so riving knives designed for normal blades would extend above the dado could not be used because they would abut the workpiece. Dados are also substantially thicker than normal blades and therefore a riving knife designed for a single blade might not impede a workpiece from catching the back edge of a dado stack.

It is desirable for a user to be able to install and remove the riving knife quickly and easily when performing different operations with the saw so that the riving knife is not an inconvenience. For example, if a user needs to make both non-through and dado cuts, then the user will have to remove the riving knife before and re-install it after each dado cut. If it were complicated, difficult or time consuming to remove and reinstall the riving knife between the different cutting operations, then it would be less likely a person would use the riving knife.

The table saw shown in FIGS. 44 through 47 includes a mounting system or mechanism 410 that allows for fast and easy removal and reinstallation of riving knife 400. Mounting system 410 is shown isolated in FIGS. 50 and 51.

Figure 54:
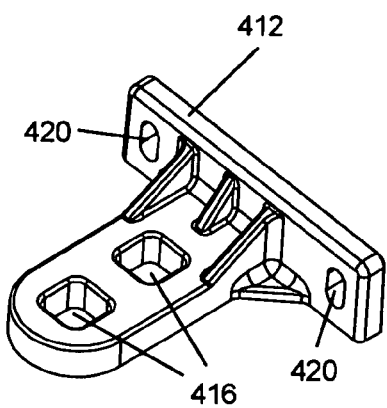
FIG. 54 shows a mounting plate used in the mounting system shown in FIG. 50.
Figure 55:
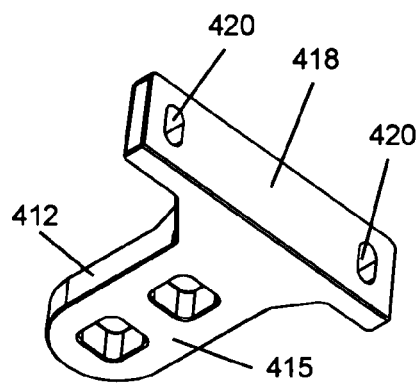
FIG. 55 shows another view of the mounting plate shown in FIG. 54.

Mounting system 410 includes a mounting plate 412 that is bolted onto raised portion 250 of elevation plate 170 by bolts 414, as shown in FIG. 47. Raised portion 250 is also shown in FIGS. 42 and 43. Mounting plate 412 is shown isolated from other structure in FIGS. 54 and 55. Mounting plate 412 includes a flat bottom surface 415 that rests on raised portion 250 of the elevation plate. Two holes 416 pass through the mounting plate and bolts 414 extend through those holes and are threaded into corresponding holes on raised portion 250. Holes 416 are oversized relative to bolts 414 so that the position of the mounting plate may be adjusted relative to the elevation plate. By adjusting the position of the mounting plate, the position of the riving knife relative to the blade may be adjusted, as will be explained below. Mounting plate 412 also includes a flat face 418 and two holes 420 that pass through the face.

Figure 56:
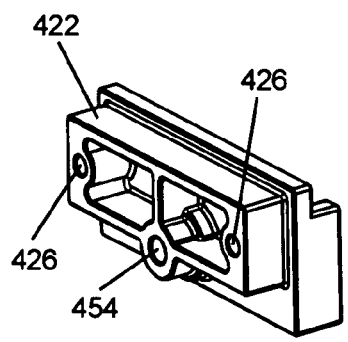
FIG. 56 shows a positioning plate used in the mounting system shown in FIG. 50.
Figure 57:
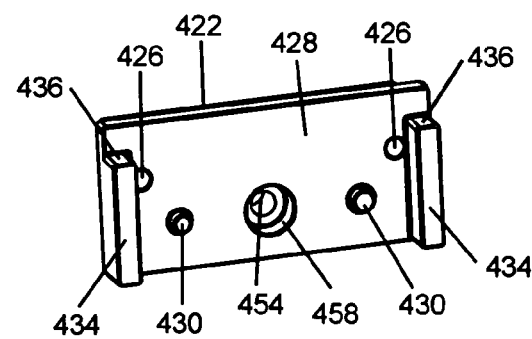
FIG. 57 shows another view of the positioning plate shown in FIG. 56.
Figure 58:
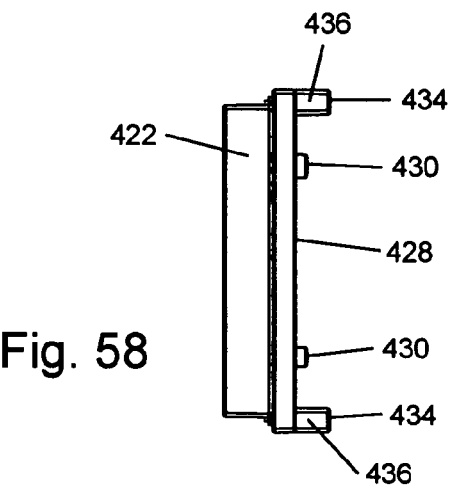
FIG. 58 shows still another view of the positioning plate shown in FIG. 56.
Figure 59:
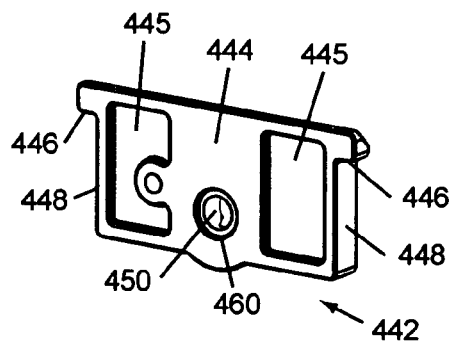
FIG. 59 shows a clamping plate used in the mounting system shown in FIG. 50.
Figure 70:
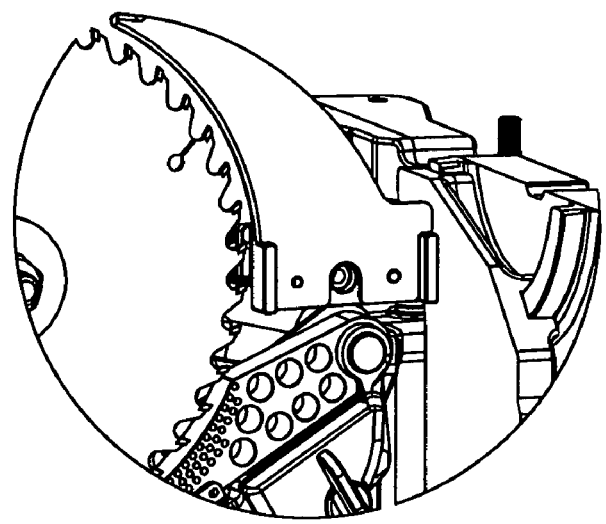
FIG. 70 shows a detailed view of a section F from FIG. 69 with part of the mounting system removed.

A positioning plate 422 is bolted onto face 418 of mounting plate 412 by bolts 424 that pass through holes 420 and are received into threaded holes 426. Holes 420 are oversized and oval shaped so that the position of plate 422 may be adjusted. Positioning plate 422 is shown isolated in FIGS. 56 through 58. Positioning plate 422 functions to position the riving knife in the mounting system. The positioning plate includes a flat surface 428 to support one side of the riving knife and two pins 430 that extend out from that flat surface, as shown. The base of riving knife 400 includes two holes 432 and pins 430 are configured to extend through those holes to locate the riving knife in the mounting system. The positioning plate also includes two flanges 434 extending perpendicularly out from opposite edges of flat surface 428, and each flange includes a shoulder 436. Riving knife 400 includes corresponding edges 438 and shoulders 440 configured to position the riving knife between flanges 434 and on shoulders 436 against the positioning plate, as shown in FIG. 70. Thus, the riving knife is positioned in the mounting system by fitting on pins 430 between flanges 434 and on shoulders 436.

Figure 51:
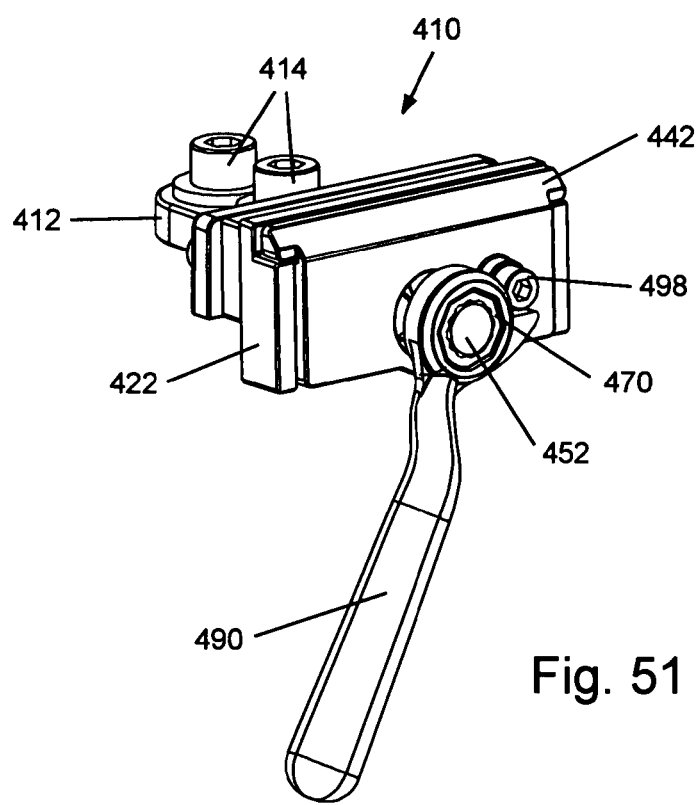
FIG. 51 shows another view of the mounting system shown in FIG. 50.

Mounting system 410 also includes a clamping plate 442 that works with positioning plate 422 to clamp and hold the riving knife in position. Clamping plate 442 includes a flat surface 444 that supports the side of the riving knife opposite the side supported by the positioning plate. Flat surface 444 includes recesses 445 that provide clearance for pins 430 and for contaminants like sawdust so that the clamping plate can abut against the riving knife evenly. The clamping plate also includes shoulders 446 and edges 448 that correspond to shoulders 436 and flanges 434 on the positioning plate so that the clamping plate fits between flanges 434 as shown in FIG. 51.

Figure 53:
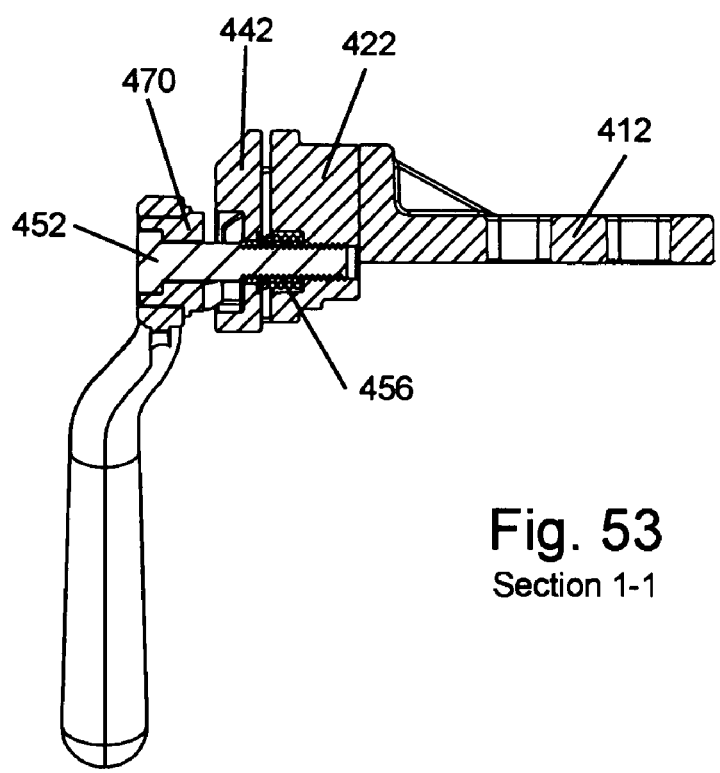
FIG. 53 shows a cross-section view of the mounting system shown in FIG. 50 taken along the line 1-1 in FIG. 52.

Clamping plate 442 also includes a hole 450 through which a bolt 452 passes. Bolt 452 is labeled in FIG. 53. Bolt 452 passes through hole 450 and is threaded into a hole 454 in positioning plate 422 to loosely connect the clamping plate to the positioning plate. A spring 456, shown in FIG. 53, is placed over bolt 452 and is at least partially contained in a first circular recess 458 in positioning plate 422 and in a second circular recess 460 in clamping plate 444. Spring 456 may be a compression spring, a wave compression spring or some other spring. Spring 456 biases clamping plate 442 away from positioning plate 422 to help open the clamp, as will be described below.

Clamping plate 442 also includes a first set of cam surfaces 462 and 463 and a second set of cam surfaces 464 and 465. The cam surfaces are positioned in a recess 466 that is concentric with hole 450 and the cam surfaces are arcuately spaced around the hole, as shown. Cam surfaces 462 and 464 slope up from the bottom of recess 466 to where they join with cam surfaces 463 and 465, respectively. In the depicted embodiment, each of cam surfaces 462 and 464 is a portion of a helix or coil with a pitch of 50.5 mm. Each of cam surfaces 463 and 464 is a portion of a helix or coil with a pitch of 1.01 mm. Of course, other cam surfaces and pitches may be used. The cam surfaces are used to move clamping plate 442 toward positioning plate 422, as will be explained.

Mounting system 410 also includes a cam bushing 470 (shown isolated in FIGS. 62 through 65) configured to fit into recess 466 in the clamping plate. Cam bushing 470 includes cam surfaces 472 and 473 joined by a first edge 471, and a second set of cam surfaces 474 and 475 joined by a second edge 476. Those cam surfaces are arcuately spaced around a hole 480, as shown, and they are configured to correspond roughly with the cam surfaces in the clamping plate. In the depicted embodiment, each of cam surfaces 472 and 474 is a portion of a helix or coil with a pitch of 44 mm. Each of cam surfaces 473 and 475 is a flat surface. Other cam surfaces and pitches may be used. Cam bushing 470 also includes a flange 478 to abut against the front of the clamping plate to limit the distance the bushing may extend into recess 466.

Figure 62:
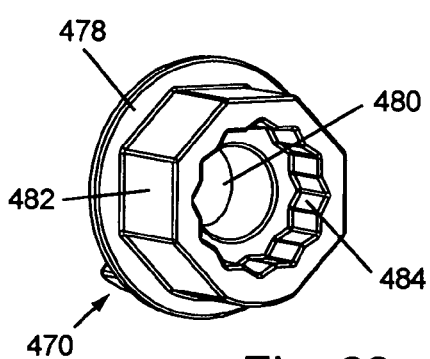
FIG. 62 shows a cam bushing used in the mounting system shown in FIG. 50.
Figure 63:
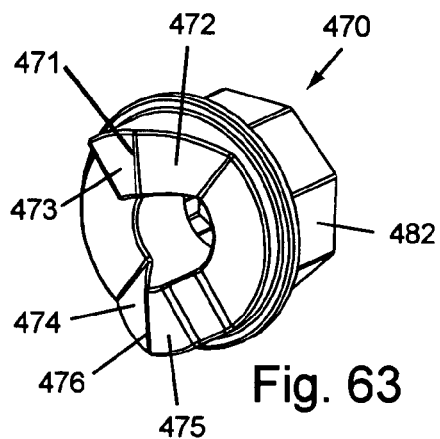
FIG. 63 shows another view of the cam bushing shown in FIG. 62.
Figure 64:
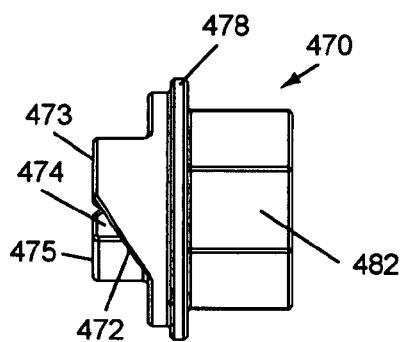
FIG. 64 shows still another view of the cam bushing shown in FIG. 62.
Figure 65:
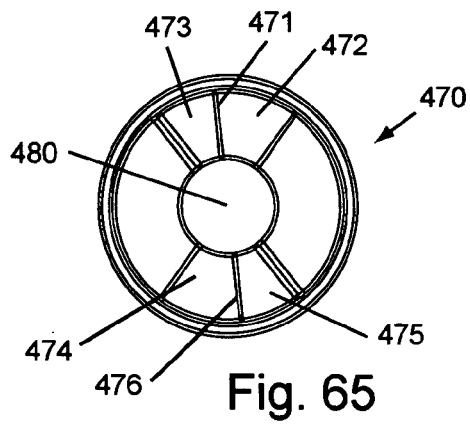
FIG. 65 shows yet another view of the cam bushing shown in FIG. 62.

Cam bushing 470 has an octagon-shaped drive head 482 that can be gripped to turn the bushing and a 12-point inner socket 484 positioned in drive head 482, as shown in FIG. 62. Bolt 452 passes through hole 480 in the cam bushing and through hole 450 in the clamping plate and then screws into hole 454 in the positioning plate, as shown in FIG. 53. The head of bolt 452 may then fit into 12-point inner socket 484.

Figure 66:
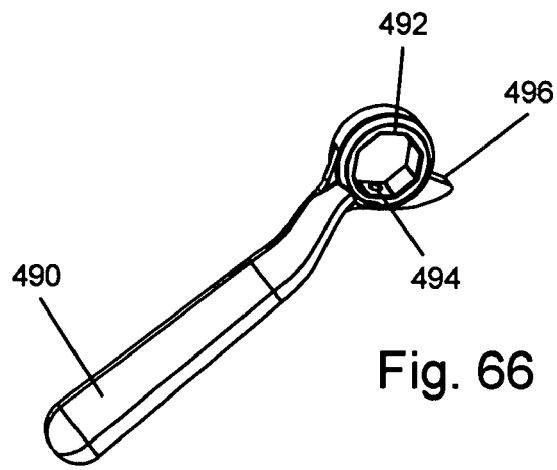
FIG. 66 shows a handle used in the mounting system shown in FIG. 50.
Figure 67:
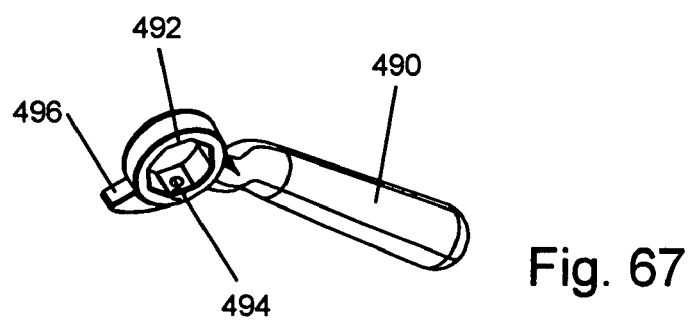
FIG. 67 shows still another view of the handle shown in FIG. 66.
Figure 68:
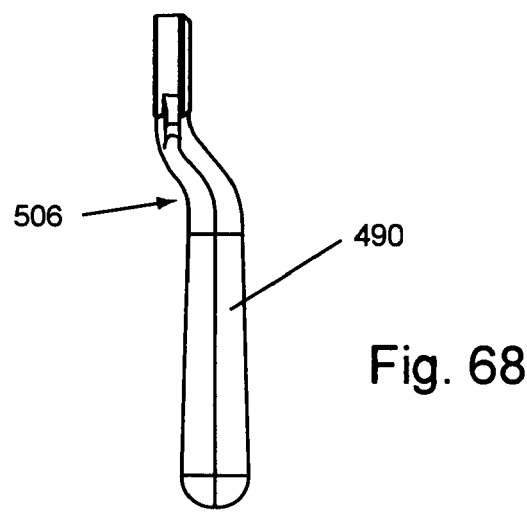
FIG. 68 shows yet another view of the handle shown in FIG. 66.

Mounting system 410 also includes a handle 490, shown in FIGS. 66 through 68. Handle 490 has an elongate body with an 8-facet socket 492 at one end configured to fit over octagon-shaped drive head 482 on cam bushing 470. A set screw is threaded into a hole 494 on the handle to hold the handle and the cam bushing together when socket 492 is positioned over drive head 482.

The various components of mounting system 410 described above may be made from various strong and hard materials, such as machined metal, powder metal or cast metal. It is also possible that the components cay be made from a hard plastic or thermoset. The materials of the cam bushing and clamping plate may be selected to facilitate the sliding of the cam surfaces and to minimize galling, and/or the cam surfaces may be lubricated or greased. The cam bushing and handle may be combined into one single part.

Figure 50:
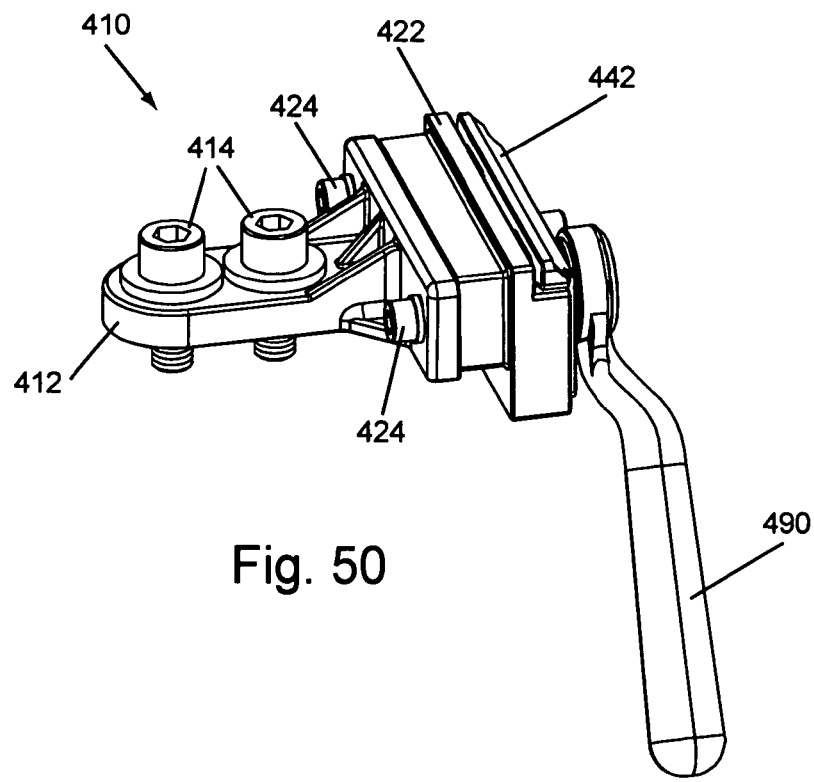
FIG. 50 shows a mounting system or clamp for table saw attachments.
Figure 69:
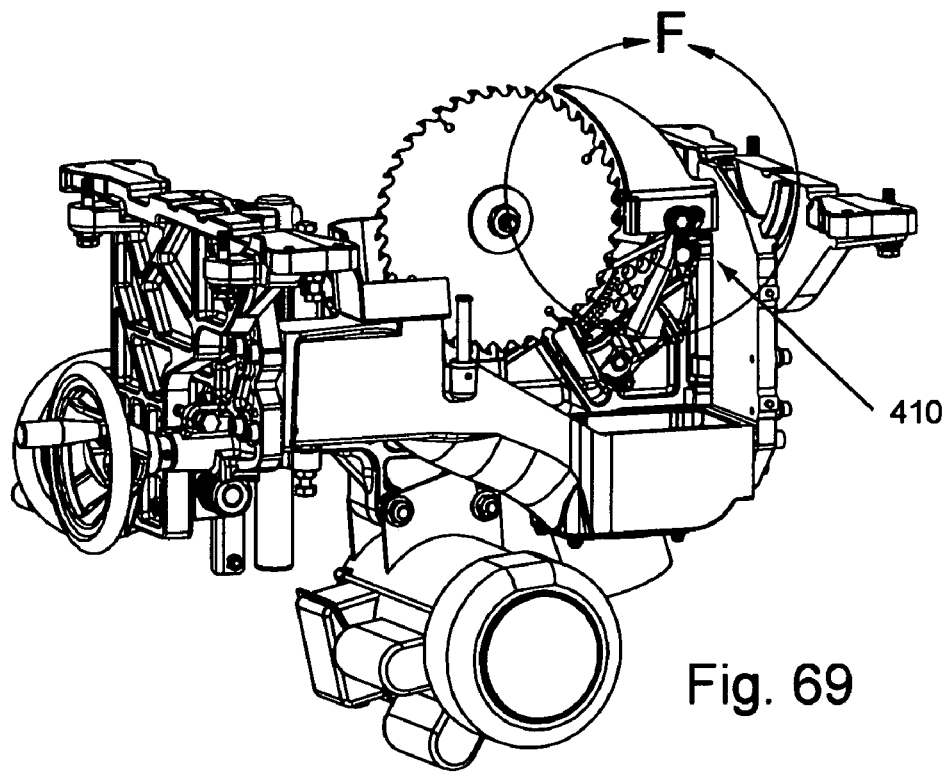
FIG. 69 shows a saw assembly without a cabinet or table but with a riving knife installed in a mounting system.
Figure 71:
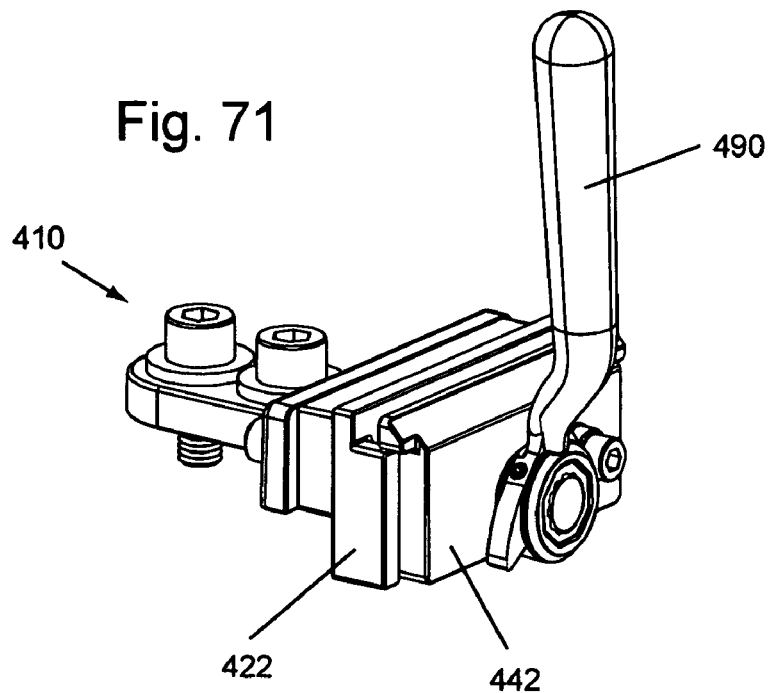
FIG. 71 shows the mounting system of FIG. 50 in an open position.
Figure 72:
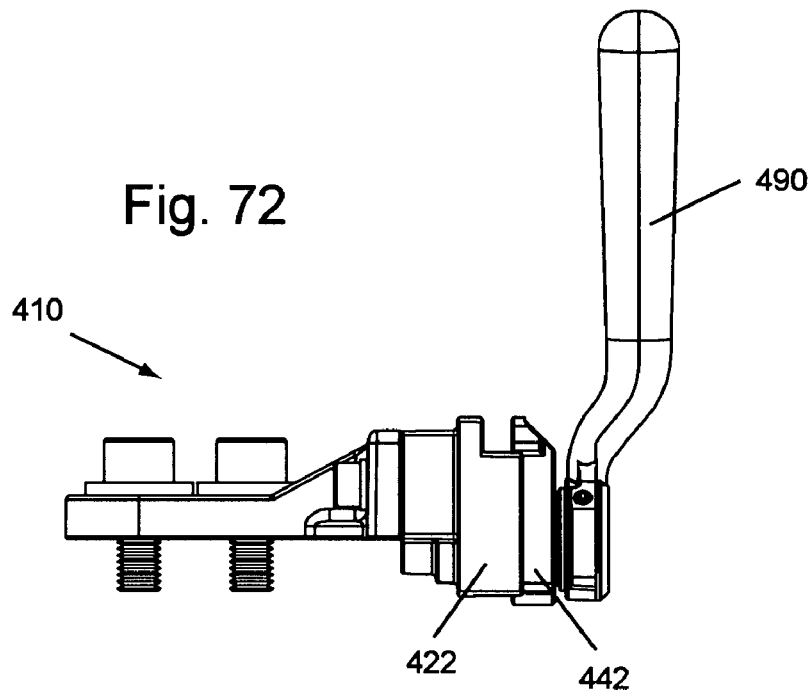
FIG. 72 shows another view of the mounting system of FIG. 50 in an open position.

Mounting system 410 may be thought of as having an open position where the clamping and positioning plates are spaced apart from each other and a closed position where the two plates are moved closer together. The open position is shown in FIGS. 71 and 72. In that position, handle 490 is raised and plates 422 and 442 are spaced apart. The mounting system should be configured and adjusted so that in the open position plates 422 and 442 are spaced sufficiently far apart for the riving knife to be moved off of pins 430 and removed from between the plates. The closed position is shown in FIGS. 50, 51 and 69. In that position handle 490 is lowered and plates 422 and 442 are closer together to clamp the riving knife and hold it in position.

When handle 490 is moved up to open the clamp, the handle turns cam bushing 470 so that the cam bushing fits into recess 466 on the clamping plate without engaging the cam surfaces. In that position, spring 456 pushes the clamping plate and cam bushing away from positioning plate 422 until the cam bushing abuts the head of bolt 452 and the clamping plate abuts the cam bushing. The distance the clamping plate may move away from the positioning plate can be adjusted by turning bolt 452. Threading bolt 452 into hole 454 on the positioning plate lessens the distance the clamping plate may move out because it moves the bolt head and cam bushing closer to the clamping plate. Threading the bolt out of hole 454 increases the distance the clamping plate may move out. Bolt 452 may be threaded in or out by pressing the clamping and positioning plates together and pressing the cam bushing into recess 466. The head of bolt 452 will then extend out beyond the cam bushing so that it may be gripped and turned by hand or with a wrench. When the bolt is adjusted to its desired position, the cam bushing and plates are released and spring 456 pushes them out until the cam bushing abuts the head of the bolt and the bolt head fits into socket 484 in the cam bushing. Socket 484 is a 12-point socket so that the bolt head can fit into the socket in many different positions and thereby allow fine adjustment of the distance bolt 452 is threaded into hole 454. Spring 456 is sized and selected so that it is at least partially compressed even when the mounting system is in the open position. For example, the spring may be sized and selected so that it applies 5 to 15 pounds of force against the clamping plate in the open position, and more force when compressed. In this manner, the spring biases the clamping plate out so that the mounting system opens when handle 490 is raised.

With mounting system 410 in the open position, riving knife 400 may be placed in the clamp with holes 432 in the riving knife fitting around pins 430 on the positioning plate and shoulders 440 on the riving knife resting on shoulders 436 of the positioning plate, as shown in FIG. 70. In this manner, the riving knife is positioned in the mounting system. The base of the riving knife includes a cut-out 502 to provide clearance for bolt 452 and spring 456.

Handle 490 may then be moved down to clamp the riving knife between the positioning and clamping plates. Moving handle 490 down causes cam bushing 470 to turn. When the cam bushing turns, cam surfaces 472 and 474 and/or leading edges 471 and 476 slide up cam surfaces 462 and 464, respectively, on the clamping plate and push the clamping plate toward the positioning plate. The cam surfaces and/or edges push the clamping plate toward the positioning plate because the cam surfaces are inclined and because bolt 452 prevents the cam bushing from moving out. The cam surfaces are inclined somewhat steeply so that a relatively small rotation of the handle will cause a significant movement of the clamping plate toward the positioning plate. For example, the cam surfaces may be configured to move the clamping plate toward the positioning plate ³⁄₁₆ths of an inch by moving the handle through only 20-40 degrees of arc. Of course, other configurations and geometries are possible.

When edges 471 and 476 move to the top of cam surfaces 462 and 464, cam surfaces 473 and 475 on the cam bushing will engage cam surfaces 463 and 465 on the clamping plate. Continued downward rotation of the handle will then cause cam surfaces 473 and 475 to slide over cam surfaces 463 and 465. These cam surfaces are configured and sized so that when they engage, the cam bushing and clamping plate are stable, with little or no force tending to move the cam surfaces to unclamp the mounting system. In other words, the geometry of the cam surfaces prevents vibration or other factors from causing the mounting system to unclamp or open. One possible configuration is to make cam surfaces 463, 465, 473 and 475 relatively flat and smooth with only very little or no slope. Of course, numerous configurations of the cam surfaces are possible and various slopes and shapes may be used depending on the desired movement and clamping action.

As handle 490 rotates down, bolt 452 will unthread from hole 545 and thereby loosen the clamping action. This loosening is not particularly noticeable as cam surfaces 472 and 474 and/or leading edges 471 and 476 slide up cam surfaces 462 and 464 because the cam surfaces move the clamping plate much more than the bolt loosens due to the fact that the pitch of the cam surfaces is much greater than the pitch of the threads on the bolt. However, as cam surfaces 473 and 475 slid over cam surfaces 463 and 465 the loosening of the bolt is more noticeable because those cam surfaces typically do not have a significant pitch. Accordingly, cam surfaces 463 and 465, and/or cam surfaces 473 and 475, may be inclined slightly to match the pitch of the threads on the bolt so that the cam surfaces tighten the clamp in the same amount as the unthreading bolt loosens the clamp. Alternatively, one set of cam surfaces may have a pitch slightly greater than the pitch of the threads on the bolt and the other set of cam surfaces may be flat. This is the configuration shown in the depicted embodiment, where the pitch of the threads on bolt 452 is 1 mm, the pitch of cam surfaces 463 and 465 is 1.01 mm, and cam surfaces 473 and 475 are flat. This configuration tightens the clamp slightly more than the unthreading bolt loosens the clamp. As another alternative, those cam surfaces may incline slightly less than the pitch of the threads on the bolt so that the clamping action is slightly less than the loosening of the clamp by the unthreading of the bolt. In that configuration, the downward movement of the handle becomes slightly easier as the bolt unthreads. This configuration also creates what may be thought of as a slight hump or "detent" that must be overcome when handle 490 is raised to open the clamp, and that hump helps prevent any unintentional opening of the clamp.

Figure 52:
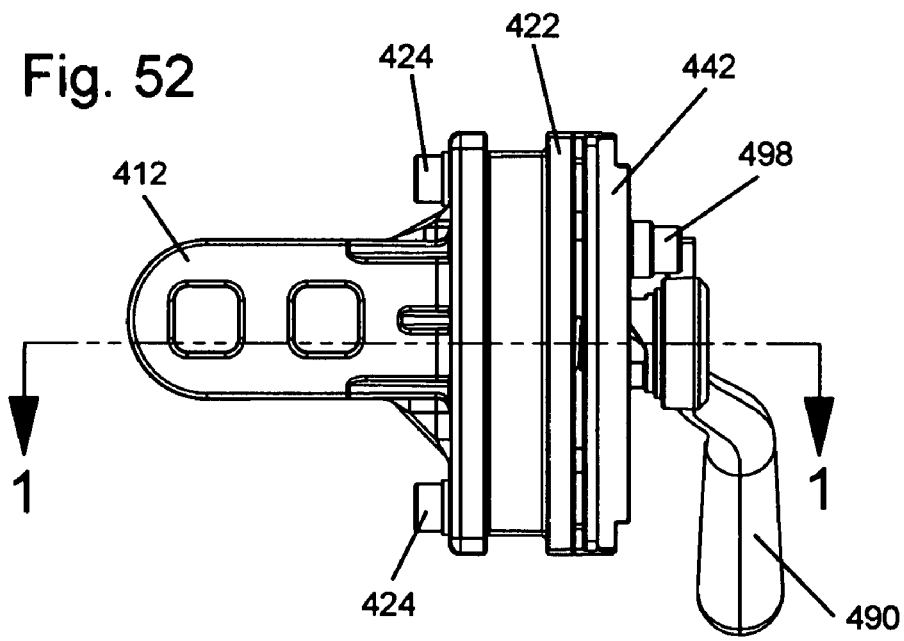
FIG. 52 shows a top view of the mounting system shown in FIG. 50.
Figure 60:
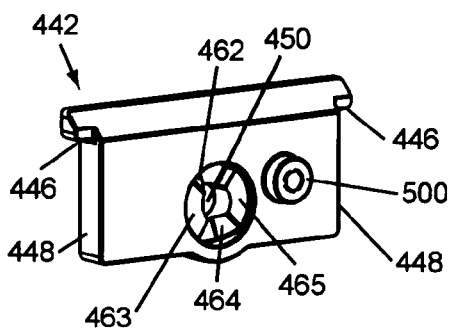
FIG. 60 shows another view of the clamping plate shown in FIG. 59.
Figure 61:
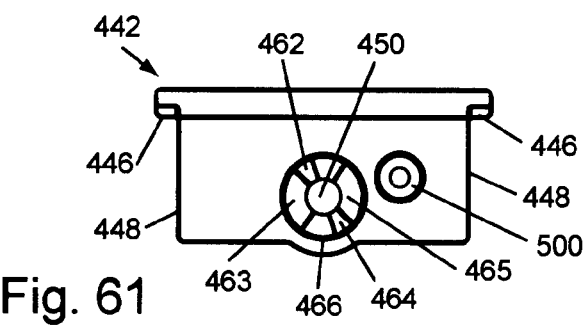
FIG. 61 shows still another view of the clamping plate shown in FIG. 59.

Handle 490 also includes a shoulder 496 (shown in FIGS. 66 and 67), and clamping plate 442 includes a boss 500 (shown in FIGS. 60 and 61) adapted to receive a bolt 498 (shown in FIGS. 51 and 52). Shoulder 496 on the handle is adapted to abut against bolt 498 as the handle rotates downward so that bolt acts as a stop to limit the rotation of the handle. Without that stop, the handle could rotate downward until the cam bushing could again fit into recess 466 and thereby allow the clamp to open. Numerous other stops are possible, including a stop integral with the clamping plate.

Figure 73:
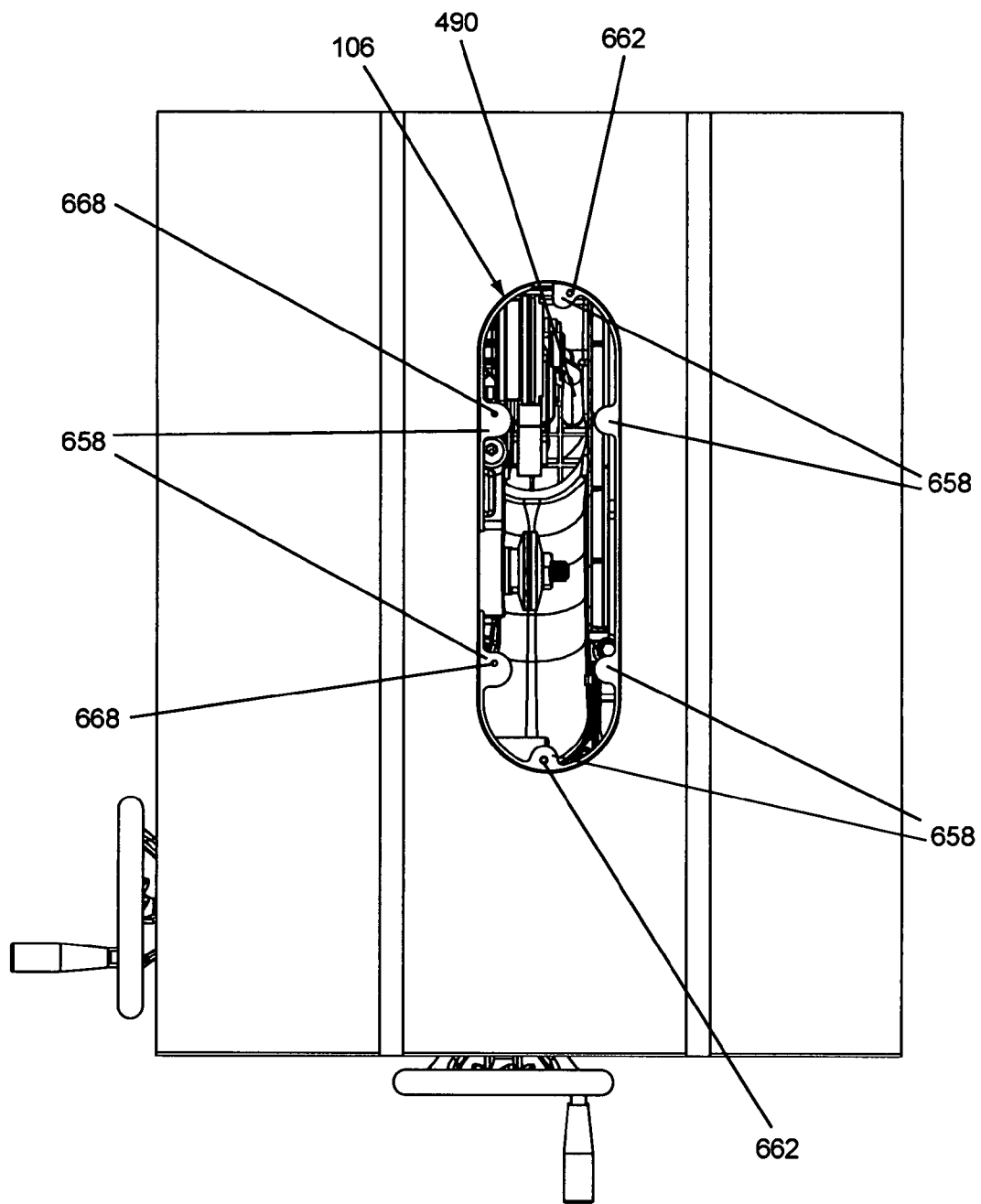
FIG. 73 shows a top view of a table saw with a table insert removed.

When included in a saw, mounting system 410 is accessible to a user of the saw through opening 106 in the table, as shown in FIG. 73. Typically, a throat plate or table insert 510 would be positioned in opening 106, as shown in FIGS. 44 and 46. A user would simple remove the throat plate, reach through the opening, grasp handle 490, and move it up or down as required to install or remove the riving knife. Specifically, to install the riving knife a user would simply move handle 490 up to open the mounting system, place the riving knife on the positioning plate, and then move the handle down to clamp the riving knife in place. Handle 490 includes a bend or step 506, labeled in FIG. 68, to move the handle out and away from other components in the saw so that the handle is easy to grasp. Handle 490 may be sized so that it is long enough to extend up through opening 106 and above the tabletop when the mounting system is in the open position with the handle raised, even when the blade is set to its lowest elevation. By so doing, a user would be reminded before using the saw that the riving knife was not clamped into position because the handle would interfere with the throat plate. The geometry of the handle and mounting system may also be configured so that when the handle is moved up, it remains up without falling back down due to gravity.

Mounting system 410 may be adjusted to accommodate riving knives of various thicknesses by adjusting bolt 452, as explained. Threading bolt 452 in or out also adjusts the amount of force applied during clamping.

Mounting system 410 is adapted so that the position of the riving knife relative to the blade may be adjusted. The side-to-side and front-to-back position of the riving knife, as well as the twisting or yaw of the riving knife relative to the blade, may be adjusted to make sure the riving knife is within the kerf of the blade and within the desired radial distance from the back edge of the blade by loosening bolts 414, moving the mounting system as necessary, and then re-tightening the bolts. The elevation or height of the riving knife relative to the blade may be adjusted by loosening bolts 424, moving positioning plate 422 up or down as necessary, and then re-tightening the bolts. The angle or slope of the riving knife toward or away from the back edge of the blade also may be adjusted by loosening bolts 424 and pivoting positioning plate 422 toward or away from the blade, although the amount plate 422 can pivot will depend on the size of holes 420 in mounting bracket 412 and on the size of bolts 424.

Once the position of the mounting system relative to the blade has been set, the riving knife may be removed and re-installed repeatedly without having to re-adjust the position of the riving knife. The riving knife will fit onto positioning plate 422 and the clamping action of the mounting system will press the riving knife against surface 428 of on the positioning plate, thereby locating the riving knife in the same position each time it is re-installed into the mounting system. A user may therefore remove the riving knife when necessary for a given operation and replace the riving knife quickly and easily without tools and without having to re-adjust the position of the riving knife. The ability of the mounting system to position the riving knife accurately when it is re-installed may be thought of as indexing the riving knife to a predetermined position.

As stated above, mounting system 410 is mounted on portion 250 of elevation plate 170. Mounting the mounting system on the elevation plate means that the mounting system and riving knife will move up and down and tilt with the blade as the blade moves. Thus, the position of the riving knife relative to the blade remains constant as the position of the blade relative to the table changes.

Mounting system 410 is constructed so that items other than a riving knife may be attached to or mounted in the saw. Any item that includes a base configured to fit over positioning plate 422 and sized to be clamped between the positioning plate and clamping plate 442 may be mounted and indexed in the saw as described.

Blade guard assembly 108 is another item that may be mounted and indexed in mounting system 410. Blade guard 108 is shown isolated in FIGS. 74 through 81. Blade guard 108 includes a blade shroud 520 shaped to fit over the blade and shield a person from accidentally contacting the blade. The shroud forms a cavity in which the blade may spin. The shroud is made from a nonconductive material such as polycarbonate or some other plastic so that the shroud will not affect any electrical signal on the blade if the shroud comes into contact with the blade and if the saw includes a contact detection system as described above. (In fact, blade guard 108 is constructed so that no metal or conductive part of the guard can contact the blade.) The material of the shroud should be sufficiently soft so that it will be unlikely to damage the blade if the shroud comes into contact with the blade. Often shroud 520 is made of a clear plastic so that the blade can be seen through the shroud and especially so that the cutting edge of the blade can be seen through the shroud by an operator of the saw. Shroud 520 is made from two halves joined together by screws, nuts and bolts, sonic welding, adhesive, clips or some other method or it can be a single molded piece.

The bottom of each side of blade shroud 520 includes a flat edge 522 adapted to rest on tabletop 102 when the blade is set at 90-degrees relative to the table top. Alternatively, the bottom edge of one side may be raised slightly to accommodate when the blade tilts relative to the tabletop. The left bottom edge when facing the saw in the normal operating position would be raised for a left-tilting saw and the right bottom edge would be raised for a right-tilting saw. In this configuration, if one bottom edge rests on the tabletop when the blade is set at 90-degrees, the other bottom edge typically would rest on the tabletop when the blade is tilted to 45-degrees.

Blade shroud 520 also includes a top edge 524 shaped to curve closely around the blade. The spacing between the perimeter of the blade when it is fully elevated and the inside surface of the blade shroud at the closest point can be approximately ¼ to ½ inch, for example, although other spacings are possible. The top edge of the blade shroud follows closely to the curve of the blade when the blade is fully elevated in order to minimize the size of the shroud, to create a substantially smooth and curved inside surface for dust collection, and to present a pleasing appearance.

A front portion 526 of the blade shroud extends up and out from the shroud, as shown, and may be thought of as a horn. Front portion 526 extends up to provide a contact surface for a workpiece to abut as the workpiece moves toward the blade. When the workpiece abuts the front portion, the workpiece will push the guard up to allow the workpiece to slide under the guard and past the blade. Front portion 526 is sized to accommodate the maximum cutting depth of the saw, which, for example, is often 3.125 inches. In other words, front portion 526 is sized so that the thickest workpiece that can be cut on the saw will abut the surface and push the guard up. The front portion is angled so that the workpiece will not catch on the shroud when the workpiece moves toward the blade. A wall or barrier 527 (labeled in FIG. 79) may be molded into the shroud between the main inside cavity of the shroud and the front portion so that sawdust does not collect in the front portion.

Figure 79:
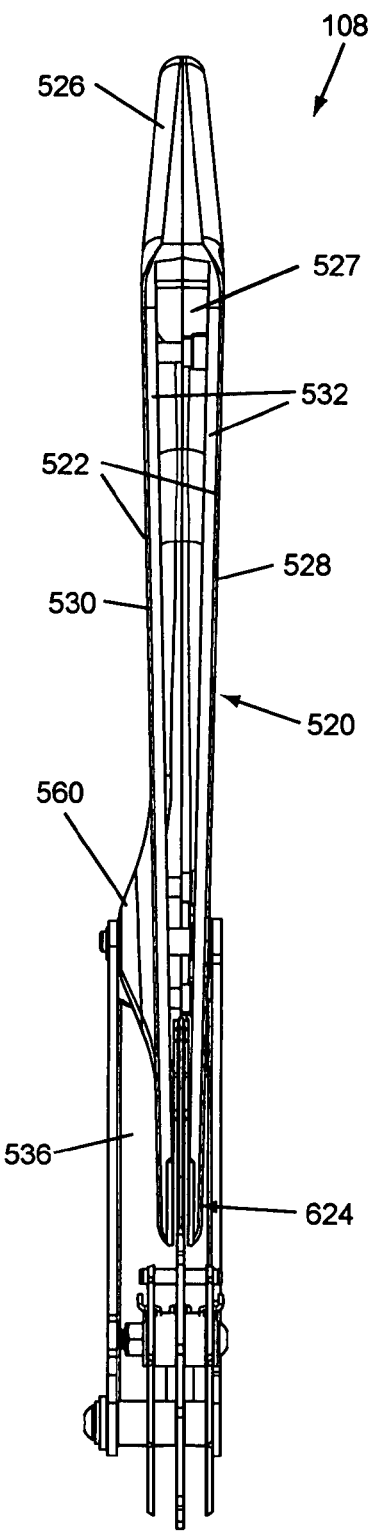
FIG. 79 shows a bottom view of the blade guard assembly shown in FIG. 74.
Figure 80:
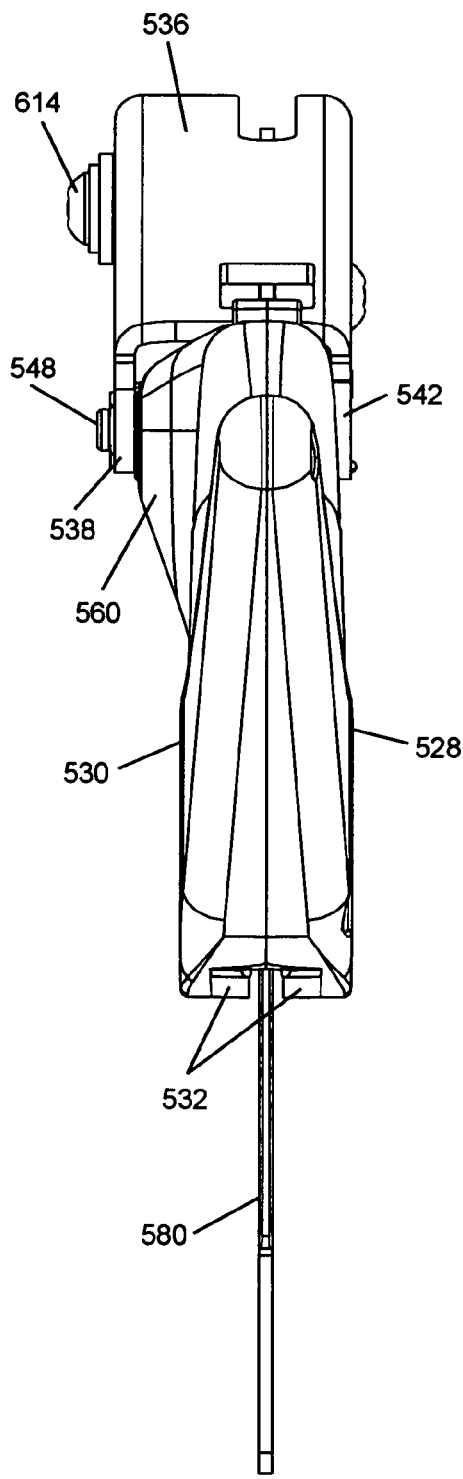
FIG. 80 shows a front view of the blade guard assembly shown in FIG. 74.

Bottom edges 522 of the blade shroud also include inwardly projecting flanges 532, one on each side, as shown in FIGS. 79 and 80, that add strength to the shroud. (FIG. 80 shows a front view of the blade guard). Flanges 532 also will abut the blade if the shroud deflects to the side, thereby protecting the shroud from the blade by minimizing the region over which the blade contacts the shroud.

Figure 78:
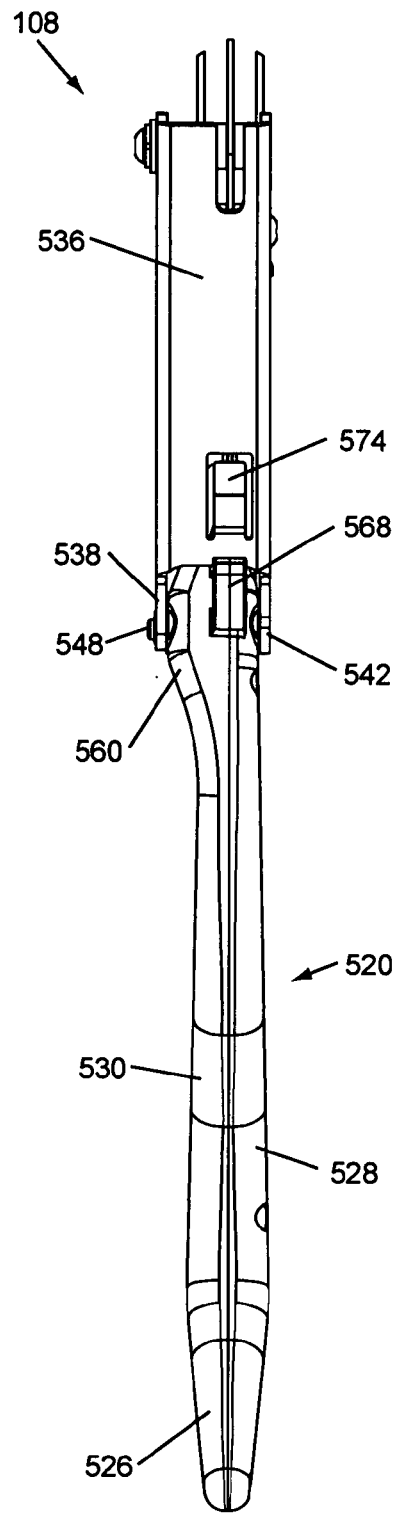
FIG. 78 shows a top view of the blade guard assembly shown in FIG. 74.

Blade shroud 520 is also configured to fit closely to the sides of the blade, as shown in FIGS. 78 and 79 which show top and bottom views, respectively, of blade guard 108 and blade shroud 520. A right side 528 and a left side 530 of the blade shroud are shown in those figures. The inside spacing between those sides can vary from approximately ¼ inch at the closest point to approximately ¾ or 1 inch at the widest point. The front of the blade shroud has a wider dimension than the rear because the blade shroud will have more play or side-to-side movement at the front than at the rear, as will be explained.

The right side of the blade shroud is configured as close to the blade as possible so that the fence of the table saw can be moved as close as possible to the blade before bumping into the guard. The right side of the blade shroud is flatter than the left side, as shown in FIG. 78, because the fence is typically used on the right side of the blade. Configuring the shroud to be close to the sides of the blade, and particularly close to the right side of the blade, allows the guard to be used when the fence must be positioned close to the blade.

The configuration of blade shroud 520 described herein may be thought of as a low-profile configuration because the shroud fits closely around the blade. This low-profile configuration reduces the degree that the blade guard interferes with the operation of the saw and is less obtrusive than other guards. Making the blade guard and blade shroud as small and unobtrusive as possible increases the likelihood that the guard will be used and will not be removed by a user of the saw. The low-profile guard also minimizes the regions in which. sawdust may collect and directs sawdust to a collection area below the tabletop of the saw.

Figure 84:
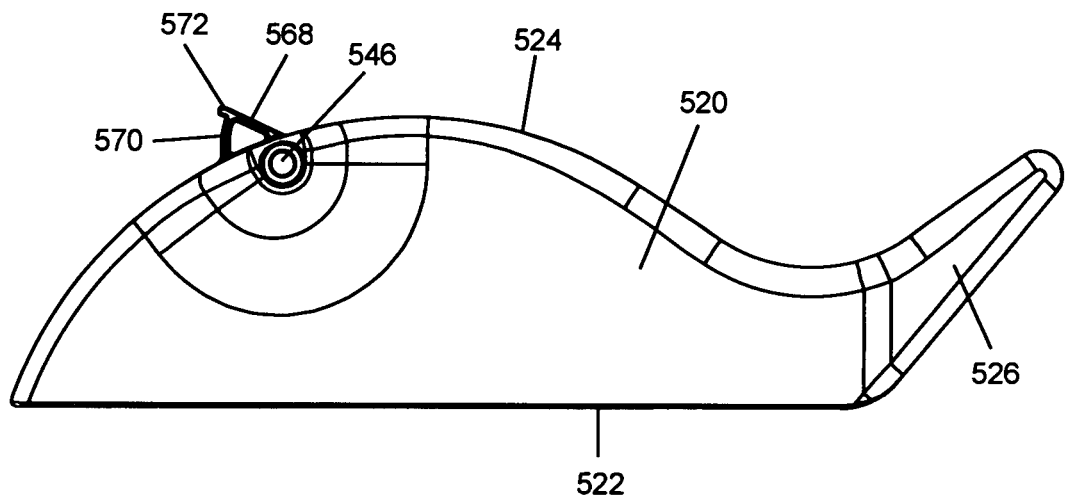
FIG. 84 shows a blade shroud used in the blade guard assembly shown in FIG. 74.

Blade shroud 520 is pivotally connected to a support arm 536. Support arm 536 is a folded metal arm with a U-shaped cross section, and is shown isolated in FIG. 82. Support arm 536 includes a first tab 538 with a first hole 540 and a second tab 542 with a second hole 544. Tabs 538 and 542 are adapted to fit over and around a designated portion of blade shroud 520. Specifically, blade shroud 520 includes a hole 546 near the top edge of the shroud (as shown in FIG. 84) and support arm 536 is adapted to fit over the shroud so that holes 540 and 544 in the support arm align with hole 546 in the shroud. Hole 546 extends through a boss that spans the shroud from one side to the other. A steel pin 548 extends through the holes to pivotally connect the blade shroud to the support arm.

Figure 86:
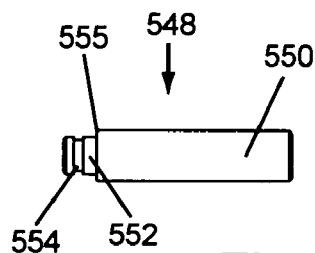
FIG. 86 shows a pivot pin used in the blade guard assembly shown in FIG. 74.

Pin 548 is shown in FIG. 86. Pin 548 includes a main section 550 that is lightly press fit into hole 546 in the blade shroud so that the pin is held snug and securely by the blade shroud so that there is no play between the blade shroud and the pin. Main section 550 of the pin has a diameter sized to fit securely into second hole 544 in the support arm so that the pin can rotate in the hole with very little play. The end of pin 548 that fits into hole 544 is substantially flush with the outside surface of the support arm when the pin is positioned properly so as not to increase the side-to-side dimension of the overall blade guard.

Figure 87:
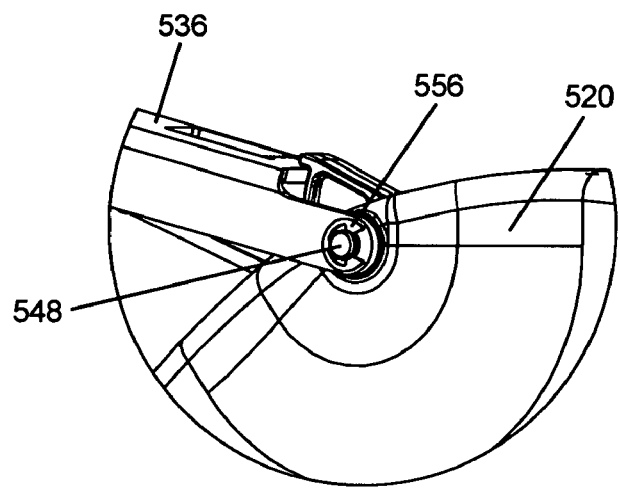
FIG. 87 shows a pivot connection used in the blade guard assembly shown in FIG. 74.
Figure 88:
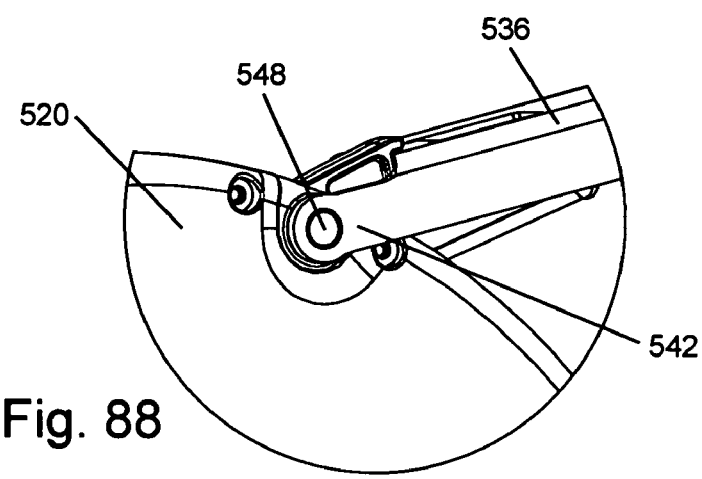
FIG. 88 shows another view of the pivot connection shown in FIG. 87.

Pin 548 also includes a first recessed section 552 and a second recessed section 554. The change in diameter from main section 550 to first recessed section 552 creates a shoulder 555 that abuts against the inside surface of tab 538 on the support arm. The diameter of hole 540 in tab 538 is sized to accept first recessed portion 552 so that the pin can rotate in the hole with very little play, but the diameter of hole 540 is smaller than the diameter of main section 550. In this manner, the position of shoulder 555 defines the position of the pin in holes 540 and 544. The length of main section 550 is substantially equal to the distance between the inside surface of tab 540 and the outside surface of tab 542. Second recessed portion 554 is configured to receive a clip 556 to hold the pin in place. FIG. 87 shows clip 556 on pin 548, and FIGS. 87 and 88 both show the pivot connection between blade shroud 520 and support arm 536.

The pivot connection between blade shroud 520 and support arm 536 allows for a metal-to-metal pivot rather than a metal-to-plastic pivot because tabs 538 and 542 in the support arm contact pivot pin 548. Having a metal-to-metal pivot connection permits the connection to be more precise than it otherwise could be because the metal components may be manufactured with smaller or tighter tolerances and because the metal-to-metal pivot connection will wear less than other connections. This is important because a more precise pivot connection means there will be less play, vibration or side-to-side movement of the blade guard.

Support arm 536 is also designed to have a significant width or side-to-side dimension between tabs 538 and 542. That width provides stability for the blade shroud and minimizes the play, vibration, and side-to-side movement that could otherwise result. One possible width or side-to-side dimension of support arm 536 is around 1.5 inches, although other dimensions are possible. Making support arm 536 relatively wide, however, means that the support arm is wider than the blade shroud. Accordingly, left side 530 of the blade shroud includes a raised portion 560 so that the blade shroud fits and substantially fills the space between tabs 538 and 542 on the support arm, as shown in FIGS. 79 and 80. Raised portion 560 also includes flat outside surfaces to minimize or eliminate any interference with the inside surfaces of tabs 538 and 542 on the support arm when the blade shroud pivots around pin 548. Hole 546 in the blade shroud passes through raised portion 560. Typically, there would be some minimal clearance between the inside surfaces of the support arm and the outside surfaces of the blade shroud so there is no friction or drag between them when the shroud pivots. Alternatively, the size of raised portion 560 and the resulting side-to-side dimension of the blade shroud can be selected to create a desired amount of friction between the blade shroud and the support arm so that a predetermined amount of force is required to pivot the blade shroud.

Tabs 538 and 542 on the support arm create an open region 562 that provides clearance for the blade shroud to pivot. Open region 562 is limited by edge 564 and upper surface 566. Blade shroud 520 includes a projection 568 that acts as a stop to limit the counterclockwise rotation of the blade shroud when viewed as in FIG. 76. Projection 568 includes a curved surface 570 and a tab 572 extends out from surface 570. Projection 568 is sized so that curved surface 570 slides past edge 564 in the support arm when the blade shroud pivots, but tab 572 abuts upper surface 566 on the support arm when a predetermined amount of rotation has occurred.

Figure 82:
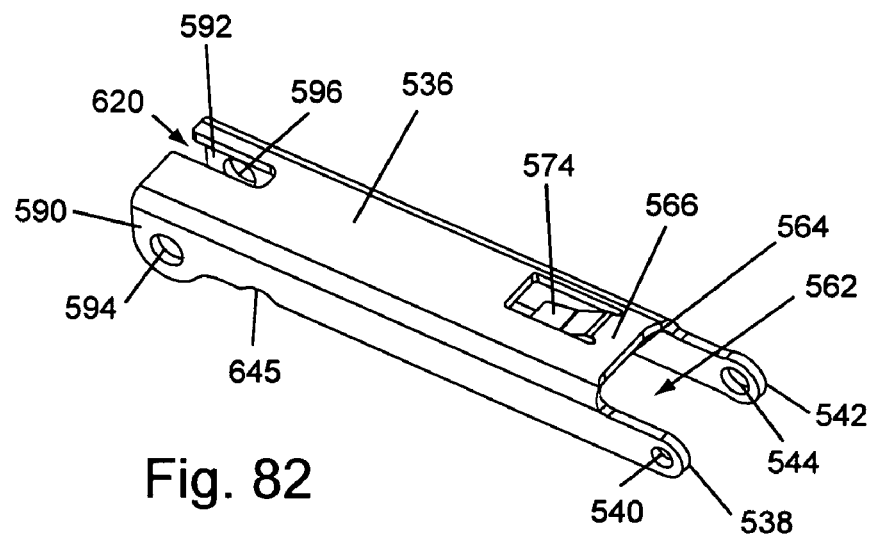
FIG. 82 shows a support arm used in the blade guard assembly shown in FIG. 74.
Figure 83:
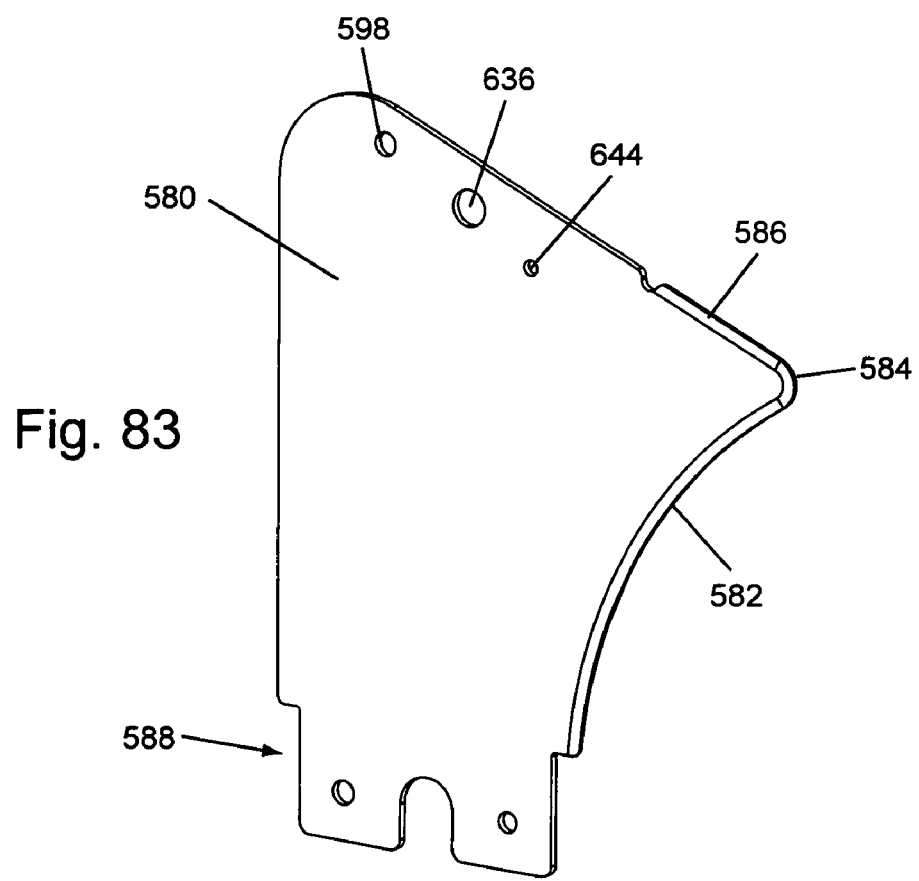
FIG. 83 shows a spreader or splitter used in the blade guard assembly shown in FIG. 74.

The clockwise rotation of blade shroud 520 when the shroud is viewed as in FIG. 76 is limited by a flange 574 cut out of the upper surface of support arm 536. Flange 574 is bent down toward the blade shroud, as shown in FIG. 82, so that the back of top edge 524 on the shroud will contact the flange after the blade shroud has rotated a given amount relative to the support arm.

The end of support arm 536 opposite tabs 538 and 542 is pivotally connected to a spreader or splitter 580. Splitter 580 is a flat, metal plate similar to the riving knife discussed above. The splitter has a side-to-side thickness thinner than the kerf of the blades for which it is intended to be used and the splitter is positioned in the saw behind and within the kerf of the blade, like the riving knife. The splitter, however, extends above the height of the fully elevated blade so that a blade shroud may be mounted thereto.

Figure 89:
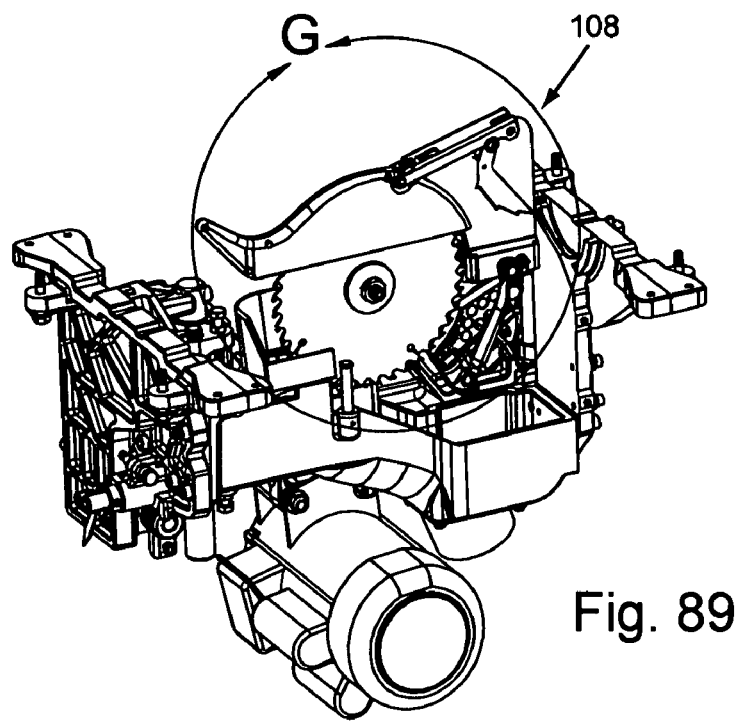
FIG. 89 shows a blade guard assembly mounted in a saw assembly.
Figure 90:
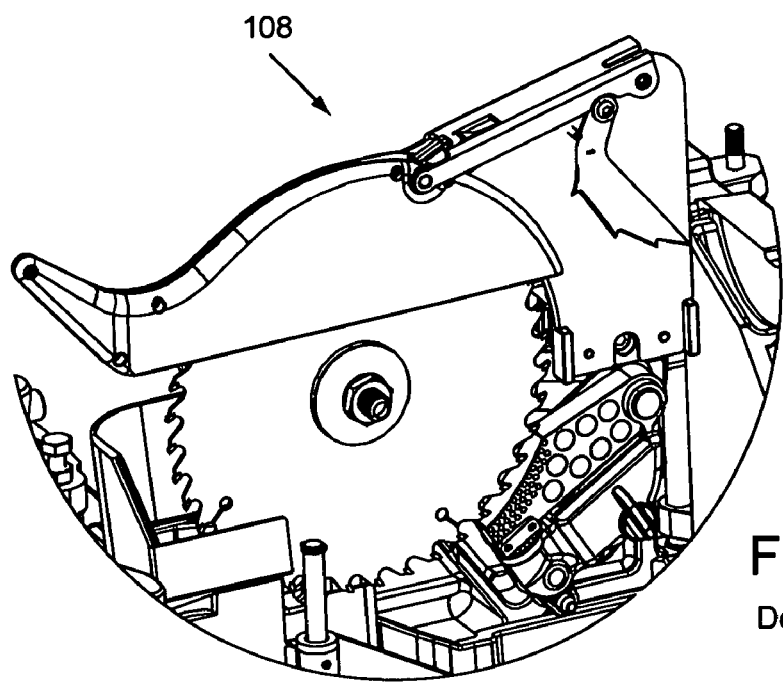
FIG. 90 shows a detailed view of a section G from FIG. 89 with part of a mounting system removed.

Splitter 580 includes a front edge 582 curved to follow the perimeter of the blades with which the splitter is to be used, like the leading edge of the riving knife discussed above. The splitter also includes a rounded tip 584 similar to the tip of a riving knife. Curved edge 582 and tip 584 are chamfered so that they do not catch on a workpiece. Splitter 580 also includes an upper edge 586 extending up and away from tip 584 and a portion of that upper edge is chamfered. Splitter 588 includes a base 588 with shoulders, edges, holes and cutouts like those in the riving knife discussed above so that the splitter may fit into mounting system 410, as shown in FIGS. 89 and 90.

Figure 91:
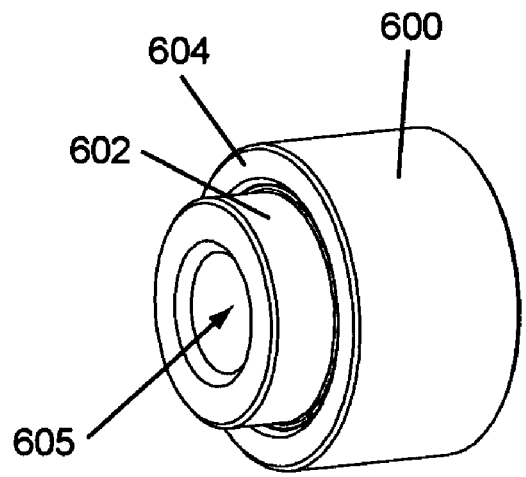
FIG. 91 shows a nut used in the blade guard assembly shown in FIG. 74.

Support arm 536 includes two side walls 590 and 592 (labeled in FIG. 82) and two holes 594 and 596 are cut in the side walls at the end of the support arm opposite tabs 538 and 542. A corresponding hole 598 is positioned in splitter 580 toward the top and back of the splitter. Support arm 536 is positioned over the splitter so that hole 594 and 596 align with hole 598. A nut 600 (shown in the assembly in FIG. 81 and isolated in FIG. 91) is positioned between the splitter and side wall 592 of the support arm. Nut 600 includes a recessed section 602 with a shoulder 604. Recessed section 602 is sized to fit into hole 596 without any significant play. Recessed area 602 is also sized so that it preferably does not extend through hole 596 beyond the outer surface of wall 592 so as to minimize the overall width of the blade guard assembly. Shoulder 604 is sized larger than hole 596 so that the shoulder abuts the inside surface of wall 592. Nut 600 also includes a threaded hole 605 to receive a screw, as will be explained.

Figure 92:
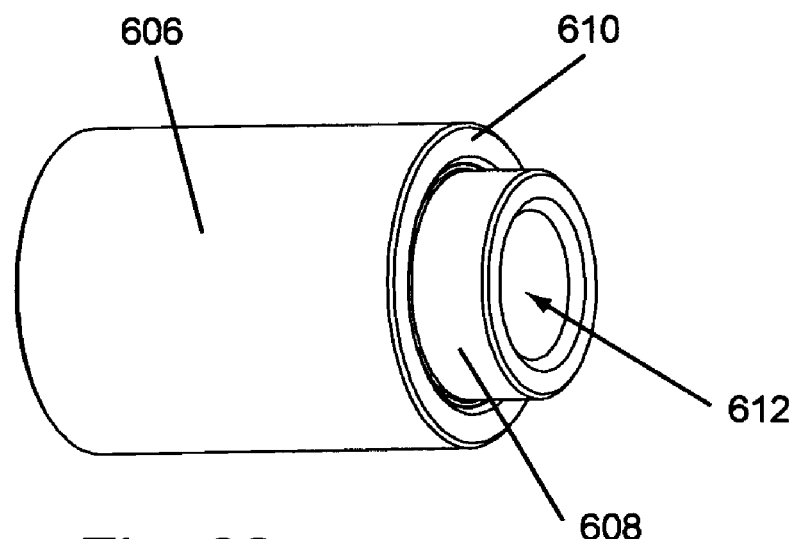
FIG. 92 shows a spacer used in the blade guard assembly shown in FIG. 74.

A spacer 606 (shown in FIGS. 81 and 92) is positioned between splitter 580 and wall 590 of support arm 536. Spacer 606 includes a recessed section 608 with a shoulder 610, and recessed area 608 is sized to fit into hole 594 without any significant play. Recessed area 608 is sufficiently long so that it extends through hole 594 and slightly beyond the outer surface of wall 590. Shoulder 610 is sized larger than hole 594 so that the shoulder abuts the inside surface of wall 590. Spacer 600 also includes a hole 612 through which a screw may pass.

A screw 614 (shown in FIG. 81) passes through a lock washer 616 and a flat washer 618 and then through spacer 600 and hole 598 in the splitter to thread into nut 600. As screw. 614 threads into nut 600, the nut is drawn against the splitter and the washer and lock washer are drawn against the end of spacer 606 that extends through hole 594. Thus, threading the screw into nut 600 causes the nut and spacer to clamp the splitter around hole 598 and thereby pivotally mount the support arm on the splitter.

The pivot connection between splitter 580 and support arm 536 is a metal-to-metal pivot, as with the pivot connection between blade shroud 520 and support arm 536, because holes 594 and 596 in the support arm contact the recessed areas or shoulders on nut 600 and metal spacer 606. Having a metal-to-metal pivot connection permits the connection to be more precise than it otherwise could be because the metal components may be manufactured with smaller or tighter tolerances and because the metal-to-metal pivot connection will wear less than other connections. This is important because a more precise pivot connection means there will be less play, vibration or side-to-side movement of the blade guard.

Figure 93:
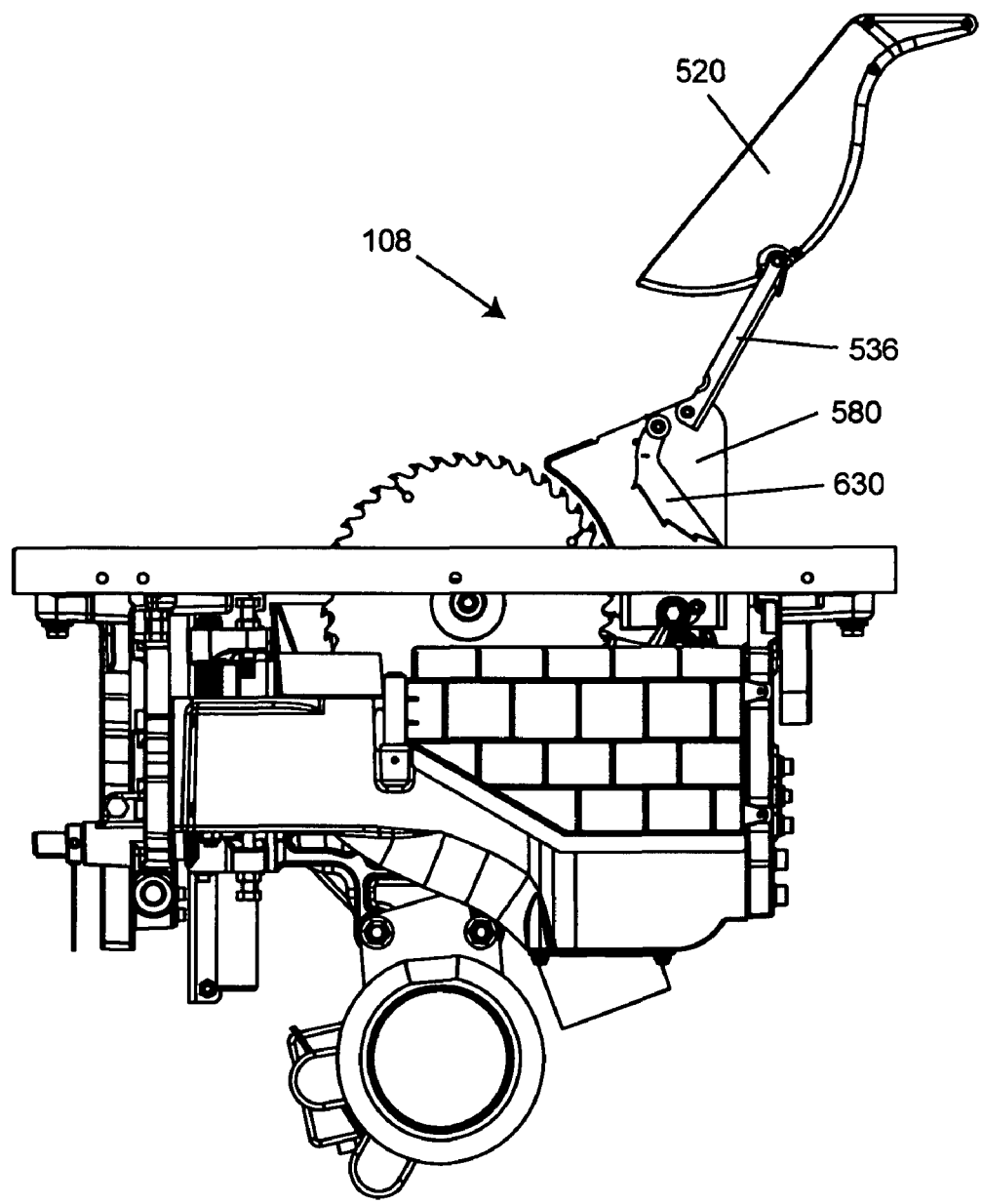
FIG. 93 shows a blade guard assembly mounted in a saw assembly with the blade guard up.

Support arm 536 includes a cutout 620 to provide clearance for the splitter when the support arm pivots up. The size of the cut out will determine how far upward the support arm can pivot. In the depicted embodiment, cutout 620 is sized to abut the top edge of the splitter when the support arm and blade shroud are pivoted up to a point where the center of mass of the support arm and blade shroud are behind hole 598 (or to the right of hole 598 when the blade guard is viewed as in FIG. 93), regardless of the pivot position of the blade shroud relative to the support arm. In that configuration, gravity will cause the blade guard to stay up when a user pivots the guard to its uppermost limit, as shown in FIG. 93.

Figure 81:
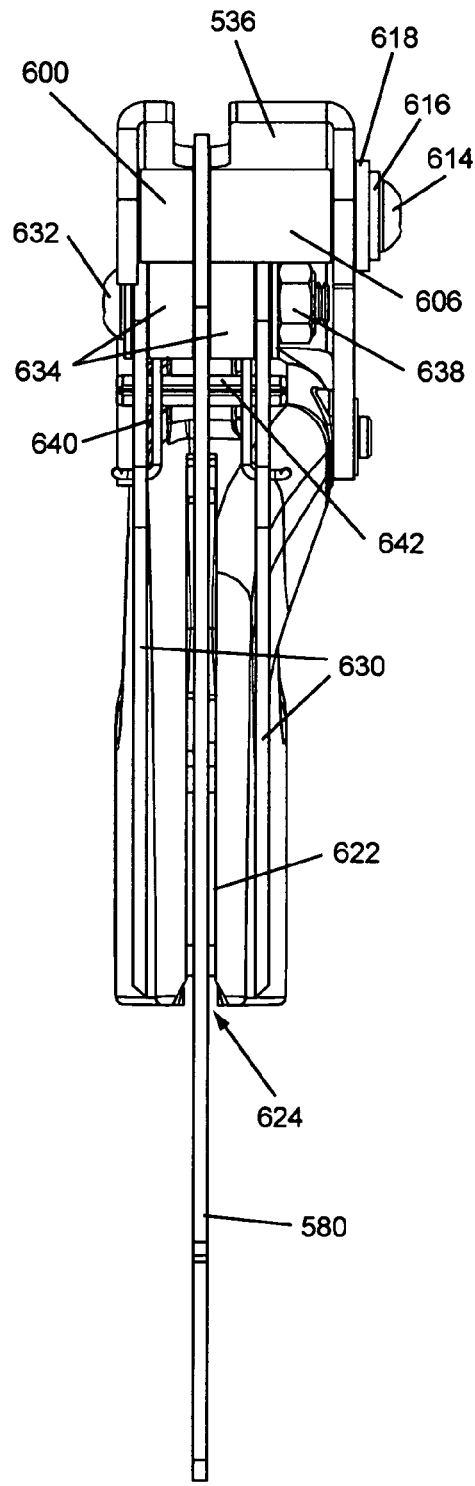
FIG. 81 shows a back view of the blade guard assembly shown in FIG. 74.
Figure 85:
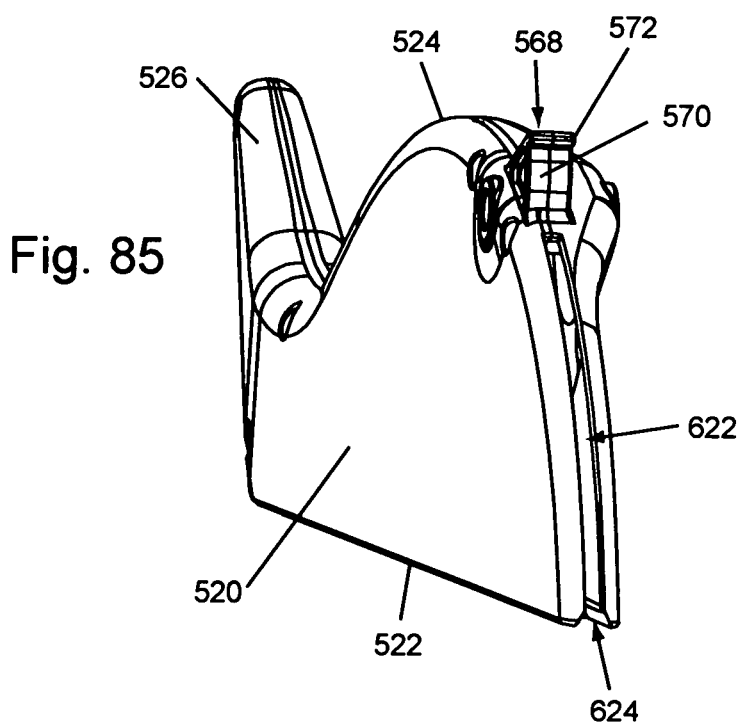
FIG. 85 shows another view of the blade shroud used in the blade guard assembly of FIG. 74.

Blade shroud 520 includes a slot 622, shown in FIG. 85, extending along the back edge of the shroud from the bottom edge up toward the pivot connection with the support arm. Slot 622 is positioned in the side-to-side center of the shroud. Slot 622 is configured so that when the blade shroud is lowered to cover the blade, the splitter fits into slot 622, as shown in FIGS. 74 through 77 and FIG. 90. The width of the slot is sized so that the edges of the slot are close to the sides of the splitter. By having the splitter extend into the slot in the shroud, the splitter helps stabilize the shroud and prevents the shroud from moving to the side. If the shroud starts to move to the side, an edge of the slot will abut splitter and stop that motion before the shroud contacts the blade. The slot is long enough so that the splitter stays in the slot as the blade shroud pivots up to accommodate a workpiece. Slot 622 also includes an opening 624 at the bottom of the blade shroud that includes angled or chamfered sides, as shown in FIGS. 79, 81 and 85, to direct the splitter into the slot as the blade shroud is lowered.

With this configuration, the forward portion of the splitter may be thought of as supporting or stabilizing the guard or blade shroud. This configuration may also be thought of as having the splitter and blade shroud interact to stabilize the back end of the shroud. Stabilizing the shroud with the splitter lets the shroud have a relatively small side-to-side dimension at the back of the shroud.

In use, as a person feeds a workpiece toward the blade of the saw, the workpiece will contact the blade guard and push the blade shroud up. The blade shroud will pivot around pin 548 and the blade shroud and support arm will move up by pivoting around screw 614. The blade shroud will be stabilized by the wide pivot connections and the splitter. The blade shroud will move up until the workpiece can slide under and past the guard, at which time gravity will cause the shroud to move down and rest on the tabletop. Additionally, support arm 536 and blade shroud 520 will pivot up and down relative to splitter 580 when the blade moves up and down because the splitter is mounted in mounting system 410 and will therefore move with the blade, as explained. For example, as the blade and splitter move down, support arm 536 and blade shroud 520 will pivot up relative to the splitter because the blade shroud rests on the tabletop.

In the depicted embodiment, the vertical dimension of splitter 580 and the position of hole 598 in the splitter are selected to position support arm 536 so that the pivot point is approximately centered in the range of motion of the support arm. In other words, beginning with the splitter fully elevated and then moving the splitter to its fully retracted position, the support arm will pivot roughly the same amounts above and below a horizontal position. Centering the pivot point in the range of motion of the pivot arm minimizes any front-to-back motion of the blade shroud as the splitter moves up and down. Of course, the splitter may be configured to position the support arm differently. The vertical dimension of splitter 580 and the position of hole 598 are also selected to be higher than the maximum cutting depth of the saw so that a thick workpiece can be slid past the splitter without bumping into support arm 536. The location where the support arm connects to the blade shroud in the depicted embodiment is chosen to minimize the length of the support arm while still holding the blade shroud in its desired position and while still providing stability to the blade shroud. Minimizing the length of the support arm minimizes the effect on the blade shroud of any play in the connection between the support arm and the splitter. The position of flange 574 in the support arm and the distance the flange extends down toward the blade shroud are selected so that the flange is close to the top of the shroud when the splitter is fully retracted. The flange will prevent the blade shroud and support arm from folding up, especially when a workpiece contacts the shroud with the splitter retracted.

Stabilizing the back of the blade shroud with the splitter; securing the blade shroud to the support arm with a relatively wide, metal-to-metal pivot connection; and clamping the support arm to the splitter with a relatively wide, metal-to-metal pivot connection results in a blade guard that is stable and that has little side-to-side play. This stability allows for a low-profile guard as described that interferes less with the operation of the saw, is less intrusive, and is more functional than other guards and therefore is more likely to be used.

In the depicted embodiment, the overall width or side-to-side dimension of blade guard 108 is substantially defined by the width of support arm 536, as shown in FIGS. 78 through 81, and blade shroud 520 is contained within that width. Screw heads and pins used in the depicted embodiment extend beyond the left side of the support arm rather than the right, to the extent possible, so that the fence can be positioned as close as possible to the right side of the guard.

Figure 94:
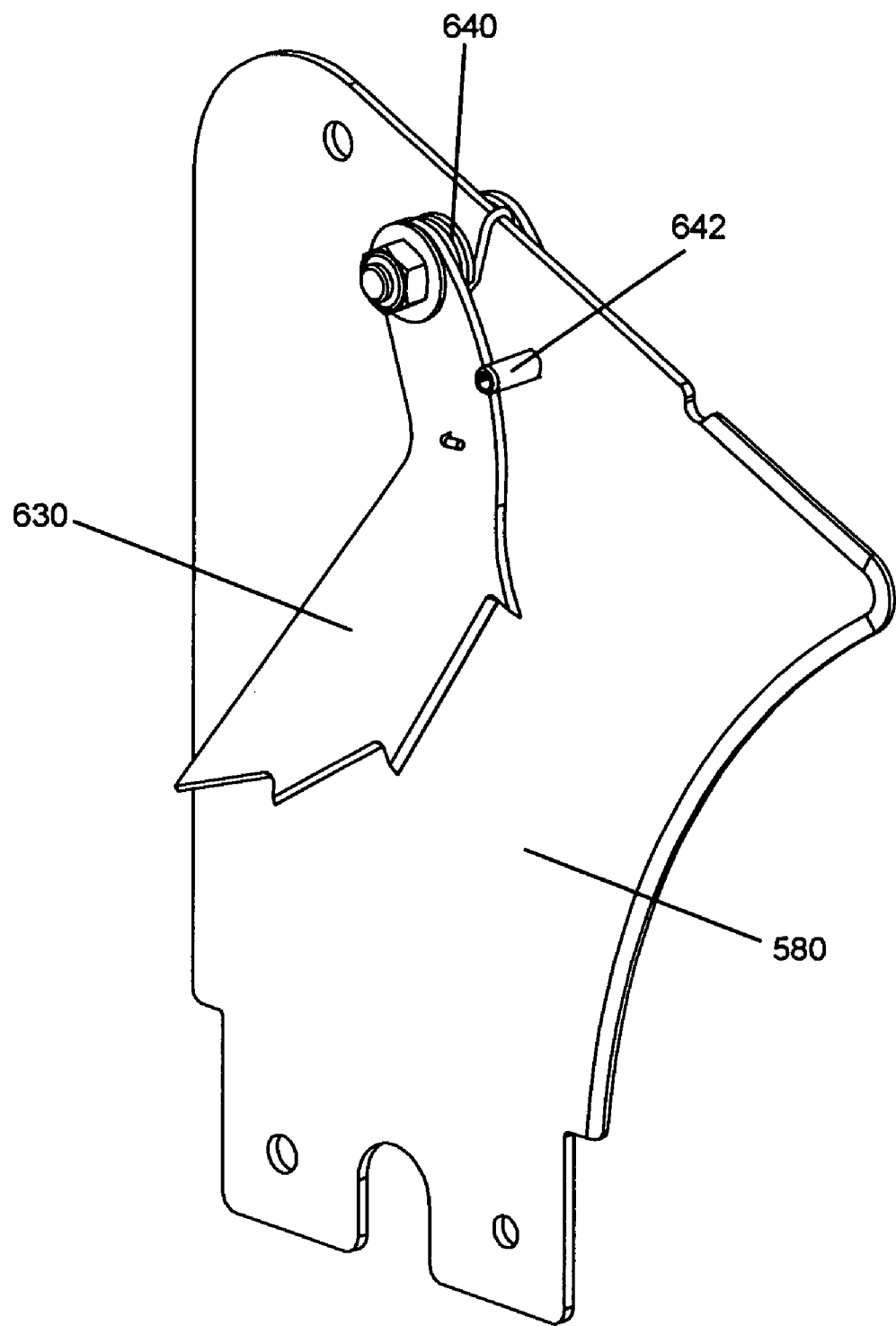
FIG. 94 shows a splitter and anti-kickback device used in the blade guard assembly shown in FIG. 74.

Blade guard 108 can also include anti-kickback pawls 630, one pawl mounted to each side of splitter 580, as shown in FIGS. 74 through 77 and FIG. 94. The anti-kickback pawls are mounted to the splitter by a bolt 632 that extends through holes in the pawls, through spacers 634, and through a hole 634 in the splitter, as shown in FIG. 81. Bolt 632 then screws into nut 638. Bolt 632 may be a flat head bolt or it may be countersunk if possible to minimize the distance it extends beyond the outer surface of support arm 536. Washers may be placed between the bolt head and pawl and between the nut and pawl. Spacers 634 may have shoulders so that the bolt and nut tighten against the spacers and clamp the spacers to the splitter. The anti-kickback paws would then rest on the shoulder of the spacers. A torsion spring 640 may be placed over the spacers and over the top of the splitter with an end connecting to each of the two anti-kickback pawls, as shown in FIGS. 81 and 94. The torsion spring biases the pawls toward the tabletop of the saw. A spring pin 642 is placed through a hole 644 in the splitter to limit the forward movement of the anti-kickback pawls. Each side of support arm 536 includes a recess 645 to provide clearance for bolt 632, spacers 634 and spring 640.

When a user feeds a workpiece into the saw, the workpiece will move past the blade and contact the anti-kickback pawls and push them up so that the workpiece can continue to slide past the pawls. The anti-kickback pawls are mounted to the splitter above the maximum cutting depth of the saw so that the pawls do not block a workpiece.

The anti-kickback pawls are configured so that if a workpiece is pulled back or if a force tries to move the workpiece toward the front of the saw, the anti-kickback pawls will resist that movement. Specifically, the anti-kickback pawls include teeth that are angled so a workpiece may slide past the pawls toward the rear of the saw but the teeth will bite into the workpiece if the workpiece moves toward the front of the saw. The pawls are also shaped so that they will bind against the workpiece when the workpiece moves toward the front of the saw. Each anti-kickback pawl has a sufficient number of teeth so that at least one tooth will engage a workpiece regardless of the elevation of the splitter. The teeth are configured so that their approach or bite angle remains around 45 degrees and preferably around 60 degrees regardless of the elevation of the splitter.

The anti-kickback pawls in the depicted embodiment are positioned behind and outside the blade shroud rather than inside the blade shroud. The blade shroud does not extend back over the anti-kickback pawls. The anti-kickback pawls are also configured to be within the width or side-to-side dimension of support arm 536, as shown in FIG. 81. This configuration contributes to the blade guard having a low-profile and to the blade shroud being at least partially stabilized by the leading edge of the splitter, as explained.

The anti-kickback pawls are mounted on the splitter and therefore will move up and down with the splitter. As the splitter moves up and down, the anti-kickback pawls will contact and slide on the tabletop or table insert. Thus, the tabletop or insert should have a surface to accommodate the sliding of the teeth of the anti-kickback pawls thereon. In the depicted embodiment, the anti-kickback pawls are configured so that they contact the insert only; they do not contact table 102.

Figure 95:
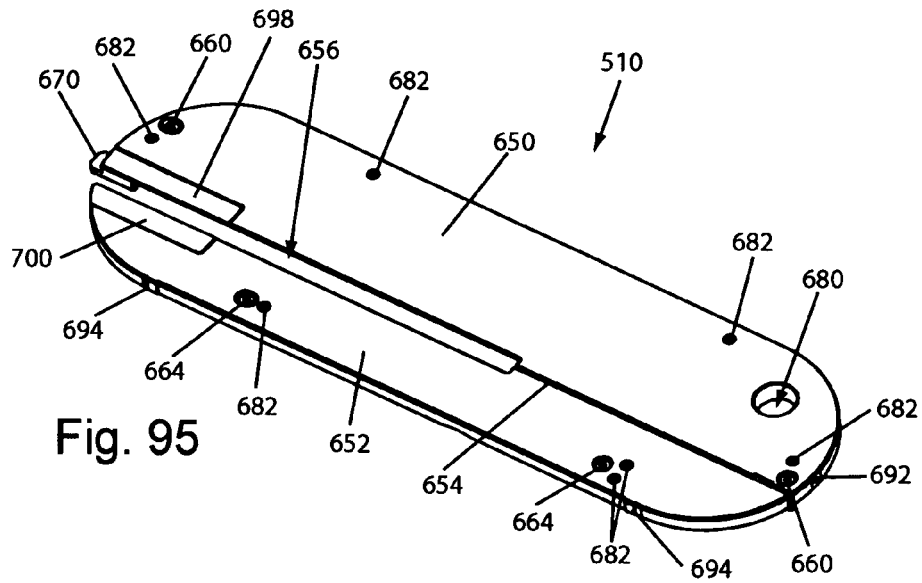
FIG. 95 shows a two-piece table insert.
Figure 96:
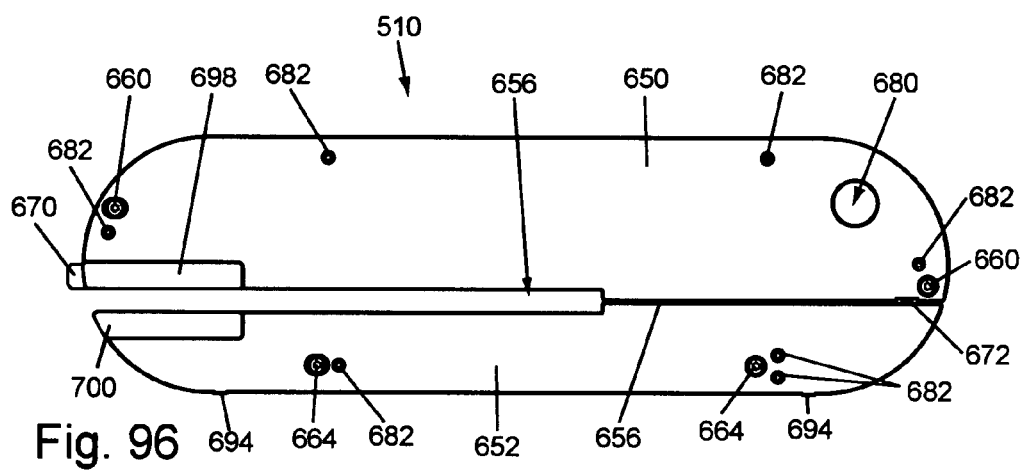
FIG. 96 shows a top view of the table insert shown in FIG. 95.
Figure 97:
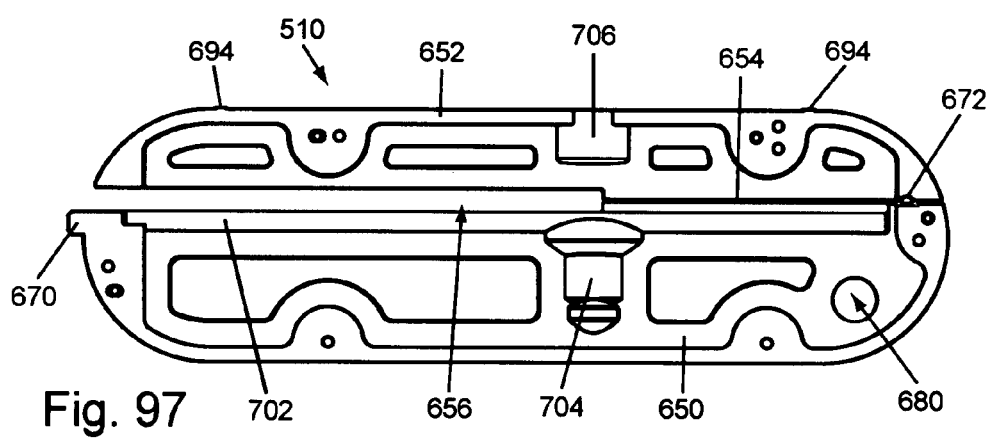
FIG. 97 shows a bottom view of the table insert shown in FIG. 95.

A throat plate or table insert 510 is shown isolated in FIGS. 95 through 97. Insert 510 is configured to fit in opening 106 in table 102 and the insert is adapted for use with the detection and reaction systems described above, with mounting system 410, with riving knife 400 and with blade guard 108.

Insert 510 is made from a non-conductive, hard material such as phenolic so that it does not affect or interfere with any electrical signal on the blade. The insert may also be made from other hard, non-conductive materials. If the insert were conductive, then contact with the blade would likely ground out any signal on the blade and cause a reaction system to trigger. The insert can also be made from a relatively softer material such as nylon with a support plate or bracket molded in the insert or otherwise associated therewith to give the insert rigidity.

Figure 98:
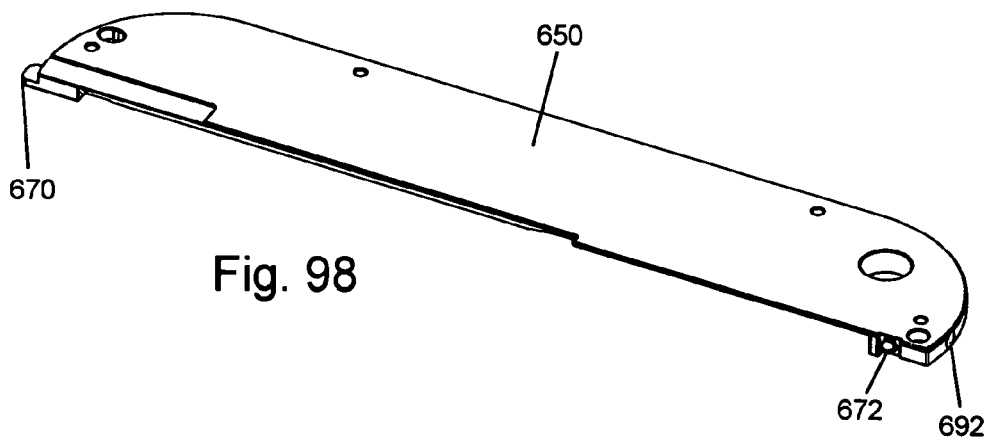
FIG. 98 shows the right portion of the table insert shown in FIG. 95.
Figure 99:
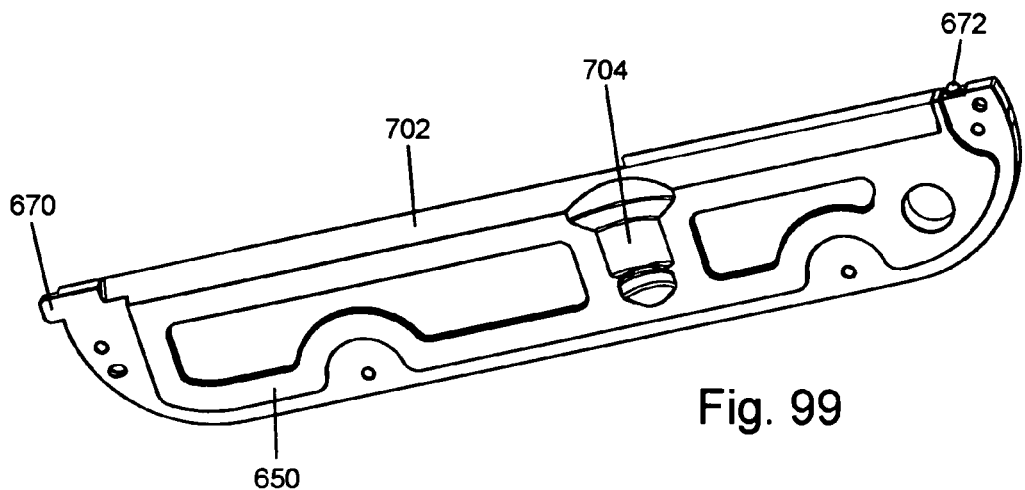
FIG. 99 shows another view of the right portion of the table insert shown in FIG. 95.
Figure 100:
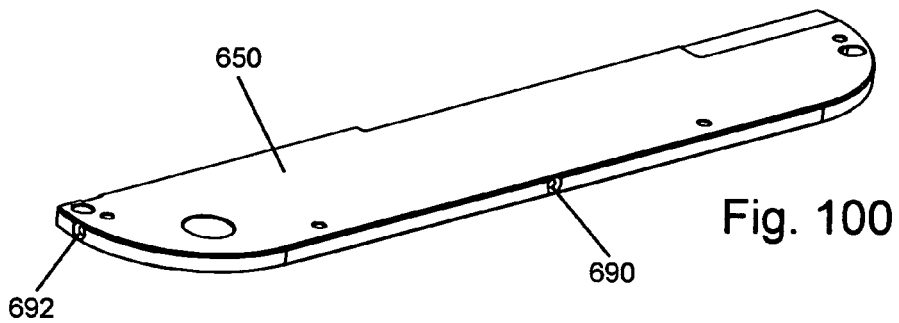
FIG. 100 shows still another view of the right portion of the table insert shown in FIG. 95.
Figure 101:
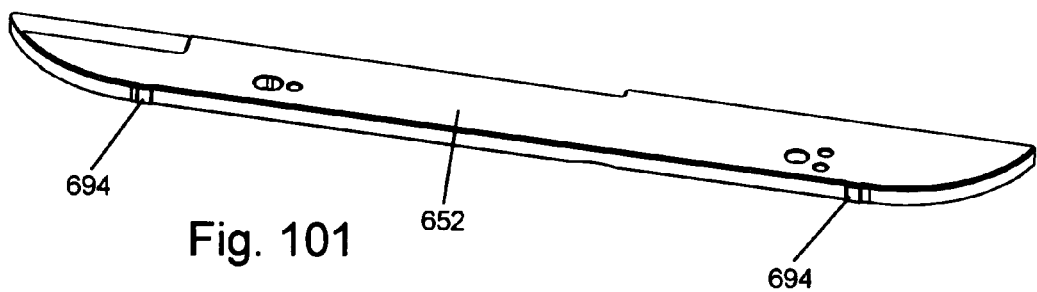
FIG. 101 shows the left portion of the table insert shown in FIG. 95.
Figure 102:
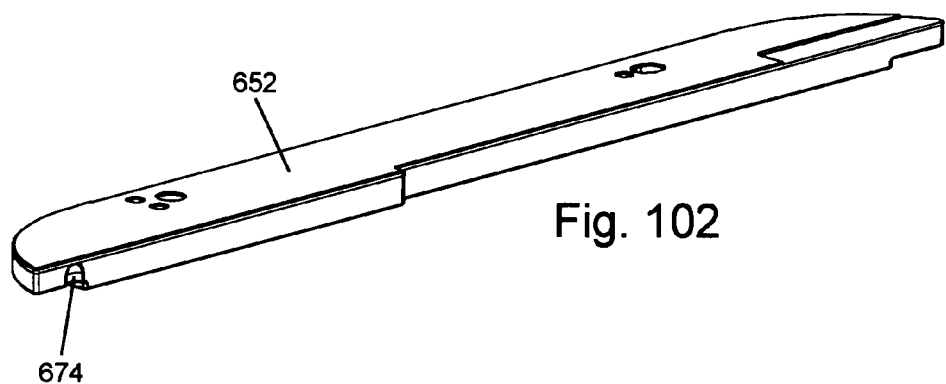
FIG. 102 shows another view of the left portion of the table insert shown in FIG. 95.
Figure 103:
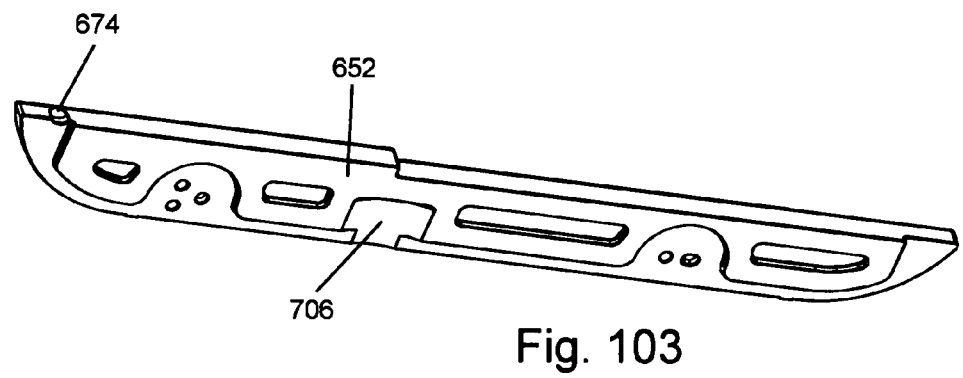
FIG. 103 shows still another view of the left portion of the table insert shown in FIG. 95.

Insert 510 includes a right portion 650 and a left portion 652, which are separate pieces. Right portion 650 is shown individually in FIGS. 98 through 100 and left portion 652 is shown by itself in FIGS. 101 through 103. Typically a table insert for a table saw is a single piece, but insert 510 is a two-piece insert to accommodate blade guard 108 and mounting system 410. For example, to mount blade guard 108 in mounting system 410 a user must remove the table insert to clamp the blade guard in position. However, with the blade guard clamped in position, a one-piece insert could not be placed in the table opening unless the insert had a slot big enough to fit around or over the blade guard. But if the insert had such a slot, then the insert would be weak and more likely to break. Using a two-piece insert addresses this issue because only one piece of the insert would need to be removed to install the blade guard; the other portion of the insert would remain in place. In the depicted embodiment, removing right portion 650 of insert 510 from table opening 106 provides sufficient clearance for the blade guard to be mounted in the saw; left portion 652 of the insert need not be removed. Right portion 650 can then be reinserted into the table opening after the guard is mounted in the saw because right portion 650 does not wrap around the blade guard; it extends along one side of the guard only.

A two-piece insert may take many different forms. In the depicted embodiment, right portion 650 and left portion 652 abut along a seam 654 which extends from the front of the insert to a predetermined point down the length of the insert. A slot 656 then extends from the terminus of seam 654 to the rear of the insert, as shown. Slot 656 is not long enough to allow the blade to extend up through the insert, so a slot must be cut in the insert to accommodate the blade when the insert is first placed in the saw. A slot is cut in the insert by lowering the blade below the tabletop, inserting and securing the insert in the table opening, and then turning the saw on and raising the spinning blade through the insert.

An insert in which at least a portion of the blade slot is cut by the blade itself is called a zero-clearance insert because the insert comes close to the sides of the blade with almost zero clearance. A zero-clearance insert has the advantage of supporting a workpiece close to the blade to minimize any chipping of the workpiece that may occur during cutting.

Slot 656 is pre-formed in insert 510 and the length of the slot may vary depending on how much of the slot is to be cut by the blade, if any. Slot 656, as shown in FIGS. 95 through 97, is long enough to allow a user to cut the slot with a riving knife installed in the saw because slot 656 is long enough to provide clearance for the riving knife as the blade rises up through the insert. Alternatively, slot 656 may be shortened so that the riving knife must be removed before the slot is cut. In that case, slot 656 could extend only far enough to allow a riving knife or blade guard to extend above the insert after the blade has cut the slot in the insert. As still another alternative, slot 656 could extend sufficiently far so that the blade need not cut a slot in the insert at all. In that case, the insert probably would not be thought of as a zero-clearance insert.

Rights portion 650 of insert 510 is larger than left portion 652 because opening 106 in the table is larger to the right of the blade than to the left. Opening 106 is larger to the right of the blade so that a user may replace the blade, change the brake cartridge, or change between the riving knife and the blade guard through the opening, as described. Left portion 652 is sized to provide some clearance between the blade and the table and to provide additional room to adjust the position of mounting system 410 on the elevation plate when necessary.

Opening 106 in table 102 includes several support surfaces or pads 658 spaced around the periphery of the opening as shown in FIG. 73, and insert 510 rests on and is secured to those pads. Specifically, two screws 660 pass through right portion 650, one at each end, and they screw into threaded holes 662 in two of the pads 658. Two screws 664 pass through left portion 652 and they screw into threaded holes 668. One of the holes in each of the right and left portions of the insert may be oversized to facilitate the aligning of the screws with the holes in light of manufacturing tolerances. In the depicted embodiment, the holes to the back or rear of each of the right and left portions of the insert are oversized. The screws are countersunk into the insert so they do not extend above the surface of the insert. In this manner, the right and left portions of insert 510 are secured in opening 106 and prevented from being accidentally knocked out of the opening by the spinning blade.

Right portion 650 is also secured in opening 106 by a flange 670 that fits under a shoulder or edge of table 102. The flange prevents the back end of right portion 650 from moving up and out of the opening. Flange 670 must be tucked under its corresponding shoulder when the insert is placed in the table opening. Right portion 650 also includes a catch 672 made from a projection that fits into and presses against a detent 674 in left portion 652, as shown. Catch 672 may take many forms, including a spring-biased ball that provides friction against the edge of left portion 652, a snap fit, a magnet catch, etc. Flange 670 and catch 672 are provided as an additional or alternative means to secure right portion 650 in opening 106 because some users may not use the screws to secure the right portion in the opening. They may not use the screws if they need to remove the right portion of the insert frequently to change blades, change the brake cartridge, or switch between the riving knife and blade guard. In that situation, it would be inconvenient to repeatedly screw and unscrew the right portion of the insert in the table opening, so flange 670 and catch 672 are used to hold the right portion in place.

Right portion 650 also includes a finger hole 680. A user may insert their finger into the hole to remove the right portion of the insert from the table opening.

Right portion 650 and left portion 652 include leveling screws 682 to level the insert relative to the tabletop. There are four leveling screws in right portion 650 and three leveling screws in left portion 652. The leveling screws are positioned over and rest against selected ones of pads 658. The leveling screws are spaced apart as shown in order to provide both front-to-back and side-to-side leveling and to help stabilize the insert.

The side-to-side position of insert 510 in opening 106 can be adjusted by a screw threaded into a hole 690 on the outside edge of right portion 650. (Hole 690 is labeled in FIG. 100.) The screw can be threaded into the hole so that it extends slightly beyond the outside edge of the insert to increase the overall side-to-side dimension of the insert. The front-to-back position of the insert can be similarly adjusted by a screw threaded into a hole 692 in the front edge of right portion 650. Additionally, the outer edge of left portion 652 includes two slightly raised pads 694 that abut the corresponding inner edge of opening 106 to help position the insert in the opening.

Insert 510 also includes two metal plates 698 and 700 mounted on the top surface of the insert at the back end with one pad on each side of slot 656, as shown in FIGS. 95 and 96. Plates 698 and 700 may be attached to the right and left portions of the insert, respectively, in many ways, such as by gluing. The metal plates are the surfaces on which the anti-kickback pawls described above may slide. The plates prevent the anti-kickback pawls from catching on or scratching the insert and the tabletop.

The top surface of insert 510 is typically made of a hard, non-conductive material such as melamine and it is often colored to contrast with the tabletop.

The underside of right portion 650 includes a recessed section 702 along the edge of slot 656 and seam 654, as shown in FIG. 97. The recessed section slopes back from the edge like a chamfer and provides clearance for the blade when the blade tilts. Recessed section 702 and insert 502 are designed for a left-tilting saw. The configuration could be mirrored for a right-tilting saw. The underside of right portion 650 also includes a recessed area 704 to provide clearance for the arbor and the blade washer and nut when the blade is fully elevated. The underside of left portion 652 also includes a recess 706 to provide clearance for the arbor block when the blade is fully elevated. The undersides of both the right and left portions of the insert may also include other recessed sections to minimize the mass of the part or to provide flattened or smoothed areas to rest on pads 658. The recessed or smoothed areas may be made by machining, molding or some other method.

INDUSTRIAL APPLICABILITY

The systems, mechanisms and components disclosed herein are applicable to power equipment, and particularly to table saws, including cabinet saws, contractor saws, hybrid saws, jobsite saws, and bench top saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:

a table defining a work surface, where the table has a front;

a substantially planar, circular blade configured to extend at least partially above the work surface;

a motor to spin the blade;

an elevation carriage adapted to support the blade and to move to change the elevation of the blade relative to the work surface;

a trunnion structure adapted to support the elevation carriage and to move the blade between a position where the blade is perpendicular to the work surface and a position where the blade is not perpendicular to the work surface; and an elongate shaft having two ends, a first mounting location adjacent one of the ends, a non-threaded cantilevered portion, and a second mounting location between the first mounting location and the cantilevered portion, where the shaft is fixed to the trunnion structure at one of the first and second mounting locations by a bolt engaging the shaft, where the shaft is also fixed to the trunnion structure at the other of the first and second mounting locations, where the elevation carriage is configured to slide on the shaft between the first and second mounting locations and concurrently to slide on the cantilevered portion when the elevation carriage moves to change the elevation of the blade relative to the work surface, and where the shaft is positioned between the front of the table and the blade.

2. A table saw comprising:

a table defining a work surface;

a substantially planar, circular blade configured to extend at least partially above the work surface;

a motor to drive the blade;

an elevation carriage adapted to support the blade and to move to change the elevation of the blade relative to the work surface;

a trunnion structure adapted to support the elevation carriage and to move the blade between a position where the blade is perpendicular to the work surface and a position where the blade is not perpendicular to the work surface;

an elongate shaft interconnecting the elevation carriage and trunnion structure, where the shaft has a first end, a middle, a non-threaded section between the first end and the middle, and a non-threaded cantilevered portion terminating at a second end;

where the shaft interconnects the elevation carriage and trunnion structure through a first mounting location near the first end, through a second mounting location near the middle, through a first sliding engagement on the non-threaded section between the first end and the middle, and through a second sliding engagement on the cantilevered portion, so that when the elevation carriage moves to change the elevation of the blade relative to the work surface there is concurrent sliding movement between the elevation carriage and the trunnion structure on the cantilevered portion and on the non-threaded section of the shaft between the first end and the middle; and a second shaft interconnecting the elevation carriage and trunnion structure, where the second shaft is supported at two mounting locations, where the second shaft has a non-threaded section between the two mounting locations, where the elongate shaft and second shaft are substantially parallel, and where the second shaft is configured so that when the elevation carriage moves to change the elevation of the blade relative to the work surface there is sliding movement between the elevation carriage and the trunnion structure on the non-threaded section.

3. The table saw of claim 2, where the elongate shaft is bolted to the trunnion structure at the first mounting location.

4. The table saw of claim 2, where the elongate shaft is bolted to the trunnion structure at the second mounting location.

5. The table saw of claim 2, where the elongate shaft is bolted to the trunnion structure at the first and second mounting locations.

6. A table saw comprising:
a table defining a work surface;
a substantially planar, circular blade configured to extend at least partially above the work surface;
a rotatable arbor to support the blade;
an elevation carriage adapted to support the arbor and to move up and down to change the elevation of the blade relative to the work surface;
a motor;
a belt system interconnecting the motor and arbor;
a trunnion structure adapted to support the elevation carriage and motor and to move the blade between a position where the blade is perpendicular to the work surface and a position where the blade is not perpendicular to the work surface, where the trunnion structure includes a front trunnion bracket, a rear trunnion bracket, a front trunnion, a rear trunnion, and a trunnion brace interconnecting the front and rear trunnions, where the front trunnion bracket and front trunnion include an arcuate flange and groove, where the rear trunnion bracket and rear trunnion include an arcuate flange and groove, and where the trunnion structure further includes first and second mounting surfaces adjacent the front trunnion; and
a support shaft interconnecting the elevation carriage and trunnion structure, where the support shaft has first and second ends, where the support shaft is fixed to the first mounting surface in the trunnion structure near the first end, where the support shaft is also fixed to the second mounting surface in the trunnion structure near the middle of the shaft, where the portion of the shaft extending from the second mounting surface to the second end extends from the second mounting surface without further connection to the trunnion structure, where the fixing of the support shaft to the first and second mounting surfaces prevents the support shaft from rotating, and where the support shaft engages the elevation carriage between the first and second mounting surfaces and between the second mounting surface and the second end of the shaft, so that when the elevation carriage moves to change the elevation of the blade relative to the work surface, there is concurrent sliding movement between the carriage and the trunnion structure between both the first and second mounting surfaces and between the second mounting surface and the second end of the shaft.

7. The table saw of claim 6, further comprising a second shaft interconnecting the elevation carriage and trunnion structure, where the second shaft and support shaft are substantially parallel, where the second shaft has a non-threaded portion, and where there is sliding engagement between the elevation carriage and trunnion structure on the non-threaded portion of the second shaft as the elevation carriage moves to change the elevation of the blade relative to the work surface.

* * * * *